United States Patent
Hiroe

(10) Patent No.: US 10,013,998 B2
(45) Date of Patent: Jul. 3, 2018

(54) SOUND SIGNAL PROCESSING DEVICE AND SOUND SIGNAL PROCESSING METHOD

(71) Applicant: SONY CORPORATION, Tokyo (JP)

(72) Inventor: Atsuo Hiroe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/118,239

(22) PCT Filed: Jan. 27, 2015

(86) PCT No.: PCT/JP2015/052124
§ 371 (c)(1),
(2) Date: Aug. 11, 2016

(87) PCT Pub. No.: WO2015/125567
PCT Pub. Date: Aug. 27, 2015

(65) Prior Publication Data
US 2017/0047079 A1 Feb. 16, 2017

(30) Foreign Application Priority Data
Feb. 20, 2014 (JP) .................................. 2014-031044

(51) Int. Cl.
*G10L 21/00* (2013.01)
*G10L 21/028* (2013.01)
(Continued)

(52) U.S. Cl.
CPC ............ *G10L 21/028* (2013.01); *G10L 15/04* (2013.01); *G10L 21/0388* (2013.01);
(Continued)

(58) Field of Classification Search
None
See application file for complete search history.

(56) References Cited

U.S. PATENT DOCUMENTS 8,577,054 B2 * 11/2013 Hiroe ................... G10L 21/0272
367/119
9,318,124 B2 * 4/2016 Hiroe ................... G10L 21/0216
(Continued)

FOREIGN PATENT DOCUMENTS

JP 2011-107602 A 6/2011
JP 2011-107603 A 6/2011
(Continued)

OTHER PUBLICATIONS

International Search report on patentability received for PCT Application No. PCT/JP2015/052124, dated Apr. 7, 2015, 5 pages of report including 2 pages of English translation.
(Continued)

*Primary Examiner* — Marcus T Riley
(74) *Attorney, Agent, or Firm* — Chip Law Group

(57) ABSTRACT

A device and a method for determining a speech segment with a high degree of accuracy from a sound signal in which different sounds coexist are provided. Directional points indicating the direction of arrival of the sound signal are connected in the temporal direction, and a speech segment is detected. In this configuration, pattern classification is performed in accordance with directional characteristics with respect to the direction of arrival, and a directionality pattern and a null beam pattern are generated from the classification results. Also, an average null beam pattern is also generated by calculating the average of the null beam patterns at a time when a non-speech-like signal is input. Further, a threshold that is set at a slightly lower value than the average null beam pattern is calculated as the threshold to be used in detecting the local minimum point corresponding to the direction of arrival from each null beam pattern, and a local minimum point equal to or lower than the
(Continued)

US 10,013,998 B2

Page 2 threshold is determined to be the point corresponding to the direction of arrival.

13 Claims, 21 Drawing Sheets

(51) Int. Cl.
G10L 15/04 (2013.01)
G10L 25/78 (2013.01)
G10L 21/0388 (2013.01)
G10L 25/93 (2013.01)
G10L 21/0216 (2013.01)
G10L 21/0308 (2013.01)

(52) U.S. Cl.
CPC .............. *G10L 25/78* (2013.01); *G10L 25/93* (2013.01); *G10L 21/0308* (2013.01); *G10L 2021/02166* (2013.01)

(56) References Cited

U.S. PATENT DOCUMENTS

| 9,384,760 | B2* | 7/2016 | Nakadai | G10L 25/78 |
| 2005/0047611 | A1* | 3/2005 | Mao | G10L 21/0208 |
| | | | | 381/94.7 |
| 2010/0278357 | A1* | 11/2010 | Hiroe | G10L 21/0272 |
| | | | | 381/111 |
| 2011/0307251 | A1* | 12/2011 | Tashev | G10L 21/028 |
| | | | | 704/231 |
| 2012/0120218 | A1* | 5/2012 | Flaks | G10L 21/028 |
| | | | | 348/77 |
| 2012/0183149 | A1* | 7/2012 | Hiroe | G01S 3/8083 |
| | | | | 381/56 |
| 2012/0263315 | A1* | 10/2012 | Hiroe | G10L 21/0216 |
| | | | | 381/92 |
| 2014/0214418 | A1* | 7/2014 | Nakadai | G10L 21/0216 |
| | | | | 704/233 |
| 2017/0047079 | A1* | 2/2017 | Hiroe | G10L 15/04 |

FOREIGN PATENT DOCUMENTS

| JP | 2012-150237 A | 8/2012 |
| JP | 2012-215606 A | 11/2012 |
| JP | 2013-126026 A | 6/2013 |

OTHER PUBLICATIONS

Written Opinion received for PCT Application No. PCT/JP2015/052124, dated Apr. 7, 2015, 10 pages of report including 5 pages of English translxation.

International preliminary report on patentability for PCT Application No. PCT/JP2015/052124, dated Aug. 23, 2016, 5 pages.

* cited by examiner

SOUND SIGNAL PROCESSING DEVICE AND SOUND SIGNAL PROCESSING METHOD

CROSS REFERENCE TO RELATED APPLICATIONS

This application is a U.S. National Phase of International Patent Application No. PCT/JP2015/052124 filed on Jan. 27, 2015, which claims priority benefit of Japanese Patent Application No. JP 2014-031044 filed in the Japan Patent Office on Feb. 20, 2014. Each of the above-referenced applications is hereby incorporated herein by reference in its entirety.

TECHNICAL FIELD

The present disclosure relates to a sound signal processing device, a sound signal processing method, and a program. More particularly, the present disclosure relates to a sound signal processing device that performs a speech detection process accompanied by estimation of a direction of arrival, a sound signal processing method, and a program.

BACKGROUND ART

Speech detection (SD) is a process to be performed to cut out a segment, during which a person is speaking, from a sound signal that is continuously input. This process is also called voice activity detection (VAD). Hereinafter, speech detection will also be referred to as "segment detection".

Speech detection may be performed together with speech recognition, sound source extraction, and the like. In any case, a high degree of accuracy is required in segment detection.

In many speech recognition devices, for example, processing such as matching is performed on segments cut out through segment detection, and therefore, the accuracy of speech recognition is greatly affected by the accuracy of the segment detection Specifically, if a segment during which a person has actually spoken differs from a segment detected through a segment detection process, the detection will cause wrong recognition. In other cases, if a speech segment is wrongly detected even though any speech has not been emitted, a recognition process is performed on the sound in the segment, and the system wrongly operates in accordance with the wrong recognition result.

Meanwhile, segment detection might also be performed in a sound source extraction process to select and extract one speech from an obtained sound in which different sounds coexist. For example, in a case where a clear speech is to be extracted from a signal in which speeches and noise coexist, or in a case where a speech of one person is to be extracted while two or more persons are simultaneously speaking, an input signal in some sound source extraction systems needs to be divided into a segment during which only noise exists and a segment during which both noise and a speech coexist. To divide such an input signal, segment detection is performed.

There also are cases where sound source extraction is performed only when a target speech exists, and segment detection is performed to reduce the amount of calculation and prevent applications to silent segments. In such speech detection to be performed in conjunction with sound source extraction, operation with a high degree of accuracy is required even if an input signal is formed with a mixture of a speech and noise or a mixture of speeches.

Note that, conventional technologies related to speech detection are disclosed in Patent Document 1 (JP 2012-150237 A), Patent Document 2 (JP 4282704 B2), Patent Document 3 (JP 2010-121975 A), Patent Document 4 (JP 4182444 B2), Patent Document 5 (JP 2008-175733 A), and Patent Document 6 (JP 2013-44950 A), for example. Also, a conventional technology related to a sound source extraction process is disclosed in Patent Document 7 (JP 2012-234150 A), for example.

CITATION LIST

Patent Documents

Patent Document 1: JP 2012-150237 A
Patent Document 2: JP 4282704 B2
Patent Document 3: JP 2010-121975 A
Patent Document 4: JP 4182444 B2
Patent Document 5: JP 2008-175733 A
Patent Document 6: JP 2013-44950 A
Patent Document 7: JP 2012-234150 A

SUMMARY OF THE INVENTION

Problems to be Solved by the Invention

This application aims to provide a sound signal processing device that performs speech detection with a higher degree of accuracy, a sound signal processing method, and a program.

Solutions to Problems

A first aspect of the present disclosure lies in a sound signal processing device that includes:

a directional point detecting unit that detects a directional point indicating a direction of arrival of a sound signal for each block formed through division by a predetermined time; and a directional point tracking unit that connects the directional points among the blocks, and detects a segment during which sound is emitted, wherein:

the directional point detecting unit includes:

a null beam pattern generating unit that generates a null beam pattern indicating directional characteristics with a relatively low sensitivity to the direction of arrival, the null beam pattern being a plot of a correspondence relationship between direction and sensitivity;

a directional point detection executing unit that detects a local minimum point of the null beam pattern as the direction of arrival;

a null beam pattern averaging unit that calculates an average null beam pattern that is the average of null beam patterns at a time when a non-speech-like signal is input; and a dynamic threshold calculating unit that calculates a dynamic threshold as the threshold to be used in detecting the local minimum point corresponding to the direction of arrival from the null beam pattern, the dynamic threshold being set at a slightly lower value than the average null beam pattern; and the directional point detection executing unit selects the local minimum point not greater than the dynamic threshold from the null beam pattern, and detects the direction corresponding to the selected local minimum point as the direction of arrival.

Further, in an embodiment of the sound signal processing device of the present disclosure, the directional point detecting unit includes a directionality pattern generating unit that generates a directionality pattern indicating directional characteristics with a relatively high sensitivity to the direction of arrival, and the directional point detection executing unit detects, as the direction of arrival, a direction having a combination of the local minimum point of the null beam pattern and a local maximum point of the directionality pattern.

Further, in an embodiment of the sound signal processing device of the present disclosure, the sound signal processing device includes a short-time Fourier transform unit that performs a short-time Fourier transform (STFT) on an observation signal obtained by microphones disposed at different positions, and converts the observation signal into an observation signal of a time-frequency domain, and the directional point detecting unit generates directional characteristics patterns by calculating a covariance matrix from the observation signal of the time-frequency domain, calculating eigenvectors by performing eigenvalue decomposition on the covariance matrix, and applying steering vectors of respective directions to the calculated eigenvectors, the directional characteristics patterns indicating relationships between direction and sensitivity.

Further, in an embodiment of the sound signal processing device of the present disclosure, the directional point detecting unit includes:

a directional characteristics pattern classifying unit that classifies the directional characteristics patterns into the three types:

(a) a directionality type having directional characteristics with a relatively high sensitivity to the direction of arrival;

(b) a null beam type having directional characteristics with a relatively low sensitivity to the direction of arrival; and (c) a neutral type not belonging to either of (a) and (b);

a directionality pattern generating unit that generates the directionality pattern from patterns classified as the directionality type, the directionality pattern indicating the directional characteristics with a relatively high sensitivity to the direction of arrival; and a null beam pattern generating unit that generates the null beam pattern from patterns classified as the null beam type, the null beam pattern indicating the directional characteristics with a relatively low sensitivity to the direction of arrival.

Further, in an embodiment of the sound signal processing device of the present disclosure, in the process of classifying the directional characteristics patterns, the directional characteristics pattern classifying unit performs a classification process by calculating a representative directionality pattern from the directional characteristics patterns belonging to the directionality type and a representative null beam pattern from the directional characteristics patterns belonging to the null beam type, and maximizing the distance scale between the calculated representative directionality pattern and the calculated representative null beam pattern.

Further, in an embodiment of the sound signal processing device of the present disclosure, the directional characteristics pattern classifying unit calculates the representative directionality pattern as the sum of the patterns belonging to the directionality type, and calculates the representative null beam pattern as the sum of the patterns belonging to the null beam type.

Further, in an embodiment of the sound signal processing device of the present disclosure, the distance scale is the Euclidean distance between the representative directionality pattern and the representative null beam pattern.

Further, in an embodiment of the sound signal processing device of the present disclosure, the directionality pattern generating unit calculates, as the directionality pattern, the average of the patterns classified as the directionality type, and the null beam pattern generating unit calculates, as the null beam pattern, the average of the patterns classified as the null beam type.

Further, in an embodiment of the sound signal processing device of the present disclosure, the directional point detecting unit is a configuration that generates the directional characteristics patterns indicating relationships between direction and sensitivity by calculating the covariance matrix from the observation signal of the time-frequency domain, calculating the eigenvectors by performing the eigenvalue decomposition on the covariance matrix, and applying the steering vectors of the respective directions to the calculated eigenvectors, and, in the process of generating the directional characteristics patterns, the directional point detecting unit generates the directional characteristics patterns by calculating the square of the gain of each direction in each frequency band, calculating an average squared gain or a total squared gain by calculating the average or the sum of the squares of the gains in the frequency bands, performing a logarithmic process on the average squared gain or the total squared gain, and performing a process of adjusting maximum values to 0.

Further, in an embodiment of the sound signal processing device of the present disclosure, the dynamic threshold calculating unit calculates the dynamic threshold set at a slightly lower value than the average null beam pattern, by performing at least one of a positive constant multiplication operation and a positive constant subtraction operation on the average null beam pattern.

Further, in an embodiment of the sound signal processing device of the present disclosure, the source signal processing device includes a speech likeliness determining unit that determines whether an input sound signal is speech-like in accordance with periodicity of the input sound signal, and the null beam pattern averaging unit calculates the average null beam pattern in accordance with a result of the determination performed by the speech likeliness determining unit, the average null beam pattern being the average of null beam patterns at a time when a non-speech-like signal is input.

Further, in an embodiment of the sound signal processing device of the present disclosure, the null beam pattern averaging unit updates the average null beam pattern by calculating a weighted average using a forgetting factor between the null beam pattern at a time when the speech likeliness determining unit determines the input sound signal to be non-speech-like and the average null beam pattern already calculated at the point of time.

Further, a second aspect of the present disclosure lies in a sound signal processing method to be implemented in a sound signal processing device, the sound signal processing method including:

a directional point detecting step in which a directional point detecting unit detects a directional point indicating a direction of arrival of a sound signal for each block formed through division by a predetermined time; and a direction tracking step in which a direction tracking unit connects the directional points among the blocks, and detects a segment, wherein:

the directional point detecting step includes:

a null beam pattern generation process to generate a null beam pattern indicating directional characteristics with a relatively low sensitivity to the direction of arrival, the null beam pattern being a plot of a correspondence relationship between direction and sensitivity;

a directional point detection process to detect a local minimum point of the null beam pattern as the direction of arrival;

a null beam pattern averaging process to calculate an average null beam pattern that is the average of null beam patterns at a time when a non-speech-like signal is input; and a dynamic threshold calculation process to calculate a dynamic threshold as the threshold to be used in detecting the local minimum point corresponding to the direction of arrival from the null beam pattern, the dynamic threshold being set at a slightly lower value than the average null beam pattern; and the directional point detection process is to select the local minimum point not greater than the dynamic threshold from the null beam pattern, and detect the direction corresponding to the selected local minimum point as the direction of arrival.

Further, a third aspect of the present disclosure lies in a program for causing a sound signal processing device to perform sound signal processing, the program causing the sound signal processing device to carry out:

a directional point detecting step in which a directional point detecting unit detects a directional point indicating a direction of arrival of a sound signal for each block formed through division by a predetermined time; and a direction tracking step in which a direction tracking unit connects the directional points among the blocks, and detects a segment, wherein:

the directional point detecting step includes:

a null beam pattern generation process to generate a null beam pattern indicating directional characteristics with a relatively low sensitivity to the direction of arrival, the null beam pattern being a plot of a correspondence relationship between direction and sensitivity;

a directional point detection process to detect a local minimum point of the null beam pattern as the direction of arrival;

a null beam pattern averaging process to calculate an average null beam pattern that is the average of null beam patterns at a time when a non-speech-like signal is input; and a dynamic threshold calculation process to calculate a dynamic threshold as the threshold to be used in detecting the local minimum point corresponding to the direction of arrival from the null beam pattern, the dynamic threshold being set at a slightly lower value than the average null beam pattern; and the directional point detection process is to select the local minimum point not greater than the dynamic threshold from the null beam pattern, and detect the direction corresponding to the selected local minimum point as the direction of arrival.

Note that, the program of the present disclosure is a program that can be provided in a computer-readable format from a storage medium or a communication medium to an image processing device or a computer system that can execute various program codes, for example. As such a program is provided in a computer-readable format, processes in accordance with the program are performed in an information processing device or a computer system.

Other objects, features, and advantages of the present disclosure will be made apparent by the embodiments of the present invention described below and the detailed descriptions with reference to the accompanying drawings. Note that, in this specification, a system is a logical assembly of devices, and does not necessarily mean devices with different configurations incorporated into one housing.

Effects of the Invention

According to an embodiment of the present disclosure, it is possible to achieve a device and a method for determining a speech segment with a high degree of accuracy from a sound signal in which different sounds coexist.

Specifically, directional points indicating the direction of arrival of the sound signal are connected in the temporal direction, and a speech segment is detected. In this configuration, pattern classification is performed in accordance with directional characteristics with respect to the direction of arrival, and a directionality pattern and a null beam pattern are generated from the classification results. Also, an average null beam pattern is also generated by calculating the average of the null beam patterns at a time when a non-speech-like signal is input. Further, a threshold that is set at a slightly lower value than the average null beam pattern is calculated as the threshold to be used in detecting the local minimum point corresponding to the direction of arrival from each null beam pattern, and a local minimum point equal to or lower than the threshold is determined to be the point corresponding to the direction of arrival.

With this configuration, a device and a method for determining a speech segment with a high degree of accuracy from a sound signal in which different sounds coexist can be achieved.

Note that, the advantageous effects described in this specification are merely examples, and the advantageous effects of the present technology are not limited to them and may include additional effects.

MODES FOR CARRYING OUT THE INVENTION

Figure 1:
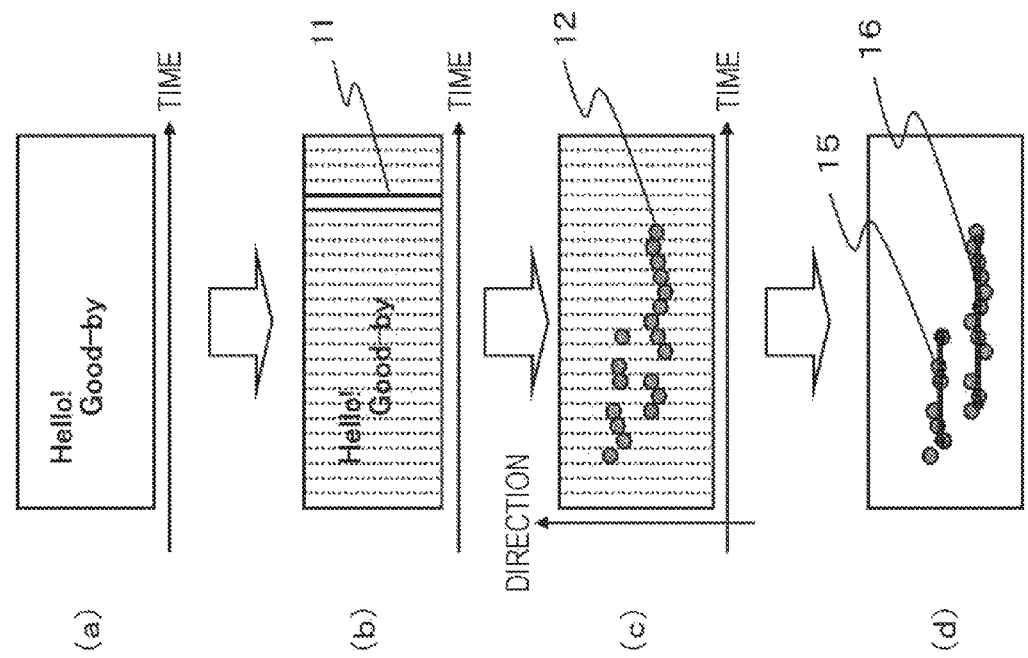
FIG. 1 is a diagram for explaining an example of a speech detection process accompanied by estimation of a direction of arrival.

The following is a detailed description of a sound signal processing device, a sound signal processing method, and a program of the present disclosure, with reference to the drawings.

Before the configuration and the process according to the present disclosure are described, the symbols to be used in this specification are explained below.

The symbols to be used in this specification have the meanings described below.

(1) "_" represents a subscript.

(Example) $\varphi\_\omega \ldots \omega$ is a subscript.

However, "_k" indicating a channel number will often appear, and therefore, "_" will be omitted.

(Example) $Y\_k(t) \rightarrow Yk(t)$.

In a case where there are two or more subscripts, the subscripts are put into { . . . }. (Example) $\theta\_\{i'\}$: i' are subscripts.

(2) "^" represents a superscript.

(Example 1) $W^H$: Hermitian transpose (=complex transpose) of W.

(Example 2) $Yk(t)^H$: Hermitian transposed vector (conjugated complex number and transpose) of $Yk(t)$.

(Example 3) $\Sigma^{(-1)}$: inverse matrix of variance-covariance matrix $\Sigma$. $inv(\Sigma)$ represents the same expression.

(3) "conj(X)" represents a conjugated complex number of a complex number X.

(4) "bar(x)" indicates that an overbar ("‾") is attached to x.

(5) Assignment of a value is represented by "=" or "←". Particularly, an operation in which the two sides do not have equality (such as "x←x+1") is invariably represented by "←".

Next, similar terms to be used in this specification are explained.

(1) "Sound (signal)" and "speech (signal)" are distinguished from each other. "Sound" is used in general terms, and is similar to "audio". "Speech" is used in restrictive terms, and is similar to "voice".

(2) "Directionality" and "directional characteristics" are distinguished from each other as follows.

"Directionality" means the opposite of a null beam, and indicates that the sensitivity in a particular direction is relatively high.

"Directional characteristics" are a plot indicating a relationship between direction and sensitivity, and formation of directionality in a direction of arrival and formation of a null beam are both directional characteristics.

The configuration and the process according to the present disclosure will be described in the sequence shown below.

1. Overview of a speech detection process
2. Influence of components that enter all the microphones in the same phase
3. Configuration that performs high-accuracy speech detection
3-1. Speech detection process to which a directional characteristics pattern classification process is applied
3-2. Speech detection process to which a process of dynamically changing a threshold through speech detection based on "speech likeliness" is applied
4. Example configuration of a sound signal processing device and example processes to be performed by the sound signal processing device according to the present disclosure
5. Sequences in the processes to be performed by the sound signal processing device
6. Effects of the processes to be performed by the sound signal processing device according to the present disclosure
7. Summary of the configuration of the present disclosure

[1. Overview of a Speech Detection Process]

First, processes according to the two existing methods described below are explained as an overview of a speech detection process.

As described above, speech detection (SD) is a process of cutting out a segment during which a person is speaking, from a sound signal that is continuously input. This process is also called voice activity detection (VAD).

Speech detection is often performed in conjunction with speech recognition and sound source extraction. To increase the degrees of accuracy of speech recognition and sound source extraction, speech detection (segment detection) needs to be performed with a high degree of accuracy.

Various speech detection methods have been designed to increase the degree of accuracy. In this description, speech detection methods are classified into the two types shown below in accordance with the numbers of microphones to be used.

(1) Method Using a Single Microphone

A feature quantity indicating "speech likeliness" is extracted from an input signal, and segment detection is performed in accordance with the value of the feature quantity. Such a method is disclosed in Patent Document 4 (JP 4182444 B2), for example.

(2) Method Using More than One Microphone

Segment detection is performed in accordance with a direction of a sound source. Such methods are disclosed in Patent Document 1 (JP 2012-150237 A), Patent Document 2 (JP 4282704 B2), and Patent Document 3 (JP 2010-121975 A), for example.

In the description below, a speech detection process disclosed in Patent Document 1 (JP 2012-150237 A) is explained as an example of the above "(2) method using more than one microphone".

The basic concept of speech detection based on a direction of arrival is as follows.

Sound being emitted from the same sound source arrives from the same direction with respect to the microphones. In view of this, a direction of arrival (DOA) is estimated at predetermined intervals, and a segment during which sound is continuously output from substantially the same direction is detected. In this manner, a segment during which the sound source is active (or the sound source is emitting sound) can be detected. Note that, hereinafter, a direction of arrival (DOA) will be simply written as a "direction of arrival".

With an arrival direction estimation method compatible with more than one sound source, segments can be determined with respect to the respective sound sources, even if two or more sound sources are active at the same time (or even if speeches of two or more persons overlap with one another, for example). In a case where another speaker has started speaking before a speaker ends his/her speech, for example, a long segment in which both speeches are joined to each other is detected as a speech segment by a method using "speech likeliness". By a method using direction estimation, on the other hand, the segments of the respective speeches can be detected.

Referring now to FIG. 1, an example of a speech detection process accompanied by estimation of a direction of arrival is described.

FIG. 1(a) is an image of an input signal (also called an "observation signal"), and indicates that there are two speakers who have said "Hello" and "Good-by", respectively. FIG. 1(a) shows a time axis that indicates a lapse of time from left to right.

As shown in FIG. 1(b), this input signal is divided into blocks of a predetermined length in the temporal direction. A block 11 shown in FIG. 1(b) represents one of the blocks formed through the division. The length of each block is much smaller than the length of a normal speech. For example, the length of each block is set at 0.01 to 0.1 seconds.

A direction of arrival is estimated in each of the blocks.

FIG. 1(c) shows the result. The abscissa axis indicates time, and the ordinate axis indicates direction. A direction is an angle θ (see FIG. 2) of a direction of arrival with respect to microphones to which speeches are input, for example.

The dots shown in FIG. 1(c) represent directional points 12. The directional points indicate the directions of arrival determined in the respective blocks.

Note that, hereinafter, a point corresponding to a direction of arrival will be referred to as a "directional point". By the direction estimation method compatible with more than one sound source, each block may have more than one directional point.

The directional points of almost the same direction are then connected among the blocks. This process is called tracking.

FIG. 1(d) shows the result of the tracking, or the connected directional points.

Lines 15 and 16 shown in FIG. 1(d) represents the segments during which the respective sound sources are active, or the segments during which speeches are emitted.

In Patent Document 1 (JP 2012-150237 A), a technique developed by improving the MUSIC (MUltiple SIgnal Classification) method is used as the technique for determining a direction of arrival in each block.

By the conventional MUSIC method, a spatial filter (a null beam filter) with which a null beam is oriented in a direction of arrival is generated, and the direction of the null beam is regarded as the direction of arrival.

In Patent Document 1 (JP 2012-150237 A), however, a filter (a directionality filter) with which a high-sensitivity directionality is oriented in a direction of arrival is generated as well as a null beam filter, and a direction of arrival is estimated by using both the direction of the null beam and the direction of the high-sensitivity directionality.

That is, Patent Document 1 (JP 2012-150237 A) discloses a process in which the filters to be used in a process of estimating a direction of arrival are the following two filters:

a "directionality filter" as a spatial filter with which a directionality is oriented in a direction of arrival; and a "null beam filter" as a spatial filter with which a null beam is oriented in a direction of arrival.

Figure 2:
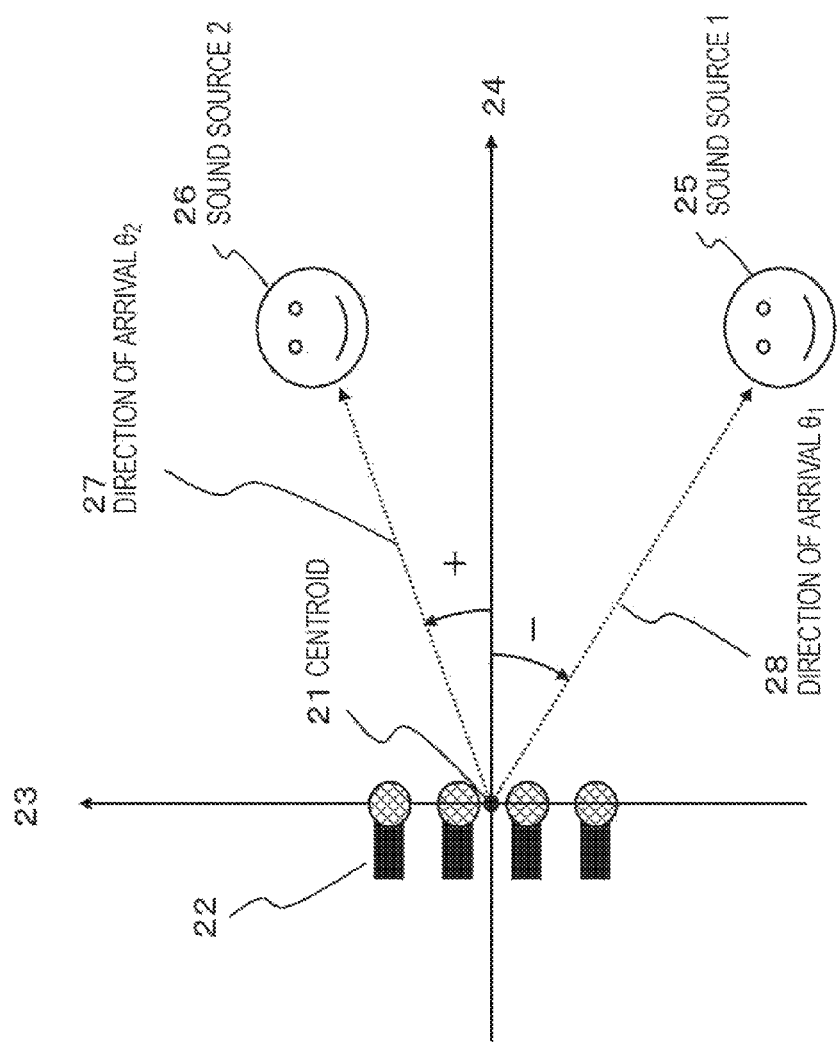
FIG. 2 is a diagram showing an example of a situation where an observation signal for generating a "directionality filter" and a "null beam filter" is recorded.

FIG. 2 is a diagram showing an example of a situation where an observation signal for generating a "directionality filter" and a "null beam filter" is recorded. There exist four microphones 22 and two sound sources (each being a speech of a person).

A direction of arrival is an angle (θ) indicating a direction arrival with respect to the centroid 21 of the array of the microphones 22. Where the direction 24 perpendicular to the direction 23 of alignment parallel to the array of the microphones is 0 degrees, counterclockwise rotation is positive (+), and clockwise rotation is negative (−).

The sounds recorded with the four microphones 22 shown in FIG. 2 vary in arrival time depending on the installation positions of the microphones 22, and therefore, there is a phase difference between sound signals recorded with different microphones. By analyzing the sound signals, it is possible to generate a "directionality filter" as a spatial filter with which the directionality is oriented in the direction of arrival, and a "null beam filter" as a spatial filter with which the null beam is oriented in the direction of arrival.

Figure 3:
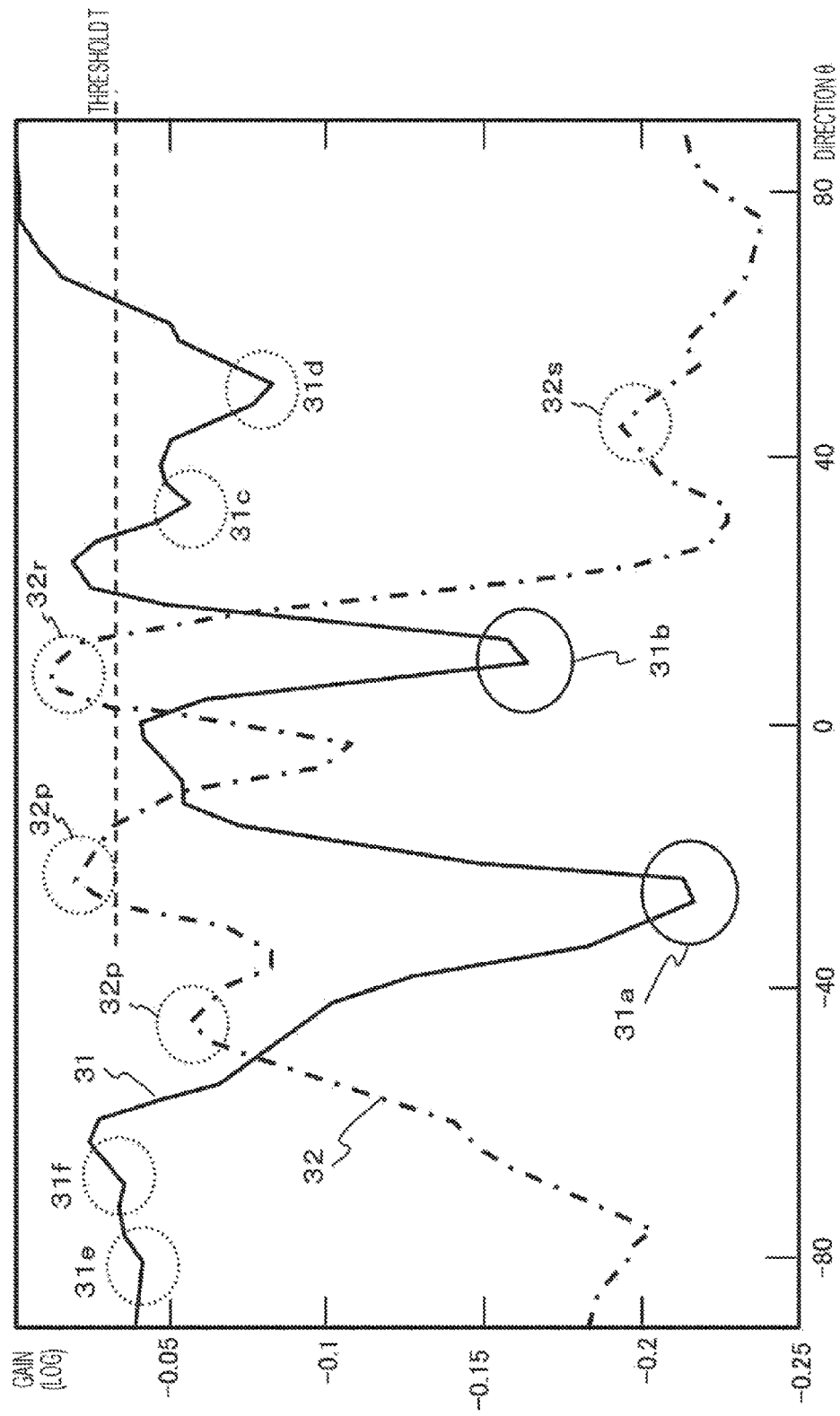
FIG. 3 is a diagram for explaining an example of a null beam pattern and an example of a directionality pattern.

A null beam pattern 31 shown in FIG. 3 is formed by plotting the directional characteristics of a spatial filter with which the null beam is oriented in a particular direction of arrival, or by plotting the relationship between direction (abscissa axis) and gain (ordinate axis). The ordinate axis indicates logarithm. The method of generating the directional characteristics graphs will be described later.

The spatial filter with which the null beam is oriented toward the sound source is called the "null beam filter", and the graph of the directional characteristics of the filter is called the "null beam pattern".

The points where the gain rapidly drops in the null beam pattern 31 shown in FIG. 3 indicates directions in which the sensitivity is relatively low, or null beams. In this graph, deep "valleys" exist at a point 31a near a direction of −24 degrees and at point 31b near a direction of +12 degrees. These valleys are the null beams corresponding to a sound source 1,25 and a sound source 2,26 shown in FIG. 2.

That is, the local minimum points 31a and 31b are true local minimum points corresponding to actual sound sources.

The direction θ1 of the sound source 1 is approximately −24 degrees, and the direction θ2 of the sound source 2 is approximately +12 degrees. In other words, the block corresponding to this null beam pattern has directional points at −24 degrees and +12 degrees.

Note that, according to the MUSIC method, the reciprocal of a gain may be used, instead of the logarithm of the gain. For example, Patent Document 5 (JP 2008-175733 A) discloses a method using reciprocals. In that case, a null beam is represented by a sharp peak in a graph. In the present disclosure, a method using the logarithms of gains is described, for a comparison with the later described directionality pattern. It is also possible to use gains or the squares of gains. Hereinafter, a gain or an amount equivalent to a gain will be expressed as a "sensitivity".

A directionality pattern 32 shown in FIG. 3 represents the directional characteristics of a spatial filter with which the directionality is oriented in the direction of arrival in the same block. That is, the directionality pattern 32 is a filter with a relatively high sensitivity to the direction of arrival.

The spatial filter with which the directionality is oriented in the direction of arrival is called the "directionality filter", and the graph of the directional characteristics of the filter is called the "directionality pattern".

According to the conventional MUSIC method (a method disclosed earlier than Patent Document 5 (JP 2008-175733 A)), a direction of arrival is estimated from the position of a local minimum (a direction in which the sensitivity is relatively low) of a null beam pattern. On the other hand, Patent Document 5 (JP 2008-175733 A) discloses a method of estimating a direction of arrival from a local minimum of a null beam pattern and a local maximum (a direction in which the sensitivity is relatively high) of a directionality pattern.

In the null beam pattern 31 shown in FIG. 3, for example, the local minimum points 31a and 31b are the true local minimum points corresponding to the directions of arrival. Other than the local minimum points 31a and 31b, the null beam pattern 31 has local minimum points 31c through 31f that are local minimum points unrelated to actual directions of arrival.

To exclude these local minimum points unrelated to actual directions of arrival, local maximum points are detected from the directionality pattern 32. These local maximum points are the local maximum points 32p through 32s shown in FIG. 3.

Only the points where a local minimum point of the null beam pattern 31 and a local maximum point of the directionality pattern 32 are close to each other in terms of direction are selected as the directional points indicating the actual directions of arrival.

As a result, only the three local minimum points 31a, 31b, and 31d of the null beam pattern 31 can be selected as true directional points.

In the description below, a local minimum position in a null beam pattern or a directionality pattern will be also expressed as a "valley", and a local maximum position will be also expressed as a "peak". Also, a local maximum point, a local minimum point, or a directional point corresponding to the direction of an actual sound source is "true", and a local maximum point, a local minimum point, or a directional point not corresponding to the direction of any actual sound source is "false" (any sound source does not exist in that direction). Also, in a case where a time and a direction in which only a non-speech sound source exists are detected as a speech segment, the detected segment is expressed as a "false segment".

Note that, although the directional point corresponding to the local minimum point 31d of the null beam pattern 31 shown in FIG. 3 is wrongly detected, this directional point will be discarded in a later tracking process and not cause any problem, as long as this wrong detection occurs only in this block.

According to Patent Document 1 (JP 2012-150237 A), the processes described below are further performed.

(1) A threshold (threshold T shown in FIG. 3) is set for the null beam pattern, and shallower valleys than the threshold T are discarded.

(2) The maximum number of null beams formed with n microphones is n−1, and therefore, the maximum number of directional points is set at n−1.

The null beam pattern and the directionality pattern both have small peaks and valleys. If the condition for detecting a directional point is whether the direction of a valley of the null beam pattern is almost the same as the direction of a peak of the directionality pattern, the two directions may match each other by coincidence, and a false directional point is wrongly detected as a true directional point. However, wrong detection can be reduced by adding the above processes (1) and (2).

The problems with conventional arrival direction estimation methods including the arrival direction estimation method disclosed in Patent Document 1 (JP 2012-150237 A) are the following two aspects.

(1) Influence of "incidental valleys" of the null beam pattern (2) Influence of components that enter all the microphones in the same phase First, the (1) influence of "incidental valleys" of the null beam pattern is described.

One of the problems is the influence of false valleys in the null beam pattern. As shown in FIG. 3, false valleys not corresponding to any sound source may exist in the null beam pattern. Such false valleys are the local minimum points 31c through 31f shown in FIG. 3.

If these false valleys temporarily appear in one block, the false valleys will be discarded in the directional point tracking process, and not cause any problem. However, if such false valleys continuously appear in two or more blocks, wrong segment detection is caused.

Some false valleys accompany true deep valleys and appear in different directions from the positions of true sound sources. Such false valleys will be hereinafter referred to as incidental valleys. One of the causes of an incidental valley is a spatial alias. A spatial alias is a phenomenon in which a null beam or a directionality appears in a different direction from a desired direction at higher frequencies than a certain level. The lower limit frequency at which a spatial alias appears depends on the distance between the microphones. Since false valleys originating from spatial aliases vary in direction among frequency bins, the influence of such false valleys can be reduced by averaging the directional characteristics patterns among the frequency bins, but remains without being completely eliminated. In such a case, a false valley appears in a fixed position depending on the position of a true sound source. Furthermore, the causes of some incidental valleys cannot be clearly identified. Therefore, the problem of incidental valleys remains, even if measures against spatial aliases are taken.

Figure 4:
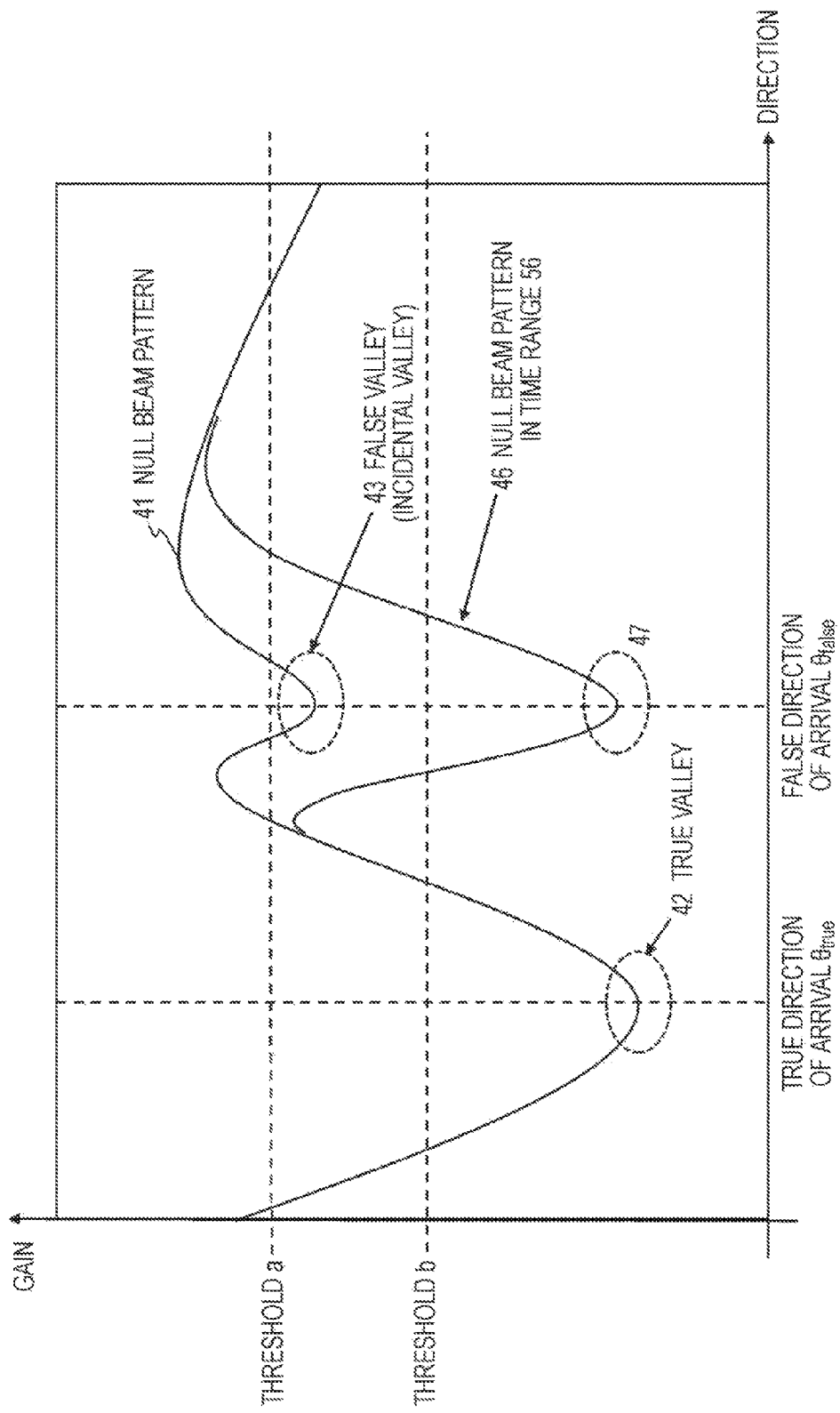
FIG. 4 is a diagram for explaining an example of a true valley and an example of an incidental valley.

Referring now to FIG. 4, an example of a true valley and an example of an incidental valley are described.

A null beam pattern 41 has a valley in a true direction of arrival ($\theta$_true) and a valley in a false direction of arrival ($\theta$_false). These valleys are a true valley 42 and a false valley 43

A sound source exists only in the true direction of arrival (θ_true). That is, a sound source exists in the direction indicated by the true valley 42, and any sound source does not exist in the direction indicated by the false valley 43.

The false valley 43 shown in FIG. 4 is an incidental valley. Specifically, the formation of the true valley 42 in the true direction of arrival (θ_true) triggers formation of a valley even though any sound source does not exist in the false direction of arrival (θ_false).

Where such an incidental valley appears, any speech emitted from the false direction of arrival (θ_false) is not detected. This phenomenon is described below.

The sound source existing in the true direction of arrival (θ_true) is a non-speech sound source that constantly emits sound. Examples of such a sound source include a fan of a projector that is emitting sound, and a speaker of a device that is playing music. As long as such a sound source emits sound, two valleys are formed, though there exists only one sound source.

To select the true direction of arrival from the null beam pattern 41, the use of a threshold with respect to sensitivity is effective, as described above with reference to FIG. 3, for example.

However, in a case where this threshold is set in a shallower position than the false valley 43 that is an incidental valley in the null beam pattern 41, or in a case where this threshold is set in the position of a threshold a, for example, both the true valley 42 and the false valley 43 are regarded as valleys corresponding to sound sources.

Even if the false valley 43 is regarded as a valley corresponding to a sound source, detection of θ_false as a direction of arrival can be prevented, as long as there exist no peaks near the valley (near θ_false) in the directionality pattern. In reality, however, a false peak may exist near θ_false in the directionality pattern. In such a case, a false directional point is detected at θ_false.

In a case where two directional points are detected as above, these two directions are tracked in the temporal direction, and, as a result, two segments are detected.

Figure 5:
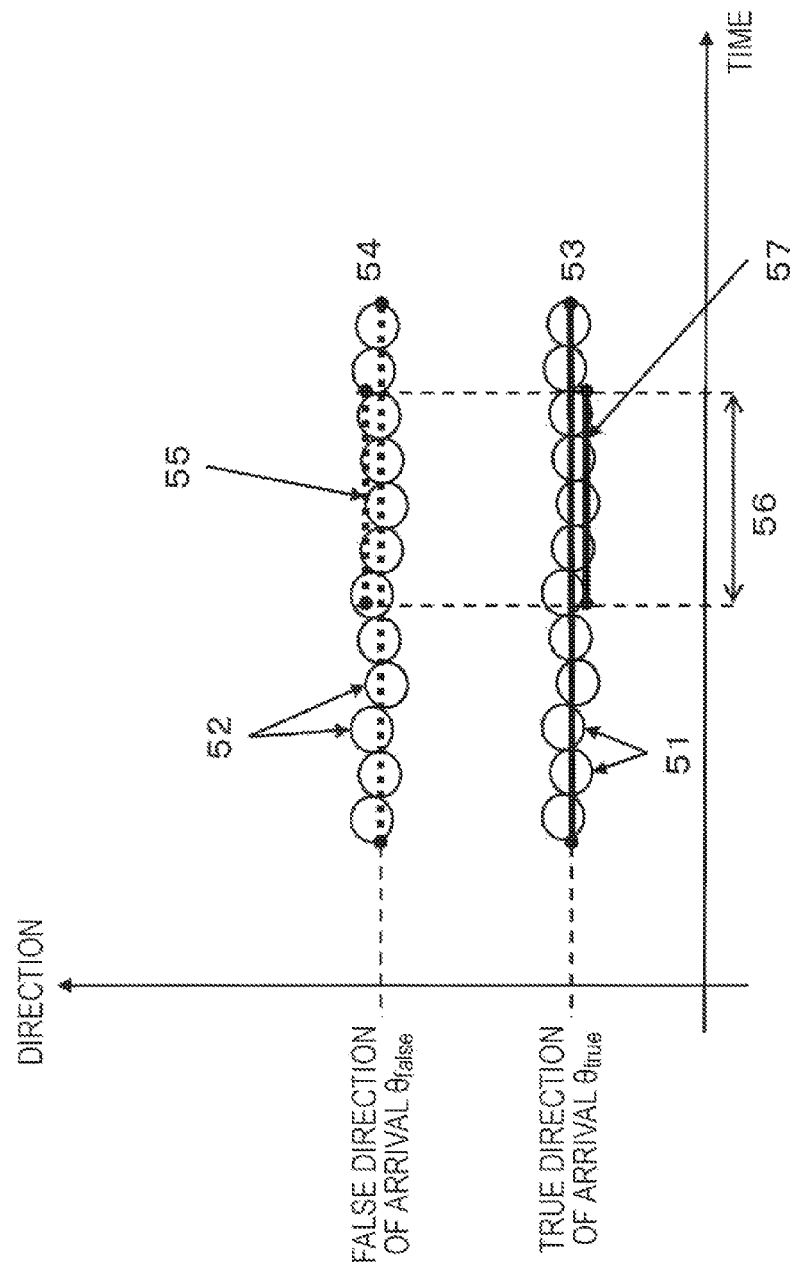
FIG. 5 is a diagram for explaining an example of detection of two segments through a temporal-direction tracking process in a case where two directional points are detected.

Specifically, as shown in FIG. 5, the directional points 51 corresponding to the true direction of arrival (θ_true) are connected in the temporal direction, and the directional points 52 corresponding to the false direction of arrival (θ_false) are connected in the temporal direction. As a result, a segment 53 and a segment 54 are detected as two segments having different directions. This phenomenon is called dual detection.

The dual detection with respect to the non-speech sound source that constantly emits sound can be dismissed by setting an upper limit on segment lengths, for example. Specifically, the sound source that emits sound without a pause (silence) can be considered a non-speech sound source (or at least different from the current speech to be subjected to speech recognition). In view of this, when the length of a segment during the tracking exceeds the upper limit value (five seconds, for example), the segment is discarded. As a result, the segment 53 corresponding to the sound source (being non-speech), and the segment 54 as a false segment are discarded.

However, discarding the segment 54 as a false segment is accompanied by a side effect. This is a phenomenon in which a speech actually emitted from the false direction of arrival (θ_false) is also discarded. For example, during a period indicated by a time range 56, a person emits a speech from the false direction of arrival (θ_false). Outside the time range 56, θ_false is a false direction of arrival. Within the time range 56, however, θ_false is a true direction of arrival corresponding to a sound source.

If the false valley 43 as an incidental valley originating from a non-speech has not been formed in the null beam pattern 41 shown in FIG. 4 in this case, the segment 54 shown in FIG. 5 is not detected. Instead, a segment 55 originating from a speech of a person should be detected within the time range 56.

If the false valley 43 as an incidental valley originating from a non-speech has already been formed in the null beam pattern 41 shown in FIG. 4, however, the segment 55 originating from a speech of a person blends in and integrates with the segment 54 within the time range 56 shown in FIG. 5. As a result, the speech segment originating from the speech of the person cannot be accurately detected.

There are several types of segment blending phenomenon. In some cases, a false valley originating from spatial aliasing and a true valley originating from a speech of a person appear almost in the same position, and the two valleys are combined into a deep valley. As a result, only one directional point is detected in the direction θ_false. In some other generation process, a false valley (originating from spatial aliasing or the like) and a true valley (originating from a speech) are formed near θ_false, and two directional points are detected accordingly. However, the adjacent directional points are connected in the later tracking process, and are combined into one segment.

In either case, the segment 55 shown in FIG. 5 is not detected as a result of the tracking, and only the segment 54 and the segment 53 are output as detection results. After the two segments are discarded because of the above described length restriction, the segment 55 corresponding to a speech appears completely undetected, even if the segment 55 satisfies the length condition.

Note that, in addition to the speech detection using a directional point tracking process, the speech detection method based on "speech likeliness" disclosed in Patent Document 4 (JP 4182444 B2) is used, so that the segment 55 and the segment 54 shown in FIG. 5 can be detected separately from each other. However, the use of this method is accompanied by another side effect. This side effect is described below.

As described above, the directional points 51 and the directional points 52 in FIG. 5 correspond to input signal blocks of a predetermined length. That is, these directional points correspond to the blocks formed through the division in the temporal direction described above with reference to FIG. 1.

A check is made to determine whether the input signal in each block has "speech likeliness", and the directional points are left only in the blocks determined to be "speech-like". In this manner, the directional points in the blocks outside the time range 56 shown in FIG. 5 are discarded, ideally even if a non-speech sound source constantly emits sound. As a result, no segments are detected in the blocks outside the time range 56.

Note that, within the time range 56 shown in FIG. 5, an input signal is a mixture of non-speech components and a speech, but the input signal maintains periodicity as long as the proportion of the speech in the input signal is higher than a certain level. In view of this, the input signal within the time range 56 is determined to be "speech-like" by the method disclosed in Patent Document 4 (JP 4182444 B2). Consequently, the segment 55 does not blend in the segment 54, and is correctly detected.

However, within the time range 56, the directional points in the true direction of arrival (θ_true) are not discarded but do remain. As a result, a segment 57 that is part of the segment 51 is detected as a speech segment. Since the length of the segment 57 is the same as the length of the segment 55, the segment 57 also satisfies the above described length condition as long as the segment 55 satisfies the length condition. Consequently, a false segment corresponding to the true direction of arrival (θ_true) is detected, though no one is speaking from that direction.

Furthermore, the determination as to "speech likeliness" is imperfect, and there is a possibility of wrong determination. Therefore, if only the directional points in "speech-like" blocks are left, the influence of the wrong determination becomes larger. For example, if more than a certain number of consecutive blocks within the time range 56 shown in FIG. 5 are determined to be "non-speech-like" while a speech is being emitted, one speech is divided into two segments. Note that, since the example shown in FIG. 5 is an example of dual detection, one speech is detected as four different segments due to this dividing phenomenon.

If more than a certain number of consecutive blocks outside the time range 56 are determined to be "speech-like", on the other hand, a speech segment is detected though no speech has been emitted, and even dual detection may occur. For example, music has periodicity. Therefore, if a method of determining "speech likeliness" based on periodicity as disclosed in Patent Document 4 (JP 4182444 B2) is used in a case where the interfering sound is music, a "speech-like" block may be wrongly detected while only the music is being played. As a result, the above phenomenon might occur.

Note that, since an incidental valley is normally deeper than a true valley, the problems with an incidental valley can be avoided in principle, if the threshold for the null beam pattern can be appropriately set. For example, a speech is emitted from the false direction of arrival (θ_false) within the time range 56, and the null beam pattern 41 shown in FIG. 4 changes as indicated by a null beam pattern 46. Although a valley 47 exists in the false direction of arrival (θ_false) in the null beam pattern 46, this valley 47 is a true valley corresponding to the sound source, which is the speaker, and is deeper than the false valley 43 as an incidental valley.

If the threshold for the null beam pattern is set at a level between the false valley 43 of the null beam pattern 41 and the valley 47 of the null beam pattern 46 as indicated by a threshold b shown in FIG. 4, the false valley 43 of the null beam pattern 41 is not detected but the valley 47 of the null beam pattern 46 can be detected in the false direction of arrival (θ_false). As the threshold b is set, directional points are detected only when a sound source actually exists. Thus, the problems such as an undetected speech and dual detection shown in FIG. 5 do not occur.

However, the depths of incidental valleys vary with the directions of sound sources and the states (such as sound volumes) of the sound sources, and therefore, it is difficult to set a threshold at an appropriate level beforehand in practice.

Also, a threshold is determined from other factors. If a threshold is determined mainly to prevent the influence of an incidental valley, a side effect appears, and a speech emitted from a different direction from the true direction of arrival (θ_true) and the false direction of arrival (θ_false) might not be easily detected. That is, a deep threshold makes it difficult for directional points to be detected. As a result, a detected segment might be shorter than the actual speech, or one speech might be divided into two or more segments before detection.

The summary of the problems with an incidental valley is as follows.

In a case where the threshold is shallow, and any upper limit is not set on segment lengths, a speech segment is detected in the direction of an interfering sound, and a speech segment is also detected in the direction of an incidental valley though any speech has not been emitted, as long as there exists the interfering sound. This is called dual detection.

If an upper limit is set on segment lengths, any speech segment in the direction of an interfering sound is not detected. However, there is a side effect, and a speech emitted from the direction of an incidental valley is discarded.

In conjunction with speech detection based on "speech likeliness", a speech emitted from the direction of an incidental valley is detected, if the speech detection is performed in an ideal manner. However, the problem of dual detection remains. Also, in a case where the speech detection based on "speech likeliness" is wrongly performed, the influence of the wrong detection is large.

If the threshold for the null beam pattern is appropriately adjusted, the problems can be solved. However, the appropriate value varies with environments and the like, and therefore, it is difficult to solve the problems with a fixed value that is set in advance.

[2. Influence of Components that Enter all the Microphones in the Same Phase]

A phenomenon similar to the above described "incidental valley" is the influence of components that enter all the microphones constituting the microphone array 22 shown in FIG. 2 in the same phase, for example. Such components are mainly of the following two kinds.

(1) Vibration of the Housing Picked Up by the Microphones (2) Electrical Noise

In a system having all the microphones disposed in the same housing, for example, when the housing vibrates, each microphone might pick up the vibration as sound. Normally, vibration in a housing propagates at a higher speed than sound waves propagating in the air. Therefore, the vibration is observed as sound signals in almost the same phase by all the microphones. Also, when electrical noise appears before an analog speech signal obtained by the microphones is converted into a digital signal by an AD converter, this noise is also observed as sound signals in almost the same phase by all the microphones. Hereinafter, these signals will be referred to as "same-phase entering components".

Same-phase entering components might affect the speech detection based on estimation of directions of arrival, even if the S/N ratio is low (or an input signal sounds low to the ears, compared with the target sound). This is because a sound emitted from a sound source in a certain direction might reach all the microphones at the same time, and the sound is not distinguished from the same-phase entering components in terms of the phase.

For example, in the configuration shown in FIG. 2, a virtual sound source exists in a direction 24 expressed by θ=0. If the distance from the sound source to the microphone array centroid 1 is sufficiently longer than the distance between the microphones, sound waves emitted from the sound source can be regarded as plane waves at the time when the sound waves reach the microphone array, and therefore, sound from the sound source at θ=0 can reach the respective microphones in the microphone array at the same time.

In other words, the sound source existing in the direction θ=0 and the same-phase entering components are the same in terms of the phase difference between the microphones. Therefore, if there exist a same-phase entering component, a false valley is formed at the position θ=0 in the null beam pattern, and this false valley will cause problems similar to those with an incidental valley.

That is, a long false segment is detected in the direction θ=0 even when no speech is being emitted. If an upper limit is set on segment lengths so as to discard the long false segment, a speech emitted from the direction θ=0 is also discarded. If the threshold for the null beam pattern can be appropriately set, a speech from the direction θ=0 can be detected. However, it is difficult to set such a threshold in advance. Particularly, when there also is a problem due to an incidental valley, it is extremely difficult to determine beforehand such an appropriate threshold as to solve both problems at the same time.

Note that, the problem of the same-phase entering components can be avoided by changing the arrangement of the microphones. If the microphones are three-dimensionally arranged, for example, sound from any direction reaches the respective microphones at different times, and accordingly, the sound can be distinguished from the same-phase entering components. That is, any false null beam does not appear at the position θ=0 in the null beam pattern, and accordingly, discarding of a speech emitted from the direction θ=0 can be avoided. However, this also means that restrictions are put on the arrangement of the microphones, and therefore, it is preferable to avoid the problems by some other method if possible.

[3. Configuration that Performs High-Accuracy Speech Detection]

As described above, a wrong process might be performed in a speech detection process in a case where a non-speech sound not to be subjected to segment detection is generated, or in a case where a speech is emitted from a certain direction of arrival (such as the direction θ=0 shown in FIG. 2).

The following is a description of a speech detection process that solves those problems.

The processing method described below newly employs the two processes described below.

1. A speech detection process to which a directional characteristics pattern classification process is applied
2. A speech detection process to which a process of dynamically changing a threshold through speech detection based on "speech likeliness" is applied These processes are described below.

[3-1. Speech Detection Process to which a Directional Characteristics Pattern Classification Process is Applied]

First, a speech detection process to which a directional characteristics pattern classification process is applied is described.

The "incidental valley" and the "same-phase entering components" described above as problems are caused due to the existence of a false valley or peak in a directional characteristics pattern.

Such a false valley or peak is one of the relatively small valleys and peaks in a directional characteristics pattern. Therefore, if directional characteristics patterns with fewer small valleys and peaks can be generated, the occurrence of the problems can be reduced.

Note that, in the description below, the "directional characteristics patterns" means general patterns having various directional characteristics, including patterns having different directional characteristics, such as:

a. a "directionality pattern" having a direction of arrival as a high-sensitivity direction; and
b. a "null beam pattern" having a direction of arrival as a low-sensitivity direction.

To reduce the small valleys and peaks in the "directional characteristics patterns" having various directional characteristics, such as a "directionality pattern" and a "null beam pattern", the largest possible number of directional characteristics patterns having substantially the same properties are generated, and the average or the like of these directional characteristics patterns should be calculated. Examples of techniques for increasing the number of directional characteristics patterns to be generated, and calculating the average of these directional characteristics patterns include the following two methods:

a) the average of null beam patterns and the average of directionality patterns among frequency bins (or almost all the frequency bins) are calculated; and
b) the average of null beam patterns and the average of directionality patterns in one frequency bin are calculated.

The above technique b) is further described. Where eigenvalue decomposition is performed on an observation signal covariance matrix in each frequency bin, and a directional characteristics pattern is generated for each eigenvector according to the MUSIC method, m of n directional characteristics patterns ideally have such characteristics that a directionality is formed in a direction of arrival, and the remaining n-m of the n directional characteristics patterns ideally have such characteristics that a null beam is formed in a direction of arrival. Note that, here, n represents the number of microphones, and m represents the number of sound sources.

If directional characteristics patterns can be appropriately classified, directional characteristics patterns with fewer valleys and peaks can be generated by calculating the averages in the respective groups.

Classification of directional characteristics is performed in conventional cases. In the conventional classification process, however, the number m of sound sources is estimated first. Such a technique is disclosed in Patent Document 3 (JP 2010-121975 A), for example.

In an actual environment, however, it is difficult to estimate the number of sound sources. In view of this, a method of directly classifying directional characteristics patterns in accordance with similarities is newly introduced in the present disclosure. This method is described below.

Directional characteristics patterns are to be classified into the three types shown below. Then, a null beam pattern and a directionality pattern are the average of the patterns belonging to the null beam type and the average of the patterns belonging to the directionality type, respectively.

(Type 1) null beam type (one or more)
(Type 2) directionality type (one or more)
(Type 3) neutral type (zero or more)

The null beam type is a type having such directional characteristics that a null beam is oriented in a direction of arrival, the directionality type is a type having a directionality oriented in a direction of arrival, and the neutral type is a type not belonging either of the above two types.

The reason why the neutral type is prepared is that some directional characteristics patterns generated from observation signals in an actual environment do not have a very clear directionality or a null beam, and such patterns should not be unreasonably classified as the null beam type or the directionality type.

However, if the above classification is performed without any constraint, 3^n combinations exist. If such classification is performed in each frequency bin, the amount of calculation becomes larger.

To reduce the amount of calculation, the following restrictions are introduced. In the description below, P_k represents the directional characteristics pattern corresponding to the kth eigenvalue and eigenvector, and the eigenvalues are arranged in descending order. That is, the largest eigenvalue is the first eigenvalue, and the smallest eigenvalue is the nth eigenvalue.

Restriction 1: P_1 is invariably a directionality pattern, and P_n is invariably a null beam pattern.

Restriction 2: the patterns to be classified as the directionality type are P_1 through P_a, and the patterns to be classified as the null beam type are P_{n−b+1} through P_n (inclusive of both ends in each group).

The patterns to be classified as the neutral type are P_{a+1} through P_{n−b}, but the number of these patterns may be zero.

Restriction 3: the values of a and b are the same among all the frequency bins.

If the pattern P_k is classified as a null beam pattern in a frequency bin, for example, the pattern P_k in any other frequency bin is also classified as a null beam pattern.

The restriction 3 is particularly important, and directional characteristics patterns in the respective frequency bins can be classified after the average (or the sum, as in the cases described below) of the directional characteristics patterns among the frequency bins is calculated. By virtue of these restrictions, the number of combinations decreases to n(n−1)/2, and classification should be performed not in each frequency bin but only once in total.

The number of real sound sources might differ among the frequency bins. However, the restriction 3 is also effective in such a case. In a case where the number of sound sources in each frequency bin is two or three, for example, the patterns P_1 and P_2 are formed with the averages of directionality-type patterns, the pattern P_3 is formed with the average of directionality-type patterns and null-beam-type patterns, and the patterns P_4 and later are formed with the averages of null-beam-type patterns. As a result, the pattern P_3 is highly likely to be classified as the neutral type, and therefore, will not affect either of the directionality pattern and the null beam pattern.

In the example case described above with reference to FIG. 3, the directional characteristics patterns are formed with logarithms with respect to gains in the respective directions of filters. In the present disclosure, however, the timing to determine the logarithms is changed. After the average (or the sum) of the squares of the gains in the respective directions among the frequency bins is calculated, the logarithms are determined.

As the logarithmic operation is performed after the averaging operation, the number of small valleys and peaks in the directional characteristics patterns becomes smaller than in a case where the averaging operation is performed after the logarithmic operation. Accordingly, the phenomenon in which a false directional point is detected as a small (but lower than the threshold) valley in the null beam pattern and a small peak in the directionality pattern come close to each other by coincidence hardly occurs. Further, the pattern classification process is performed after the logarithms are determined. In the classification, patterns having valleys in the same position should be classified as one type. In view of this, the logarithms are determined, to emphasize the valleys in the directional characteristics.

The directional characteristics pattern classification process is simplified by the introduction of the above restrictions. An overview of this process is now described, with reference to FIG. 6. The example process shown in FIG. 6 is an example process to be performed in a case where the number n of microphones is set at 4.

Figure 6:
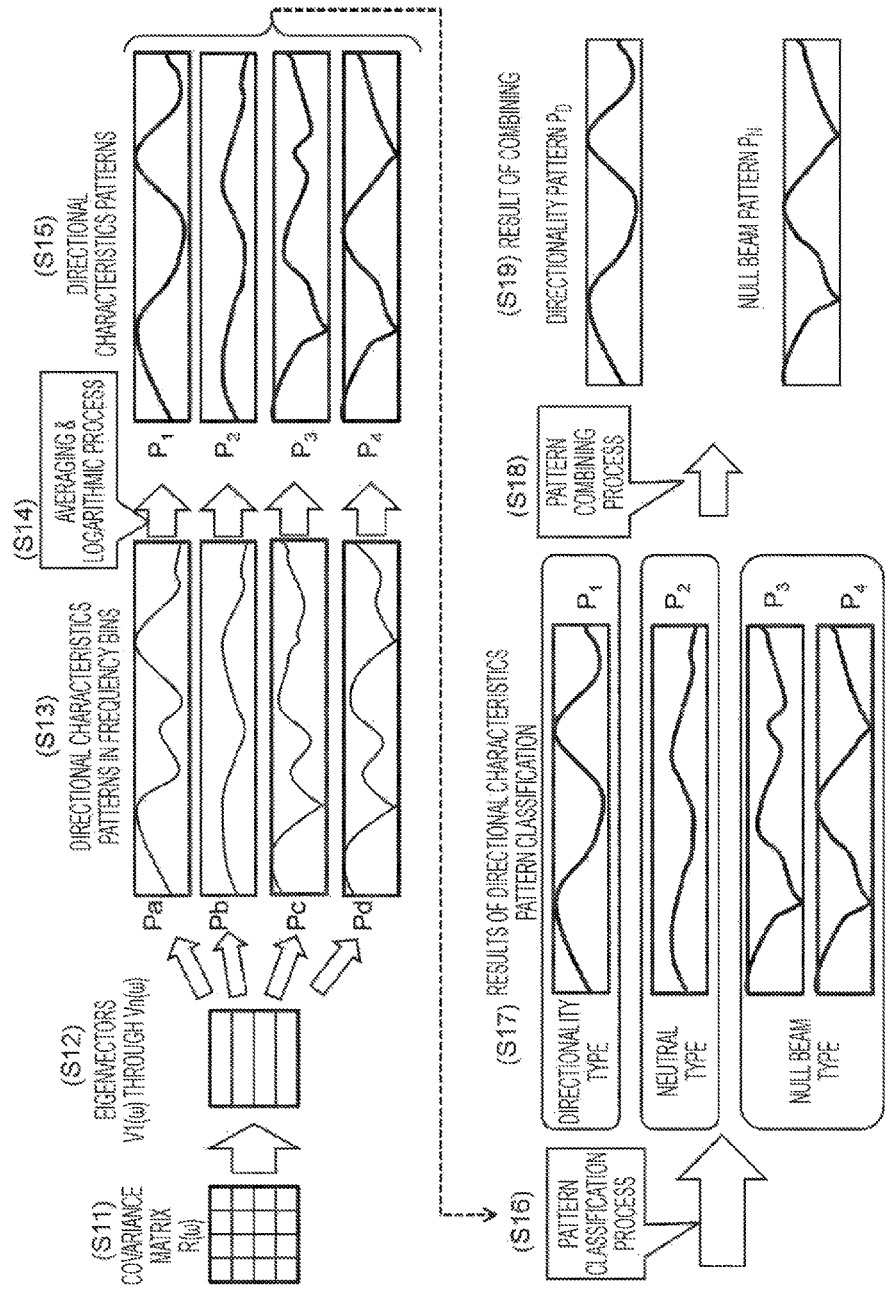
FIG. 6 is a diagram for explaining an example of a process to be performed by the sound signal processing device of the present disclosure to generate a directionality pattern and a null beam pattern through a directional characteristics pattern classification process.

First, in step S11 shown in FIG. 6, a covariance matrix is calculated. This is a covariance matrix of observation signals, and is generated according to the MUSIC method.

The covariance matrix calculation process is described, with reference to the equations shown below.

[Mathematical Formula 1]

$$X(\omega, t) = \begin{bmatrix} X_1(\omega, t) \\ \vdots \\ X_n(\omega, t) \end{bmatrix} \quad [1.1]$$

$$R(\omega) = \langle X(\omega, \tau) X(\omega, \tau)^H \rangle_{t-L' < \tau \leq t} \quad [1.2]$$

$$R(\omega) = V(\omega) \Lambda(\omega) V(\omega)^H \quad [1.3]$$

$$V(\omega) = [\, V_1(\omega) \;\; \ldots \;\; V_n(\omega) \,] \quad [1.4]$$

$$\Lambda(\omega) = \begin{bmatrix} \lambda_1(\omega) & & 0 \\ & \ddots & \\ 0 & & \lambda_n(\omega) \end{bmatrix} \quad [1.5]$$

The result of a short-time Fourier transform (STFT) performed on a signal observed by the kth microphone among the n microphones is represented by $X_k(\omega, t)$, and a vector formed with $X_1(\omega, t)$ through $X_n(\omega, t)$ is represented by $X(\omega, t)$ (equation [1.1]).

In this equation, $\omega$ represents the frequency bin number ($\omega=1, 2, \ldots, M$), and t represents the frame number.

Next, for each frequency bin $\omega$, a covariance matrix $R(\omega)$ of $X(\omega, t)$ is calculated from frames (equation [1.2]).

In the equation [1.2], $\langle \cdot \rangle\_{t-L' < \tau \leq t}$ indicates calculating the average of the values in the brackets among the frames that satisfy $t-L' < \tau \leq t$.

In the equation, t represents the frame number at the end of the block, L' represents the length of the block (the number of frames), and $t-L'+1$ represents the frame number at the start of the block.

Note that, the block may be the block shown in FIG. 1, for example, and the respective blocks correspond to the respective frames.

The covariance matrix calculated according to the above equation [1.2] is represented by $R(\omega)$.

This covariance matrix is the covariance matrix calculated in step (S11) in FIG. 6.

In step S12 shown in FIG. 6, eigenvalue decomposition expressed by the above equation [1.3] is performed on the covariance matrix $R(\omega)$, to calculate eigenvectors.

In the equation [1.3], $\Lambda(\omega)$ represents a diagonal matrix formed with eigenvalues (equation [1.5]), and $V(\omega)$ represents a matrix formed with eigenvectors $V\_1(\omega)$ through $V\_n(\omega)$ (equation [1.4]).

Also, the superscript H represents Hermitian transpose (transposition performed after elements are converted into conjugated complex numbers).

Since the covariance matrix $R(\omega)$ satisfies $R(\omega)^H = R(\omega)$, all the eigenvalues $\lambda\_1(\omega)$ through $\lambda\_n(\omega)$ are real numbers. These eigenvalues are arranged in descending order.

The eigenvectors $V\_1(\omega)$ through $V\_n(\omega)$ are 1 in size, and are orthogonal to one another.

The covariance matrix calculated in step S11 is a matrix of n×n in size, and the number of the eigenvectors calculated in step S12 is n. In step S13, the directional characteristics patterns corresponding to the respective eigenvectors are generated, so that directional characteristics patterns Pa through Pd in the respective frequency bins, which are the same in number as the eigenvectors, are obtained. As step S13 is carried out in each frequency bin, the same number of directional characteristics patterns as the number of the frequency bins in which step S13 has been carried out are generated for each of Pa through Pd.

Note that, this directional characteristics pattern generation process will be described later in detail, with reference to equations [5.1] through [5.3] in the paragraphs for the description of the process in step S403 in the flowchart shown in FIG. 17.

An overview of this process is as follows.

Steering vectors corresponding to the respective directions are applied to the eigenvectors, so that directional characteristics patterns indicating the relationships between direction and sensitivity are generated.

Specifically, in the $\omega$th frequency bin, the component of the direction $\theta$ of the directional characteristics pattern corresponding to the kth eigenvector is represented by P_k($\omega$, $\theta$). This value is the square of the gain in the direction $\theta$, and is calculated by applying the steering vectors corresponding to the respective directions according to the later described equation [5.1]. This calculation is performed for all the directions $\theta$ and the frequency bins $\omega$, so that the directional characteristics patterns for the respective frequency bins (the directional characteristics patterns Pa through Pd shown in FIG. 6 (S13)) are calculated.

The processes described so far are performed for each frequency bin.

In step S14, the averages of the directional characteristics patterns in the respective frequency bins are calculated among the frequency bins, and logarithms are further determined.

Through this averaging and logarithmic process, the directional characteristics patterns P_1 through P_4 shown in step S15 are obtained.

As described above, in the process of generating the directional characteristics patterns, the square of the gain in each direction in each frequency band (frequency bin) is calculated, an average squared gain or a total squared gain is calculated by determining the average or the sum of the squared gains in the frequency bands, a logarithmic process is performed on the average squared gain or the total squared gain, and a process of adjusting maximum values to 0 is performed. In this manner, the above described directional characteristics patterns are generated.

In step S16, a classification process that is one of the features of the present disclosure is performed on the four (normally n, which is the number of microphones) directional characteristics patterns.

Through this classification process, the directional characteristics patterns are classified into the following three types, as shown in step S17.

(Type 1) directionality type: pattern P_1
(Type 2) neutral type: pattern P_2
(type 3) null beam type: patterns P_3 and P_4

The directional characteristics patterns are classified into these three types.

Note that, by virtue of the above described restrictions 1 and 2, the classification combinations are limited to six combinations. Furthermore, the pattern P_1 is invariably classified as the directionality type, and the pattern P_4 is invariably classified as the null beam type. This classification process will be described later in detail.

As a result of the classification, the pattern P_1 is classified as the directionality type, the pattern P_2 is classified as the neutral type, and both the pattern P_3 and the pattern P_4 are classified as the null beam type.

Lastly, in step S18, the average of the directionality patterns belonging to the directionality type and the average of the directionality patterns belonging to the null beam type are calculated, so that the directionality pattern P_D and the null beam pattern P_N shown in step S19 are obtained.

Note that, in the example of the classification result shown in step S17 in FIG. 6, only the pattern P_1 belongs to the directionality type. Accordingly, the directionality pattern P_D to be obtained through the combining process in step S18 is the same as the pattern P_1 prior to the combining.

The averaging operation is performed doubly at a maximum on the directionality pattern and the null beam pattern generated in the above manner. Accordingly, the number of small valleys and peaks not corresponding to any directions of arrival becomes smaller than that in a case where the pattern Pa and the pattern Pd that are the patterns obtained in step S13 for each frequency bin are used as they are. Meanwhile, the true peaks and valleys corresponding to sound sources remain, because these true peaks and valleys are common among the directional characteristics patterns. Accordingly, the possibility that a false valley in the null beam pattern and false peak in the directionality pattern match each other by coincidence and are detected as a directional point can be lowered. Also, a false valley originating from a spatial alias disappears or becomes shallower by virtue of the averaging operation (also by virtue of the sequence in which the logarithms are determined after the averages are calculated). Consequently, the above described "incidental valley" less frequently appears.

Next, the method used in the directional characteristics pattern classification process in step S16 shown in FIG. 6 is described.

The basic procedures in the directional characteristics pattern classification process are as follows.

(1) In each of the n(n+1)/2 classification combinations, a representative directionality pattern is calculated from the patterns classified as the directionality type. Likewise, a representative null beam pattern is calculated from the patterns classified as the null beam type. These representative patterns are called the "classifying directionality pattern", which is the representative directionality pattern, and the "classifying null beam pattern", which is the representative null beam pattern, respectively.

(2) The distance scale between the classifying directionality pattern and the classifying null beam pattern is calculated, and the result of the classification having the largest distance scale is employed.

An Euclidean distance is used as the distance scale. Also, the sum (not the average) of the patterns classified as the directionality type is used as the classifying directionality pattern. Likewise, the sum of the patterns classified as the null beam type is used as the classifying null beam pattern.

In FIG. 6, for example, the null beam pattern P_N obtained after the combining process in step S18 is the average of the pattern P_3 and the pattern P_4 belonging to the null beam type shown in step S17 prior to the combining. In the classification process in step S16, however, the classifying null beam pattern for calculating the distance scale is the sum of the pattern P_3 and the pattern P_4.

In calculating the "classifying directionality pattern" and the "classifying null beam pattern" in the classification process in step S16, the sum, not the average, of patterns is used, to cause a large number of directional characteristics patterns to belong to the directionality type and the null beam. The reason why the number of patterns belonging to each type increases with the sum is described below.

Of the directional characteristics patterns, the directional characteristics pattern that most clearly shows the null-beam-type characteristics having a null beam formed a direction of arrival is the pattern P_n corresponding to the smallest eigenvalue. In other words, if the average of the pattern P_n and another pattern is calculated, valleys become shallower, and because of that, the features of the null beam type become less apparent. This similarly applies to the directionality type, and the pattern P_1 shows the features most clearly. If the average is performed with the classifying directionality pattern and the classifying null beam pattern, only the pattern P_1 is classified as the directionality type, only the pattern P_n is classified as the null beam type, and all the remaining patterns P_2 through P_{n−1} are classified as the neutral type in many cases. However, with such a result, the classification becomes meaningless.

If the sum is used, instead of the average, even deeper valleys are formed by virtue of the sum, as long as null beams are formed in the same direction among the patterns belonging to the null beam type, for example. This similarly applies to the directionality type. With the use of the sum, the Euclidean distance between the classifying directionality pattern and the classifying null beam pattern is highly likely to become the longest when the classification is appropriately performed.

However, in generating the directionality pattern and the null beam pattern (FIG. 6 (S18)) after the classification result is confirmed, the average is used, instead of the sum. With the use of the sum, the depths of valleys greatly vary with the number of the patterns belonging to the null beam type, and therefore, it becomes difficult to make a comparison with the threshold formed with the average of the null beam patterns among the blocks in a later process. This problem can be avoided with the use of the average.

In the above described example, a classifying directionality pattern and a classifying null beam pattern are generated for each classification combination, and the Euclidean distance between the classifying directionality pattern and the classifying null beam pattern is calculated. However, a matrix operation can be used so that the Euclidean distances corresponding to all the combinations can be directly calculated.

The process of classifying directional characteristics patterns by calculating the Euclidean distances corresponding to all the combinations through a matrix operation in step S16 shown in FIG. 6 is now described, with reference to the equations shown below.

[Mathematical Formula 2]

$$P_k = [P_k(\theta_{min}) \ \ldots \ P_k(\theta_{max})] \quad [2.1]$$

$$P = \begin{bmatrix} P_1 \\ \vdots \\ P_n \end{bmatrix} \quad [2.2]$$

$$C = \begin{bmatrix} 1 & 0 & 0 & -1 \\ 1 & 0 & -1 & -1 \\ 1 & -1 & -1 & -1 \\ 1 & 1 & 0 & -1 \\ 1 & 1 & -1 & -1 \\ 1 & 1 & 1 & -1 \end{bmatrix} \quad [2.3]$$

$$F = CP = \begin{bmatrix} P_1 - P_4 \\ P_1 - (P_3 + P_4) \\ P_1 - (P_2 + P_3 + P_4) \\ (P_1 + P_2) - P_4 \\ (P_1 + P_2) - (P_3 + P_4) \\ (P_1 + P_2 + P_3) - P_4 \end{bmatrix} \quad [2.4]$$

$$H = \begin{bmatrix} F_1 F_1^T \\ \vdots \\ F_m F_m^T \end{bmatrix} \quad [2.5]$$

$$G = C(PP^T) \quad [2.6]$$

$$H = \begin{bmatrix} G_1 C_1^T \\ \vdots \\ G_m C_m^T \end{bmatrix} \quad [2.7]$$

$$\begin{bmatrix} D_1 \\ D_2 \\ D_3 \\ D_4 \\ D_5 \\ D_6 \end{bmatrix} = \begin{bmatrix} 1 & 0 & 0 & 0 \\ 1 & 0 & 0 & 0 \\ 1 & 0 & 0 & 0 \\ 1/2 & 1/2 & 0 & 0 \\ 1/2 & 1/2 & 0 & 0 \\ 1/3 & 1/3 & 1/3 & 0 \end{bmatrix} \quad [2.8]$$

$$\begin{bmatrix} N_1 \\ N_2 \\ N_3 \\ N_4 \\ N_5 \\ N_6 \end{bmatrix} = \begin{bmatrix} 0 & 0 & 0 & 1 \\ 0 & 0 & 1/2 & 1/2 \\ 0 & 1/3 & 1/3 & 1/3 \\ 0 & 0 & 0 & 1 \\ 0 & 0 & 1/2 & 1/2 \\ 0 & 0 & 0 & 1 \end{bmatrix} \quad [2.9]$$

$$P_D = D_k P \quad [2.10]$$

$$P_N = N_k P \quad [2.11]$$

The directional characteristics pattern corresponding to the kth largest eigenvalue is a pattern P_k. The pattern P_k can be expressed by a row vector as shown in the equation [2.1]. In the equation [2.1], θ_min and θ_max represent the minimum value and the maximum value, respectively, of the direction scanning to be performed according to the MUSIC method.

Between the maximum value and the minimum value, the angle increases by a predetermined amount at a time. For example, where θ_min is −180 degrees, θ_max is 180 degrees, and the amount of increase in angle is 5 degrees, the angles in between are −175 degrees, −170 degrees, . . . , 170 degrees, and 175 degrees. The method of calculating P_k(θ), which is a component corresponding to the direction θ, will be described later.

A matrix P formed with the patterns P_1 through P_n is then defined as shown in the equation [2.2]. This matrix is called a directional characteristics pattern matrix.

A classifying directionality pattern and a classifying null beam pattern can be generated by multiplying the directional characteristics pattern matrix by a predetermined vector. However, the generation of these two patterns can be skipped, and the difference can be directly calculated, if the matrix described below is used. Specifically, a matrix C expressed by the equation [2.3] is prepared, and the matrix C is multiplied by the matrix P formed with the patterns P_1 through P_n, so that a difference between the classifying directionality pattern and the classifying null beam pattern can be directly calculated for each of the classification combinations (equation [2.4]). This matrix C is called a classification matrix. Note that, the equation [2.3] shows a case where n is 4, and a conventional method of calculating a classification matrix with respect to n will be described later.

In the equation [2.4], a matrix F is the product of C and P, and the row vectors of the respective rows of the matrix F are represented by F_1 through F_m. In the equation, m represents the number of rows in the matrix F, and is m=n(n+1)/2. The norm (the inner product) of each of F_1 through F_m is calculated. As a result, the square of the Euclidean distance between the classifying directionality pattern and the classifying null beam pattern is determined. Specifically, where a column vector H is prepared as shown in the equation [2.5], each element of H represents the square of the Euclidean distance in each corresponding classification result (the superscript T represents transpose). In view of this, the optimum classification result can be identified by detecting the largest element in the vector H.

Note that, the vector H can be calculated with a smaller amount of calculation than in the equation [2.4] and the equation [2.5] by changing the sequence of the products in the matrix. To change the sequence of the products, a matrix G expressed by the equation [2.6] is calculated. The matrix G and the classification matrix C are the same in size, and the Euclidean distance can be determined by calculating the inner products in the respective rows in G and C. That is, the same result can be achieved with the use of the equation [2.7], instead of the equation [2.5]. In the equation [2.7], G_k and C_k represent the vector of the kth row in the matrix G and the vector of the kth row in the matrix C, respectively. The numbers of elements in G_k and C_k are n (4 in the equation [2.7]), which is much smaller than the number of elements in F_k (the same as in P_k). Accordingly, the amount of calculation becomes smaller with the use of the equation [2.7], instead of the equation [2.5].

After the optimum classification result is determined, the directionality pattern and the null beam pattern corresponding to the optimum classification result are generated. To generate the directionality pattern and the null beam pattern, matrices shown in the equation [2.8] and the equation [2.9] are prepared. These matrices are called the directionality pattern generator matrix and the null beam pattern generator matrix. Then, where the kth element in the vector H expressed by the equation [2.7] is the largest, the directionality pattern is generated by multiplying the vector of the kth row in the directionality pattern generator matrix by the directional characteristics pattern matrix P (equation [2.10]). Likewise, the null beam pattern is generated by using the vector of the kth row in the null beam pattern generator matrix (equation [2.11]).

Note that the equation [2.8] and the equation [2.9] show a case where n is 4, and a conventional case with n will be described later.

[3-2. Speech Detection Process to which a Process of Dynamically Changing a Threshold Through Speech Detection Based on "Speech Likeliness" is Applied]

The following is a description of a speech detection process to which a process of dynamically changing a threshold through speech detection based on "speech likeliness" is applied.

As mentioned in the description of the "incidental valley" problem, there is a possibility that the problems can be solved, if the threshold for the null beam pattern can be set at an appropriate value. Since it is difficult to manually set such a threshold in advance, there is the need to prepare a mechanism for the threshold value to adapt to the environment during operation and spontaneously adjust. Hereinafter, such a threshold will be referred to as a dynamic threshold.

To achieve a dynamic threshold, the processes described below are performed in the present disclosure.

a) Instead of a threshold common among all the directions, thresholds that differ among the directions are stored.

b) Speech detection based on "speech likeliness" is also performed. The thresholds in blocks determined to be "non-speech-like" are updated, and the thresholds in blocks determined to be "speech-like" are fixed.

c) The thresholds for the respective directions are calculated in accordance with the null beam pattern that is the average among the blocks determined to be "non-speech-like".

Note that, since a result of the determination as to "speech likeliness" is indicated by one of the two values: true and false. Therefore, the following two expressions mean the same.

Determined not to be "speech-like"

Determined to be "non-speech-like"

Example cases where a threshold according to the MUSIC method (a threshold for a null beam pattern) is dynamically changed are disclosed in Patent Document 1 (JP 2012-150237 A), which is an earlier patent application by the inventor, and in Patent Document 6 (JP 2013-44950 A), for example. The differences from those examples lie in that the speech detection based on "speech likeliness" is also performed, and the thresholds are fixed only in blocks determined to be "speech-like".

Figure 7:
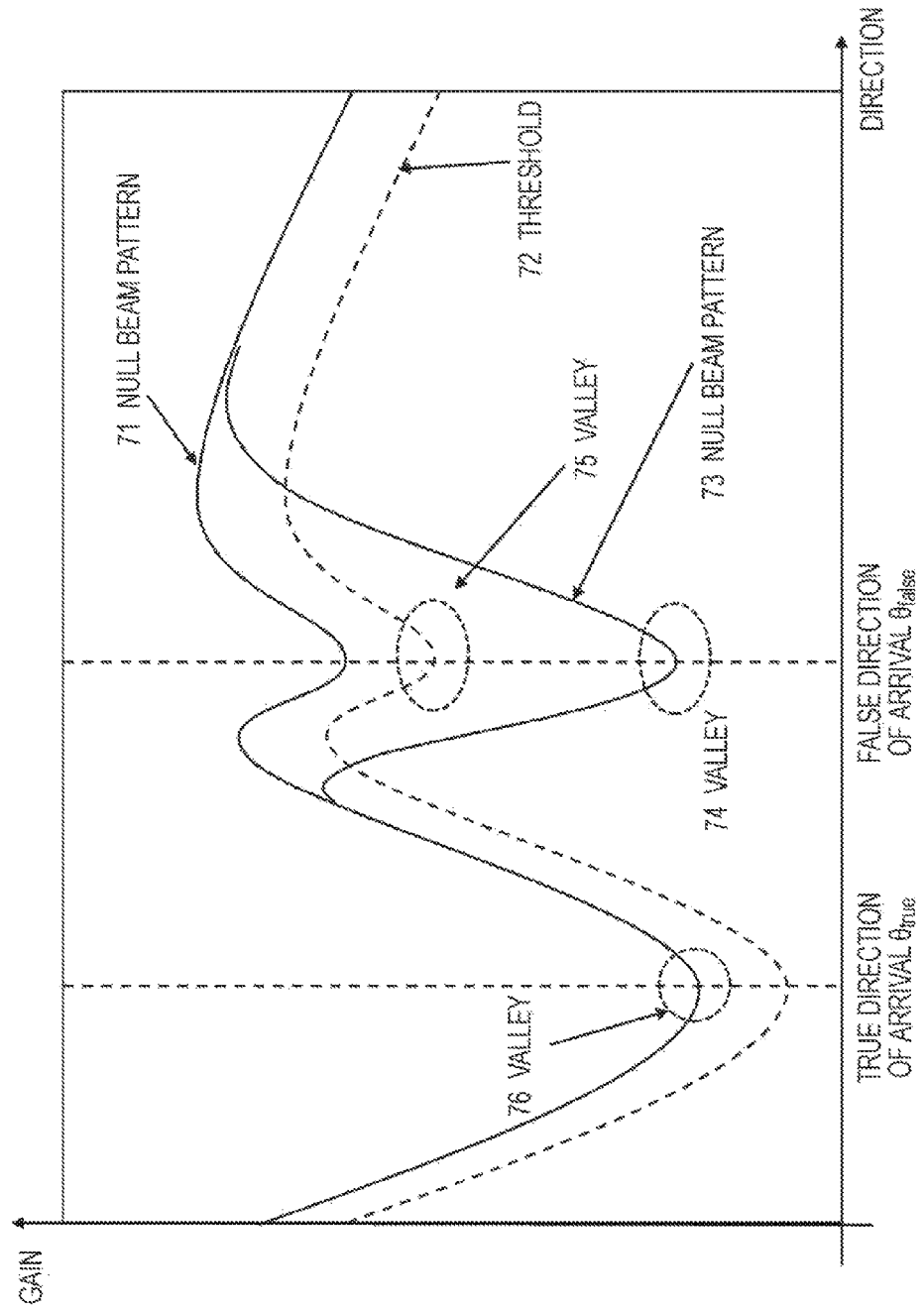
FIG. 7 is a diagram for explaining an example of the dynamic threshold to be set for directional characteristics patterns.

Referring now to FIG. 7, a threshold to be calculated in the above manner is described.

A null beam pattern 71 shown in FIG. 7 is a null beam pattern generated at an earlier time than the start of the time range 56 shown in FIG. 5, and is the same as the null beam pattern 41 shown in FIG. 4. A true valley is formed in a true direction of arrival ($\theta$_true), and an incidental valley is formed in a false direction of arrival ($\theta$_false), as in FIG. 4.

A threshold 72 is a dynamically-calculated threshold. The calculation will be described later in detail. A dynamic threshold is basically set in a slightly lower position than the null beam pattern at the times when no speeches exist. In other words, when there exist no speeches, the dynamic threshold does not become deeper even if the null beam pattern fluctuates. Therefore, any directional point is not detected in the true direction of arrival ($\theta$_true) and the false direction of arrival ($\theta$_false), and any speech segment is not detected, either. A sound source exists in the true direction of arrival ($\theta$_true), but this sound source is not a speech. Not detecting this non-speech sound source is a correct behavior in the speech detection.

In this situation, a person may speak from the false direction of arrival ($\theta$_false). That is, the start time of the time range 56 shown in FIG. 5 has come. The null beam pattern then turns into a null beam pattern 73 shown in FIG. 7. Specifically, the valley formed in the position of the false direction of arrival (θ_false) becomes deeper due to the existence of the true sound source (speech), and a valley 74 shown in FIG. 7 appears. This valley 74 is below the threshold 72. As a result, within the time range 56 shown in FIG. 5, a directional point corresponding to the false direction of arrival (θ_false) is detected, and accordingly, a speech segment is also detected. Moreover, no dual detection occurs.

Also, since the blocks existing within the time range 56 shown in FIG. 5 are determined to be "speech-like", the dynamic threshold is not updated. Therefore, the shape of the dynamic threshold during the speech remains the same as the shape of the threshold 72 shown in FIG. 7, and the valley in the false direction of arrival (θ_false) does not exceed the threshold. When the speech ends, the shape of the null beam pattern returns to the shape of the null beam pattern 71, and the valley in the false direction of arrival (θ_false) exceeds the threshold. As a result, directional points are no longer detected.

Also, this dynamic threshold is not easily affected by wrong determination as to "speech likeliness". For example, even if the block is wrongly determined to be "speech-like" while there exist no speeches, the threshold is not updated. As long as the dynamic threshold has already adapted to the situation at that point of time, any problem will not be caused even if the threshold value is not updated. If the block is wrongly determined to be "non-speech-like" during a speech, on the other hand, the dynamic threshold is updated during the speech. Specifically, the threshold value in the direction from which the speech is emitted becomes lower. Since the dynamic threshold is calculated from the average of the null beam patterns among blocks determined to be "non-speech-like", the average is hardly affected, as long as the number of wrongly determined blocks is small. Consequently, a phenomenon in which the positions of the null beam pattern and the threshold are reversed (a phenomenon in which the dynamic threshold becomes deeper than the valley in the null beam pattern during a speech, and the directional point in the direction of the speech is not detected) hardly occurs.

An input sound that easily cause wrong determination in the speech detection based on "speech likeliness" is an unvoiced consonant (such as the s sound (/s/)). Therefore, in a system that also uses the determination based on "speech likeliness" as a condition for employing a directional point, a phenomenon in which a short segment is detected with respect to a speech containing many unvoiced consonants, or a segment corresponding to such a speech is divided into several segments often occurs (or a process of extending a detected segment forward and backward is additionally performed so as to avoid the above problems, but this process has a side effect on other input speeches). In the present disclosure, on the other hand, a result of the determination as to "speech likeliness" affects only the updating of the dynamic threshold, and accordingly, the influence of wrong determination can be minimized.

The dynamic threshold to be updated in accordance with the determination as to "speech likeliness" can also solve the problem caused by a same-phase entering component. This aspect is now described, with reference to FIG. 8.

Figure 8:
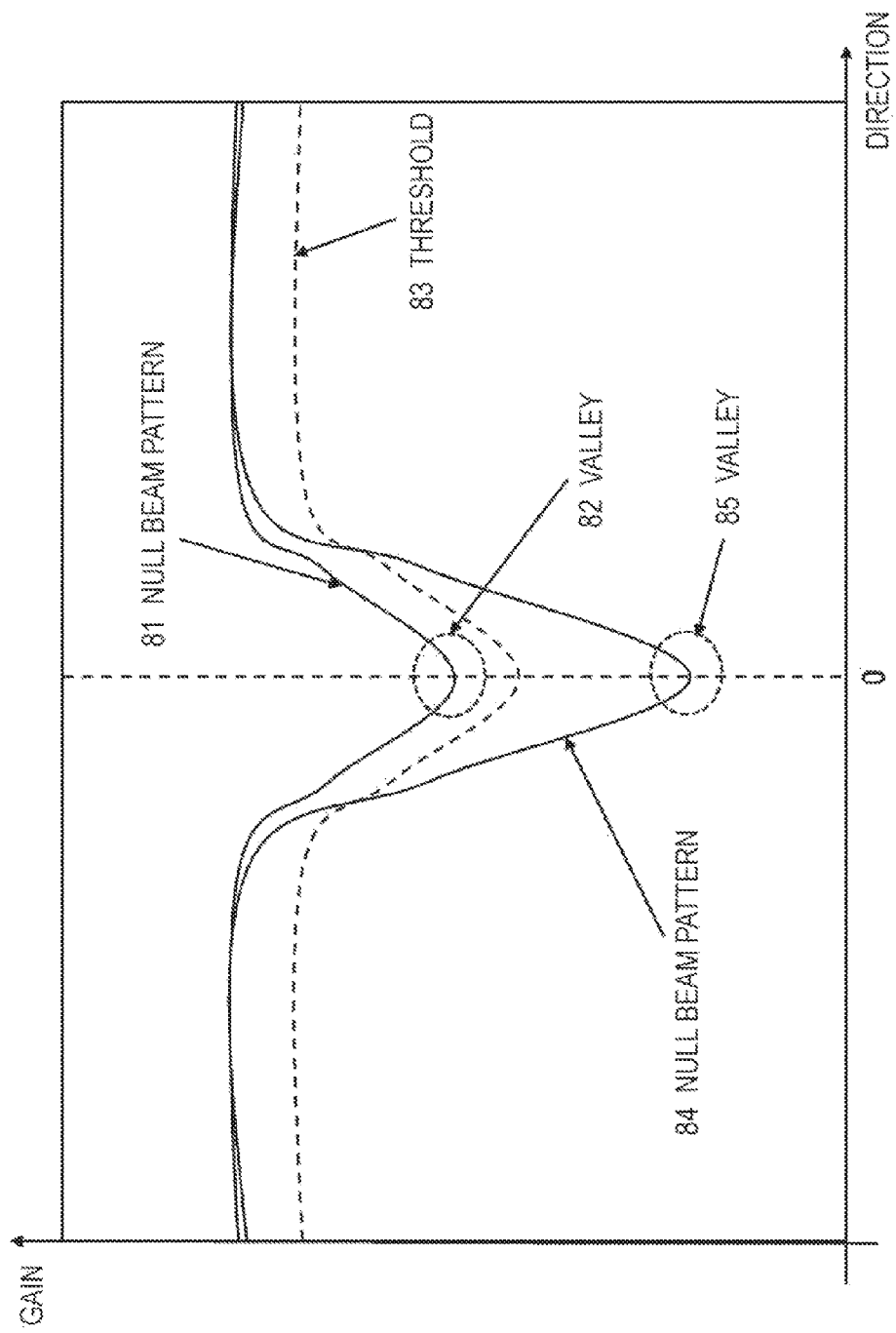
FIG. 8 is a diagram for explaining an example of the correspondence between a null beam pattern and a dynamic threshold in silence when a same-phase entering component exists.

A null beam pattern 81 shown in FIG. 8 is an example of the null beam pattern in silence when a same-phase entering component exists. Although there exist no sound sources, a false valley is formed near the position θ=0 due to the influence of the same-phase entering component, and this false valley is a valley 82. A same-phase entering component, such as electrical noise or vibration of the housing, is a signal that greatly differs from a speech. Therefore, there is a high possibility that a same-phase entering component will be determined to be "non-speech-like". In such a situation, the dynamic threshold is updated, and is expressed in the form of a threshold 83. Since the valley 82 as a false valley is shallower than the dynamic threshold at the position θ=0, any directional point is not detected. When no speeches exist, any speech segment is not detected.

When there is a speech emitted from the direction θ=0, on the other hand, the shape of the null beam pattern changes like a null beam pattern 84. That is, since there exists a true sound source, a null beam valley becomes deeper. This valley is a valley 85. As the null beam valley becomes lower than the threshold, a directional point is detected, and a speech segment is also detected. Also, while the block is detected to be "speech-like", the dynamic threshold is not updated, and this situation lasts during the speech. When the speech ends, the shape of the null beam pattern returns to the shape of the original null beam pattern 81, and directional points are no longer detected. As a result, even if a false null beam is formed in the null beam pattern due to a same-phase entering component, the influence of the false null beam is minimized, and the speech from the direction θ=0 is correctly detected.

[4. Example Configuration of a Sound Signal Processing Device and Example Processes to be Performed by the Sound Signal Processing Device According to the Present Disclosure]

Figure 9:
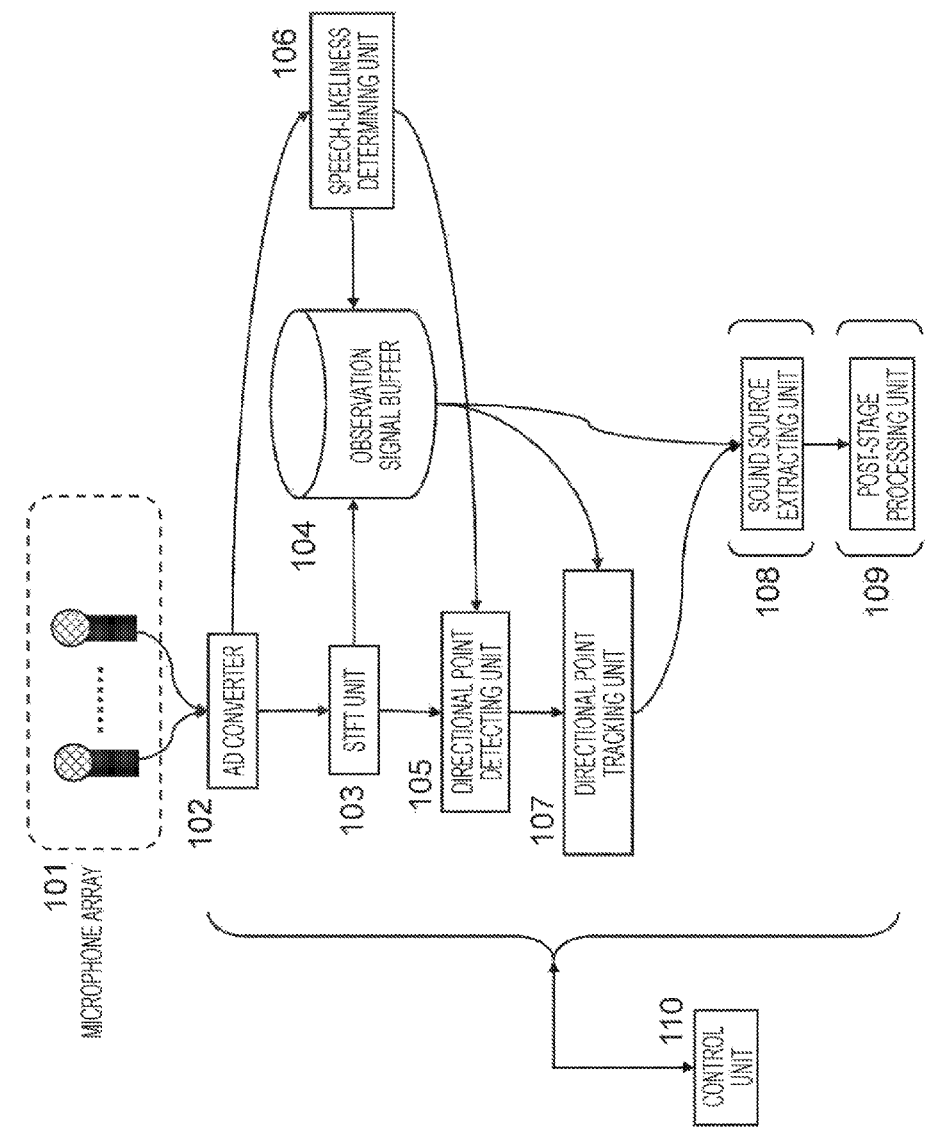
FIG. 9 is a diagram for explaining an example configuration of a sound signal processing device of the present disclosure.

Referring now to FIG. 9 and later drawings, an example configuration of a sound signal processing device and an example process to be performed by the sound signal processing device according to the present disclosure are described.

FIG. 9 is a diagram showing an example configuration of the sound signal processing device according to the present disclosure.

A sound signal is collected by a microphone array 101, and the obtained multi-channel sound data is converted into a digital signal at an AD converter 102. This data is called an observation signal (of the time domain). The observation signal of the time domain is sent to an STFT unit 103 and a "speech likeliness" determining unit 109.

The STFT unit 103 performs a short-time Fourier transform (STFT) on the observation signal as a temporal signal, and converts the observation signal of the time domain into a signal of the time-frequency domain. The observation signal of the time-frequency domain is sent to an observation signal buffer 104 and a directional point detecting unit 105.

The observation signal buffer 104 accumulates observation signals in a predetermined time (or of a predetermined number of frames). The signals accumulated herein are used for obtaining the voice data of one speech as well as the start time and the end time of a detected speech segment, and are further used for obtaining a result of extraction of voice arriving from a predetermined direction by using the direction of the segment.

Times (or frame numbers) and observation signals are associated with each other and are stored in the observation signal buffer 104. Further, results of determination performed by the later described "speech-likeliness" determining unit are associated with the times and the like, and are also stored. Thus, when a time or a frame number is input from another module, the observation signal and the result of "speech-likeliness" determination associated with the time or the frame number can be output.

The directional point detecting unit 105 divides an observation signal into blocks of a predetermined length, and detects the point corresponding to the direction of arrival in each of the blocks. That is, the directional point detecting unit 105 is a module that performs a process equivalent to the process shown in (b) and (c) in FIG. 1. In doing so, the directional point detecting unit 105 also uses a result of determination performed by the later described "speech-likeliness" determining unit 106. This aspect will be described later in detail.

The "speech-likeliness" determining unit 106 is a module that determines whether the input sound included in the block being currently processed by the MUSIC method is "speech-like". The determination method used here may be a method of determination based on the periodicity of an input signal according to Patent Document 4 (JP 4182444 B2), for example. Note that, the timing to determine speech likeliness does not need to completely synchronize with blocks of the MUSIC method, as long as a check can be made to determine whether the input sound is "speech-like" at a time close to the corresponding block. The output of this module is one of the two values: "speech-like" and "non-speech-like". This value is also sent to the observation signal buffer 104. The value is associated with the time and the like, and is stored.

A directional point tracking unit 107 connects directional points having substantially the same direction in consecutive blocks, and detects the connected directional points as a speech segment. That is, the directional point tracking unit 107 is a module that performs the process described above with reference to FIG. 1(*d*). This aspect will be described later in detail.

The output of the directional point tracking unit 107 is a speech segment, or the start time and the end time of a speech and a speech direction (a direction of arrival). In other words, in a case where speech segments overlap each other in terms of time, different sounds mix with one another in the segment. In a case where a clear sound source without any mixed sounds is necessary (such as a case where the present invention is used as the stage before speech recognition), a sound source extracting unit 108 is provided.

The sound source extracting unit 108 extracts a predetermined speech or the like, using the observation signal, the direction of arrival, and the like associated with the speech segment. The sound source extraction technique disclosed in Patent Document 7 (JP 2012-234150 A), for example, or an existing technique such as beam forming can be applied to this module.

The sound data associated with the speech segment is send to a later-stage processing unit 109, as necessary. The later-stage processing unit 109 is formed with a speech recognizer, for example. Note that, some speech recognizers have a speech detection function, but a speech recognizer may not have such a function. Also, many speech recognizers perform STFT to extract speech feature quantities. In combination with the processing according to the present disclosure, the STFT on the speech recognition side can be skipped.

A control unit 110 is connected to all the other modules shown in FIG. 9, and controls the respective modules.

Figure 10:
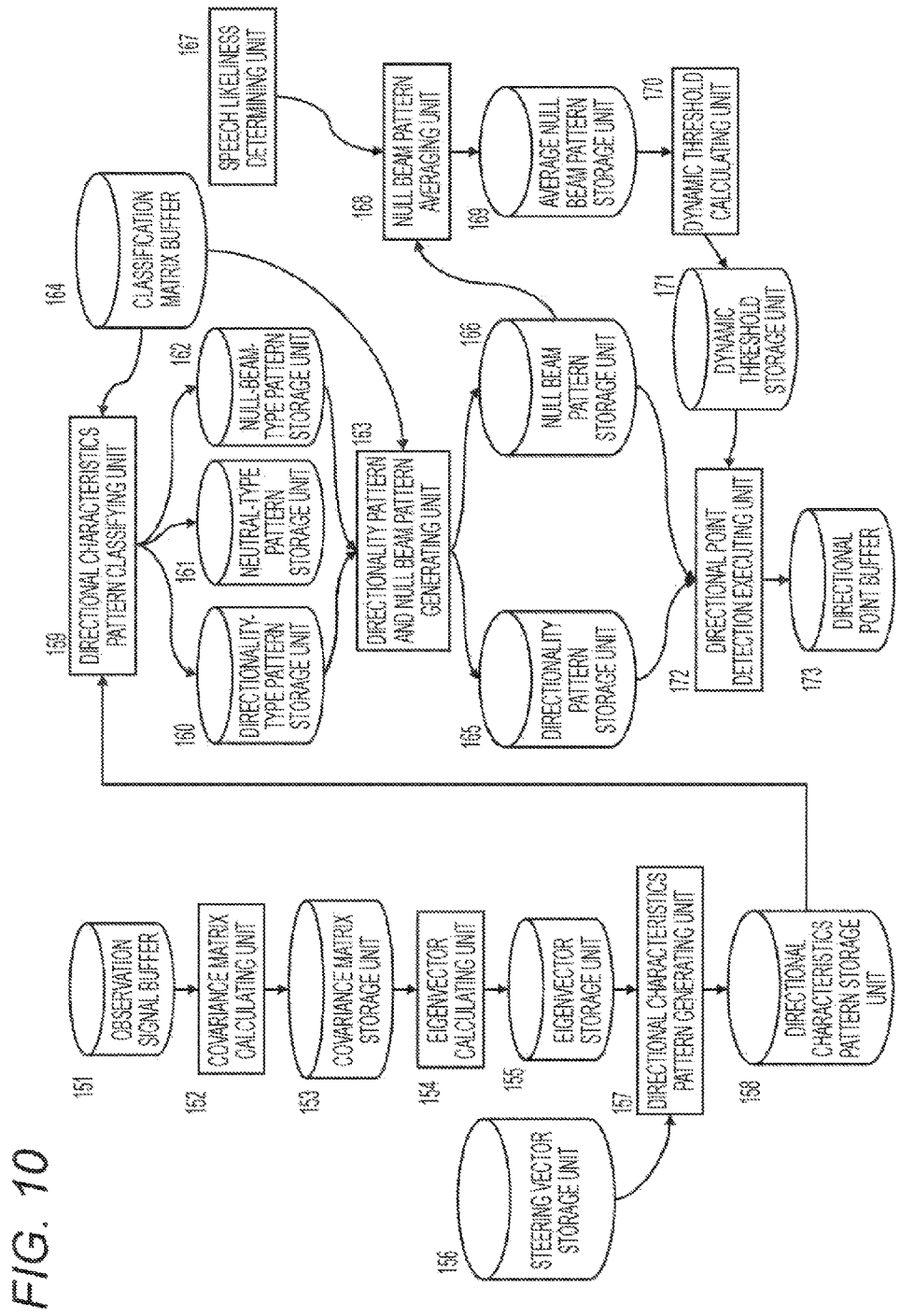
FIG. 10 is a diagram for explaining a directional point detecting unit in detail.

Referring now to FIG. 10, the directional point detecting unit 105 is described in detail.

An observation signal buffer 151 is the same as the observation signal buffer 104 shown in FIG. 9, and accumulates observation signals of the time-frequency domain in a predetermined time.

The configurations of a covariance matrix calculating unit 152 through a directional characteristics pattern storage unit 158 are modules that are normally often used in estimating a direction of arrival by the MUSIC method.

The covariance matrix calculating unit 152 calculates a covariance matrix from the observation signal corresponding to one block such as the block 11 shown in FIG. 1 for each frequency bin, and stores the result into a covariance matrix storage unit 153.

The covariance matrix to be stored into the covariance matrix storage unit 153 is equivalent to the covariance matrix shown in step S11 in FIG. 6 described above.

An eigenvector calculating unit 154 calculates an eigenvector by performing eigenvalue decomposition on the covariance matrix, and stores the result into an eigenvector storage unit 155.

This eigenvector is equivalent to the eigenvector shown in step S12 in FIG. 6 described above.

Phase differences between signals arriving from various directions are calculated in advance, and the results of the calculations are stored in a steering vector storage unit 156.

Figure 11:
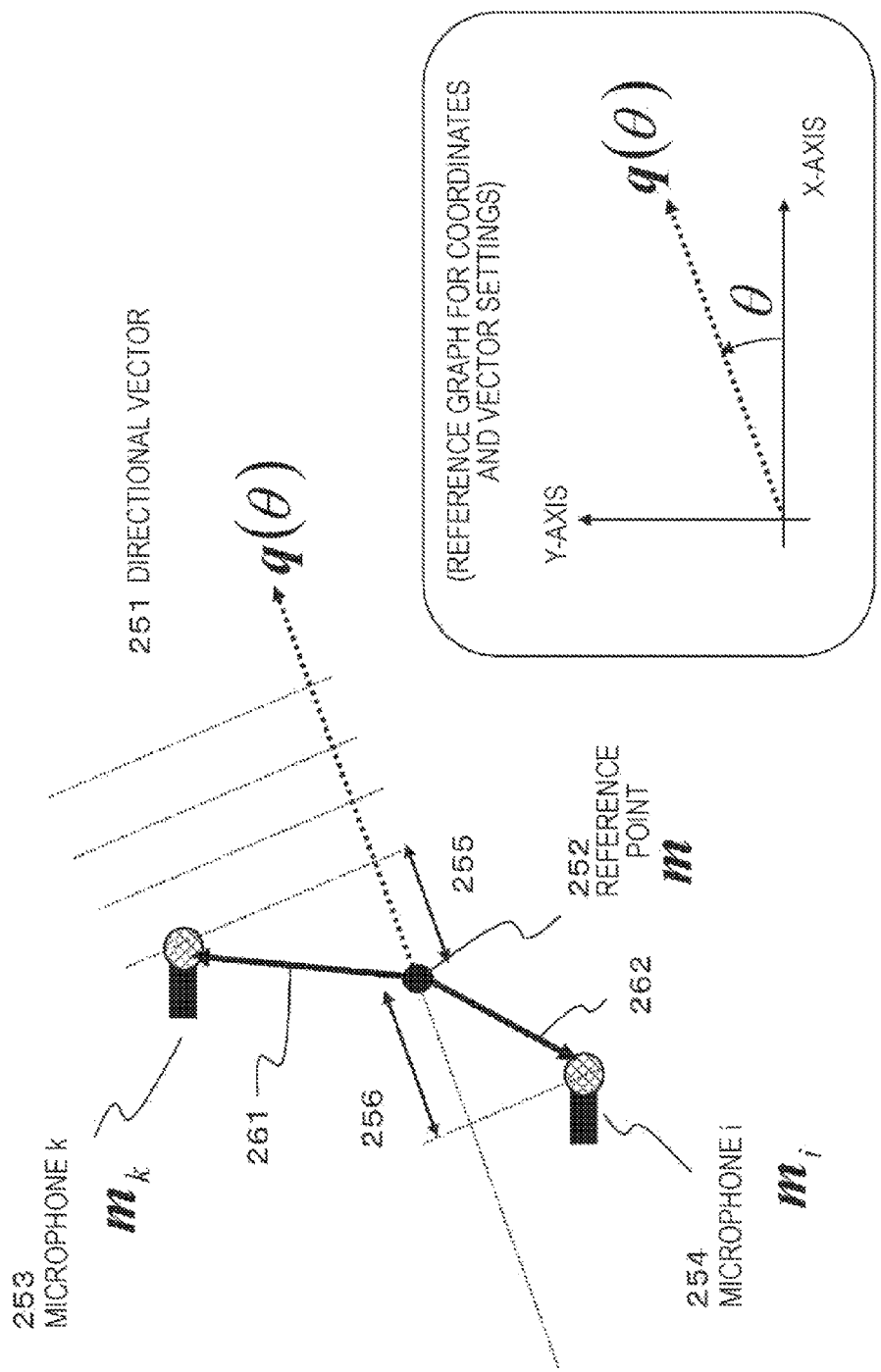
FIG. 11 is a diagram for explaining a method of generating a steering vector.

Referring now to FIG. 11 and the equations [3.1] through [3.3] shown below, a method of generating a steering vector is described.

[Mathematical Formula 3]

$$q(\theta) = \begin{bmatrix} \cos\theta \\ \sin\theta \\ 0 \end{bmatrix} \quad [3.1]$$

$$S_k(\omega, \theta) = \exp\left(j\pi \frac{(\omega-1)F}{(M-1)C} q(\theta)^T (m_k - m)\right) \quad [3.2]$$

$$S(\omega, \theta) = \frac{1}{\sqrt{n}} \begin{bmatrix} S_1(\omega, \theta) \\ \vdots \\ S_n(\omega, \theta) \end{bmatrix} \quad [3.3]$$

FIG. 11 shows a microphone k,253 and a microphone i,254 that serve as sound signal input units for the sound signal processing device. FIG. 11 also shows a reference point 252 for measuring directions.

The reference point 262 may be any point near the microphones. For example, a reference point that matches the centroid among the microphones may be set, or a reference point that matches the location of one of the microphones may be set. The positional vector (or the coordinates) of the reference point 252 is represented by m.

To express the direction of arrival of sound, a vector of a length 1 starting from the reference point m,252 is prepared, and this vector is represented by q(θ). This is the directional vector q(θ) 251 shown in the drawing.

If the position of the sound source is substantially at the same height as the microphones, the directional vector q(θ) 251 can be regarded as a vector in the X-Y plane (with the vertical direction being the Z-axis), and the components of the directional vector q(θ) are expressed by the above equation [3.1].

However, a direction θ is an angle with respect to the X-axis (see FIG. 11 (the reference graph for coordinate and vector settings)).

In FIG. 11, a sound that arrives from the direction of the directional vector q(θ) 251 first reaches the microphone k,253, then reaches the reference point m,252, and finally reaches the microphone i,254.

The phase difference S_k(ω, θ) between the reference point m,252 and the microphone k,253 can be expressed by the above equation [3.2]. In this equation, j represents imaginary unit, M represents the number of frequency bins, F represents sampling frequency, C represents sound velocity, m_k represents the positional vector of the microphone k, and T as a superscript represents normal transposition.

The meaning of this equation is as follows. Where a plane wave is virtually set, the microphone k,253 is closer to the sound source than the reference point m,252 by a distance 255 shown in FIG. 11, while the microphone i,254 is further away from the sound source than the reference point m,252 by a distance 256 shown in FIG. 11.

These differences in distance are expressed as q(θ)^T (m_k−m) and q(θ)^T(m_i−m), using inner products of vectors.

Where the differences in distance are converted into a phase difference, the formula for calculation of the phase difference S_k(ω, θ) between the reference point m,252 and the microphone k,253 shown in the above equation [3.2] is obtained.

The vector S(ω, θ) formed with the phase difference between the respective microphones is expressed by the above equation [3.3], and is called a steering vector.

The reason of the division by the square root of n is to normalize the sizes of vectors with 1.

The steering vector storage unit 156 shown in FIG. 10 stores steering vectors S(ω, θ) with respect to directions θ of various values and frequency bin numbers ω. The directions θ basically cover one circle. However, in a case where microphones are arranged on a straight line as in FIG. 2, the directional characteristics are symmetrical about the straight line (the microphone array direction 23 in FIG. 2), and therefore, the directions θ cover half a circle. Also, the angle interval is determined in accordance with the accuracy and the amount of calculation in the direction estimation. (For example, the angle interval may be 3 degrees or 5 degrees).

As for the frequency bin numbers ω, all the frequency bins excluding ω=1 (direct current) and ω=M (Nyquist frequency) are basically used (that is, 1<ω<M), but only the frequency bins that satisfy a certain condition may be used. For example, to reduce the amount of calculation, only the frequency bins corresponding to multiples of a certain number, such as even numbers and multiples of 3, may be used. Alternatively, only the frequency bins corresponding to the frequency band containing most speeches may be used, as the direction of arrival is estimated to perform speech detection.

Note that, in some conventional cases, frequency bins are limited so as to avoid influence of spatial aliases. However, influence of spatial aliases can be avoided by virtue of the later described dynamic threshold in the present disclosure, and therefore, there is no need to limit frequency bins for that purpose.

A directional characteristics pattern generating unit 157 shown in FIG. 10 generates directional characteristics patterns (plots showing relationships between direction and sensitivity) by applying the steering vectors of the respective directions obtained from the steering vector storage unit 156 to the respective eigenvectors stored in the eigenvector storage unit 155. The directional characteristics pattern generating unit 157 stores the results into the directional characteristics pattern storage unit 158.

The directional characteristics patterns stored in the directional characteristics pattern storage unit 158 are equivalent to the above described directional characteristics patterns P1 through P4 shown in step S15 in FIG. 6.

Where the number of microphones is n, n directional characteristics patterns are generated.

A directional characteristics pattern classifying unit 159 through a null beam pattern storage unit 166 to be described next constitute a module related to "classification of directional characteristics patterns", which is one of the features of the present disclosure. This module is equivalent to the module that performs the process shown in steps S13 through S19 shown in FIG. 6.

The directional characteristics pattern classifying unit 159 classifies the n directional characteristics patterns stored in the directional characteristics pattern storage unit 158 into the following three types:

directionality-type pattern=a pattern having a directionality (a peak) formed in the direction of arrival;

null-beam-type pattern=a pattern having a null beam (a valley) formed in the direction of arrival; and neutral-type pattern=a pattern that does not belong to either of the directionality type and the null beam type.

The classified patterns are stored into a directionality-type pattern storage unit 160, a null-beam-type pattern storage unit 162, and a neutral-type pattern storage unit 161.

In the example shown in FIG. 6, the patterns stored in these storage units 160 through 162 are the directionality-type pattern P1, the neutral-type pattern P2, and the null-beam-type patterns P3 and P4 shown in step S17.

A classification matrix buffer 154 is a matrix for generating data corresponding to n(n+1)/2 classification results.

As well as the classification matrix expressed by the above described equation [2.3], a directionality pattern generator matrix (equation [2.8]) and a null beam pattern generator matrix (equation [2.9]) are also stored. A method of generating these matrices will be described later.

A directionality pattern and null beam pattern generating unit 163 generates an ultimate directionality pattern to be used in detecting the direction of arrival, from the directionality-type pattern stored in the directionality-type pattern storage unit 160. The directionality-pattern and null-beam-pattern generating unit 163 generates an ultimate null beam pattern to be used in detecting the direction of arrival, from the null-beam-type patterns stored in the null-beam-type pattern storage unit 162.

That is, the directionality pattern and null beam pattern generating unit 163 performs the pattern combining process in step S18 in the example shown in FIG. 6, and generates the directionality pattern P_D and the null beam pattern P_N shown in step S19.

The generated directionality pattern is stored into a directionality pattern storage unit 165, and the generated null beam pattern is stored into the null beam pattern storage unit 166.

A speech likeliness determining unit 167 through a dynamic threshold storage unit 171 shown in FIG. 10 constitute a module that performs the process related to "dynamic updating of threshold in accordance with 'speech likeliness'", which is another one of the features of the present disclosure.

The speech likeliness determining unit 167 is the same as the speech likeliness determining unit 106 shown in FIG. 9, and determines whether there is a "speech-like" signal in each block (such as the block 11 shown in FIG. 1) or at a time near each block. For example, the speech likeliness determining unit 167 determines whether an input sound signal is like a speech in accordance with the periodicity of the input sound signal.

At a block or timing determined not to include a "speech-like" signal by the speech likeliness determining unit 106, or at a block or timing determined not to be like a speech, a null beam pattern averaging unit 168 updates the average in the temporal direction of the null beam pattern stored in the null beam pattern storage unit 166, and stores the result into an average null beam pattern storage unit 169.

A dynamic threshold calculating unit 170 calculates a dynamic threshold for each direction from the average null beam pattern stored in the average null beam pattern storage unit 169, and stores the results into the dynamic threshold storage unit 171. A relationship between average null beam patterns and dynamic thresholds has been described above with reference to FIG. 7 and others. A dynamic threshold is a slightly deeper value than the average null beam pattern, or is such a value that the null beam pattern does not become lower than the threshold even if the null beam pattern slightly changes during a time without any speech-like signal input.

A directional point detection executing unit 172 detects directional points as candidates for the direction of arrival, using the directionality pattern stored in the directionality pattern storage unit 165, the null beam pattern stored in the null beam pattern storage unit 166, and the dynamic threshold stored in the dynamic threshold storage unit 171. The directional point detection executing unit 172 stores the result into a directional point buffer 173.

Note that, a process of estimating a direction of arrival using a dynamic threshold is the process described above with reference to FIGS. 7 and 8.

As described above with reference to FIG. 10, the directional point detecting unit 105 shown in FIG. 9 divides an observation signal into blocks of a predetermined length, and detects the point corresponding to the direction of arrival in each of the blocks. That is, the directional point detecting unit 105 performs a process equivalent to the process shown in (b) and (c) in FIG. 1.

Figure 12:
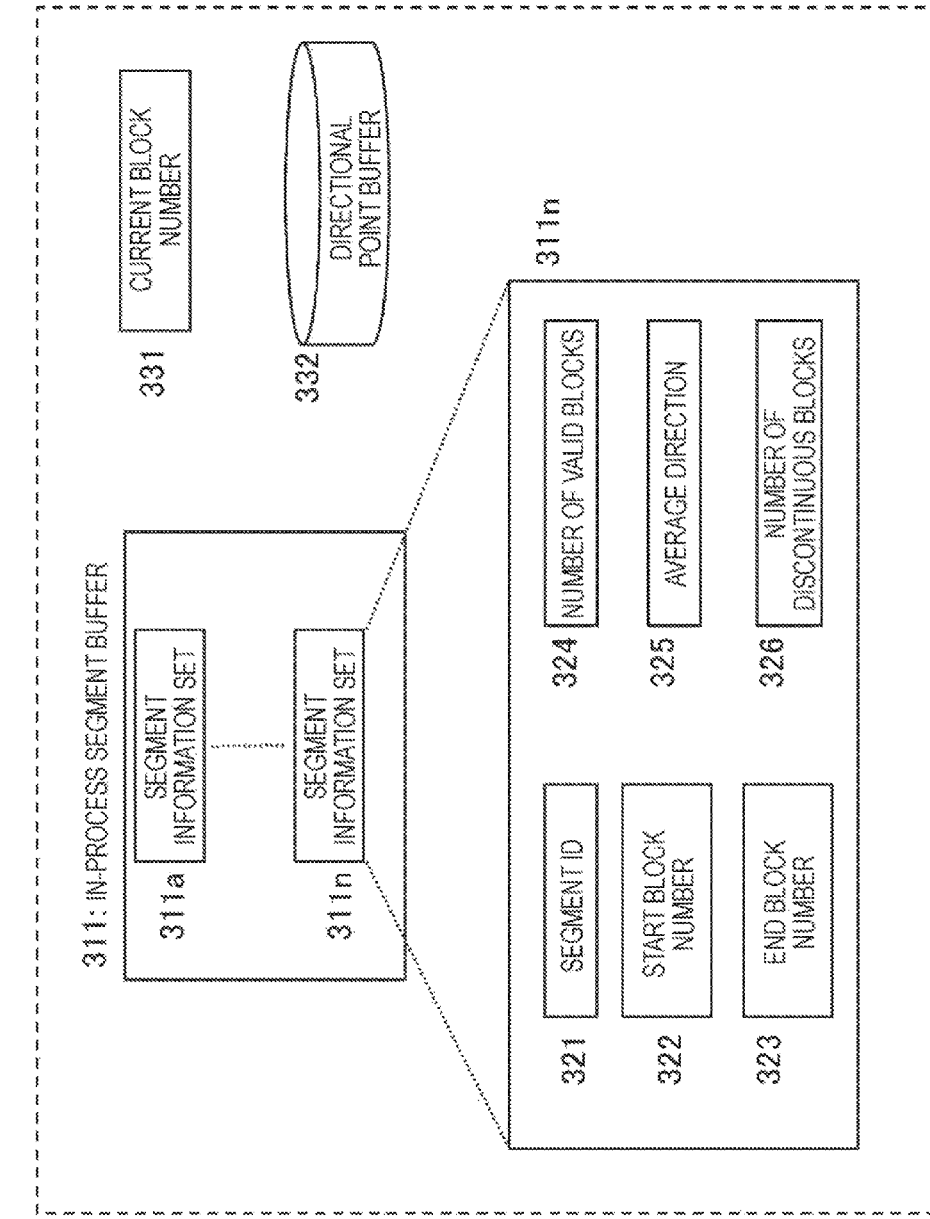
FIG. 12 is a diagram for explaining a directional point tracking unit in detail.

Referring now to FIG. 12, the directional point tracking unit 107 in the configuration shown in FIG. 9 is described in detail.

A directional point tracking unit 107 connects directional points having substantially the same direction in consecutive blocks, and detects the connected directional points as a speech segment. That is, the directional point tracking unit 107 performs the process described above with reference to FIG. 1(*d*).

In the directional point tracking process, a segment is created by connecting adjacent directional points, and therefore, there exist segments in process of creation. A buffer that stores these segments is provided. This buffer is an in-process segment buffer 311 shown in FIG. 12. Segments that are being created or have been completed are segment information sets 311*a* through 311*n* shown in the in-process segment buffer 311.

A current block number 331 stores the number assigned to the block being currently processed (such as the block 11 shown in FIG. 1). After a start of processing, "1" is assigned to the block to be first generated, and the block number is incremented every time a new block is generated as time progresses.

A directional point buffer 332 is the same as the directional point buffer 173 described above with reference to FIG. 10, and stores the directional points in the respective blocks output from the directional point detecting unit 105.

The lower half of FIG. 12 specifically shows the configuration of the segment information set 311*n*, which is one of the segment information sets 311*a* through 311*n*. Each of the segment information sets 311*a* through 311*n* has a similar configuration.

The segment information set 311*n* has the modules including a segment ID 321, a beginning block number 322, an ending block number 323, a number of valid blocks 324, an average direction 325, and a number of discontinuous blocks 326.

The segment ID 321 is a number uniquely assigned to each segment, and such numbers are assigned in order of generation, for example.

The beginning block number 322 is the number assigned to the block corresponding to the start of the segment. Instead of the block number, the number assigned to the STFT frame or the actual time may be stored.

The ending block number 323 is the number assigned to the block corresponding to the end of the segment. Like the beginning block number 322, this number may also be replaced with a frame number or a time. Note that, as for a segment being generated, its end has not been determined yet, and therefore, a value indicating "undefined" is stored in the ending block number 323.

The number of valid blocks 324 is the number of blocks each having a directional point (such blocks will be hereinafter referred to as "valid blocks") in the segment. This value is stored so as to prevent incorrect detection of the segment. In a case where the value of the proportion of the valid blocks calculated from the number of blocks (calculated from the beginning block number 322 and the ending block number 323) in the segment and the number of valid blocks is small (or where valid blocks are sparse), the possibility that the segment is a false segment generated by connecting incorrectly-detected directional points is high, and therefore, the segment is discarded.

The average direction 325 is the average direction calculated from the directional points included in the segment. As for a segment being currently created, the direction to be calculated is already stored at that point of time.

The number of discontinuous blocks 326 is the value that indicates the number of consecutive blocks having no directional points in the vicinity (near the direction of arrival indicated by the average direction 325). This value is used in creating the segment. In the tracking, even if directional points are discontinuous, the segment should not be divided but should be cut out as one segment, as long as the length of the discontinuity is smaller than a predetermined value. To do so, the length of discontinuity is stored. Also, when the length of discontinuity (the number of discontinuous blocks) exceeds the predetermined value, the segment is fixed.

The description of the configuration of the device is now completed.

[5. Sequences in the Processes to be Performed by the Sound Signal Processing Device]

Figure 13:
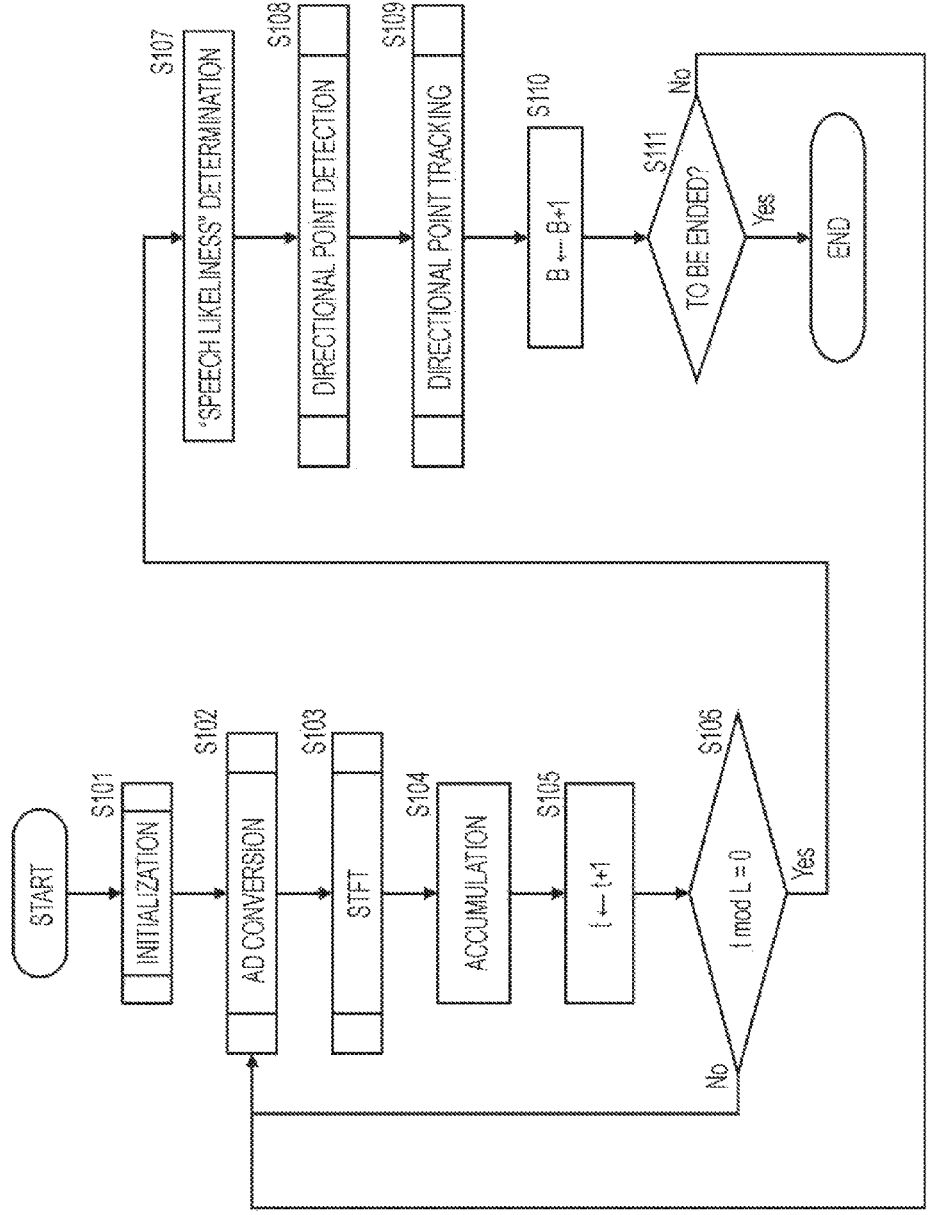
FIG. 13 is a flowchart for explaining an entire sequence in a process to be performed by the sound signal processing device of the present disclosure.

Referring now to the flowchart shown in FIG. 13 and the flowcharts that follow, the sequence in a process to be performed by the sound signal processing device according to the present disclosure is described.

FIG. 13 is a flowchart for explaining the entire sequence in a process to be performed by the sound signal processing device according to the present disclosure. The procedures in the respective steps are sequentially described below.

(Step S101)

Step S101 is the initialization process. Initial values are assigned to a frame number t and a block number B, and a classification matrix, a steering vector, and the like are generated. This aspect will be described later in detail.

(Step S102)

Step S102 is an AD conversion process, and is a process of converting an analog sound signal input to microphones, into a digital signal. As described above with reference to drawings, in the process according to the present disclosure, n microphones disposed in different positions are used, and the sound obtained by the microphones is analyzed. In step S102, an analog sound signal input to these microphones is converted into a digital signal. AD conversion is performed in accordance with a clock synchronized with n channel inputs. This signal is called an observation signal of the time domain. Note that, signals may be input from a file or a network as necessary, other than the microphones.

(Step S103)

Step S103 is a process of performing a short-time Fourier transform (STFT) on the observation signal of the time domain. Through the short-time Fourier transform (STFT) process, the observation signal of the time domain is converted into a signal (spectrum) of the time-frequency domain.

Figure 14:
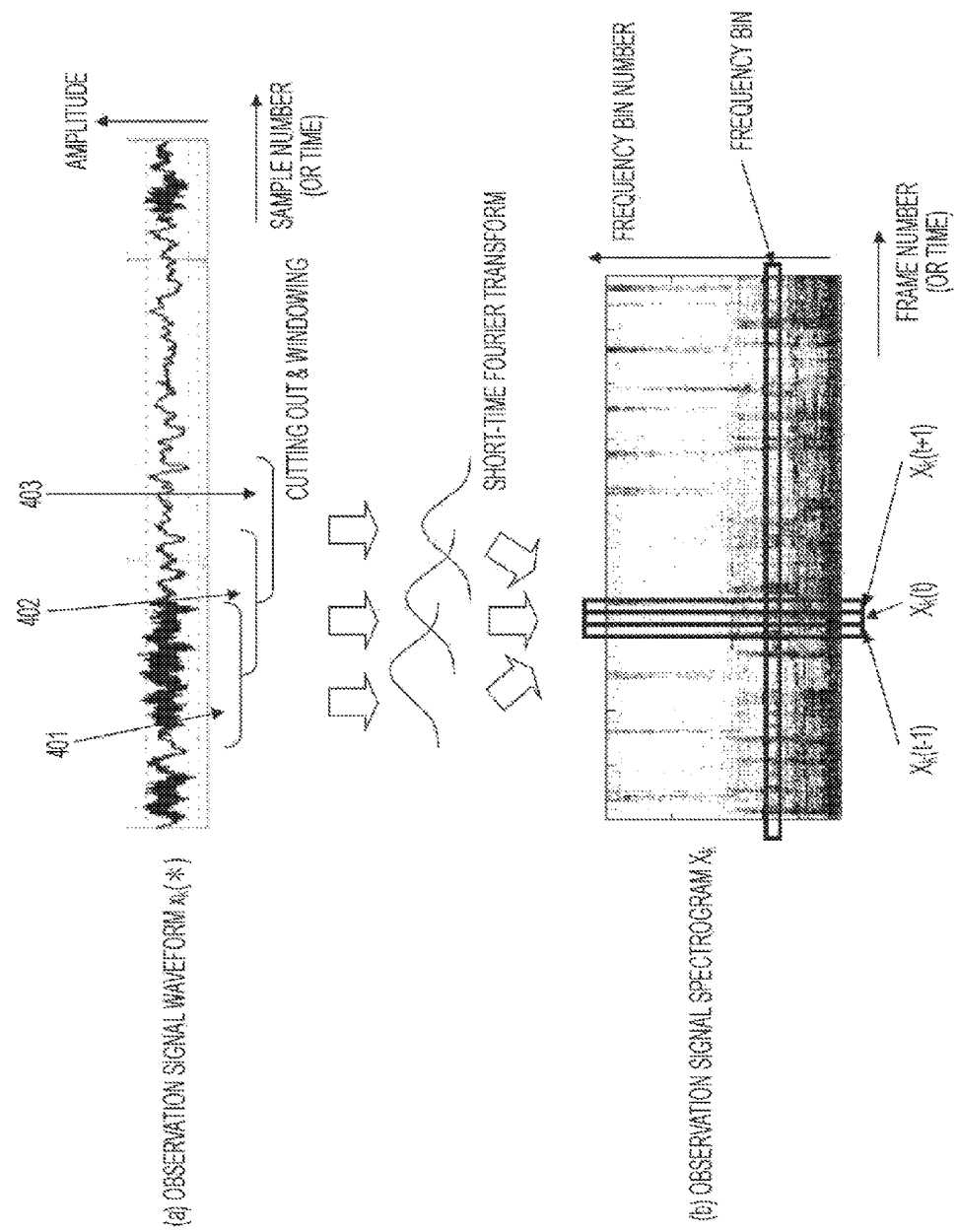
FIG. 14 is a diagram for explaining a short-time Fourier transform (STFT) process in detail.

Referring now to FIG. 14, the short-time Fourier transform (STFT) process is described in detail.

The (a) observation signal waveform x_k(*) shown in FIG. 14 is the waveform x_k(*) of the observation signal observed by the kth microphone in the microphone array 101 formed with the n microphones designed as speech input units in the device shown in FIG. 9, for example.

Data of a certain length is cut out of this observation signal. A cutout unit is called a "frame", and frames 401 through 403 are cutout units in FIG. 14. After a window function such as a Hanning window or a Hamming window is applied to the data of one frame, a short-time Fourier transform is performed, to obtain a spectrum Xk(t) (t being the frame number) that is the data of one frame in the frequency domain.

Between frames to be cut out, the frames 401 through 403 shown in the drawing may overlap one another. As the frames continue to one another in this manner, the spectrums Xk(t−1) through Xk(t+1) can be smoothened. Also, the spectrums arranged in order of frame numbers are called a spectrogram. The data shown in FIG. 14(*b*) is an example of a spectrogram.

The spectrum Xk(t) is a vector having M elements, and the ωth element is represented by Xk(ω, t).

Also, in the spectrogram, a horizontal row of data having the same ω is called a frequency bin.

The sound signal processing device of the present disclosure performs a short-time Fourier transform (STFT) the same number of times as the number of channels. In the description below, an observation signal of a channel k, a frequency bin ω, and a frame t is written as an observation signal Xk(ω, t).

This observation signal is equivalent to an observation signal written in the above equation [1.1], for example.

Also, where the number of points of short-time Fourier transforms (STFTs) is represented by l (the lowercase l), the number M of the frequency bins in one channel can be calculated by M=½+1.

(Step S104)

An accumulation process in step S104 is a process of accumulating time-frequency domain signals (spectrums) generated by performing short-time Fourier transforms (STFTs) on time domain observation signals in step S103, for a predetermined time (10 seconds, for example).

In other words, where the number of frames corresponding to that time is represented by T, the observation signals of T consecutive frames are accumulated in the observation signal buffer 104 shown in FIG. 9.

In the observation signal buffer 104, frame numbers F are associated with frame data (spectrums), so that the data with a predetermined frame number can be retrieved later.

(Step S105)

Step S105 is a frame number update process.

In the frame number update process, the current frame number t is changed to "t+1".

(Step S106)

Step S106 is a branching process based on a condition for performing the processes thereafter once in L frames.

Specifically, the frame number t is divided by a frequency L. If the remainder is 0, the process moves on to step S107. If the remainder is not 0, the process returns to step S102.

(Step S107)

Step S107 is a "speech likeliness" determination process.

This "speech likeliness" determination process is a process of determining whether a "speech-like" signal is included in the block being currently processed, by using a method disclosed in Patent Document 4 (JP 4182444 B2), for example.

Note that, in the flowchart shown in FIG. 13, the "speech likeliness" determination in step S107 is performed once in L frames, but may be performed more often. For example, the "speech likeliness" determination may be performed for each frame. If at least one of the L frames constituting one block is determined to be "speech-like", the block may be determined to be "speech-like".

(Step S108)

A directional point detection process in step S108 is a process of determining directional points from a covariance matrix of observation signals. This aspect will be described later in detail.

(Step S109)

A directional point tracking process in step S109 is a process of determining a speech segment from the directional points detected in the directional point detection process in step S108. This aspect will be described later in detail.

(Step S110)

Step S110 is a block number B update process.

In this block number update process, the current block number B is changed to "B+1".

(Step S111)

Step S111 is a branching process for determining whether the process is to continue. If the process is to continue, the process returns to step S102. If not, the process comes to an end.

Figure 15:
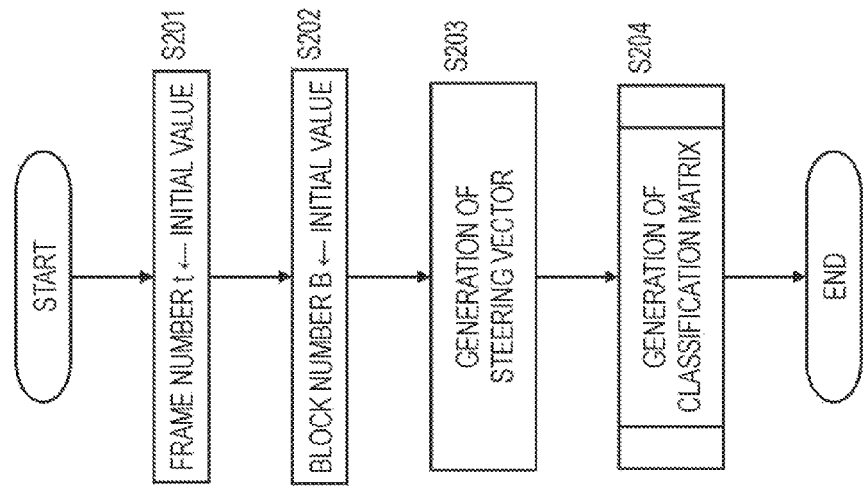
FIG. 15 is a flowchart for explaining in detail the initialization process to be performed in step S101 in the flowchart shown in FIG. 13.

Referring now to the flowchart shown in FIG. 15, the initialization process to be performed in step S101 in the flowchart shown in FIG. 13 is described in detail.

(Steps S201 and S202)

In steps S201 and S202, initial values are assigned to the frame number t and the block number B. The initial values are t=1 and B=1, for example.

(Step S203)

In step S203, a steering vector is generated, and the result is stored into the above described steering vector storage unit 156 shown in FIG. 10. The method of generating the steering vector is the same as that described above with reference to FIG. 11 and the equations [3.1] through [3.3].

(Step S204)

In step S204, the classification matrix and the like are initialized, and the results are stored into the classification matrix buffer 164 shown in FIG. 10. The matrices to be initialized in this step are the following three kinds:

classification matrix C (equation [2.3])
directionality pattern generator matrix D (equation [2.8])
null beam pattern generator matrix N (equation [2.9])

A method of generating these matrices with respect to a general number n of microphones will be described later.

The description of the initialization is now completed.

Figure 16:
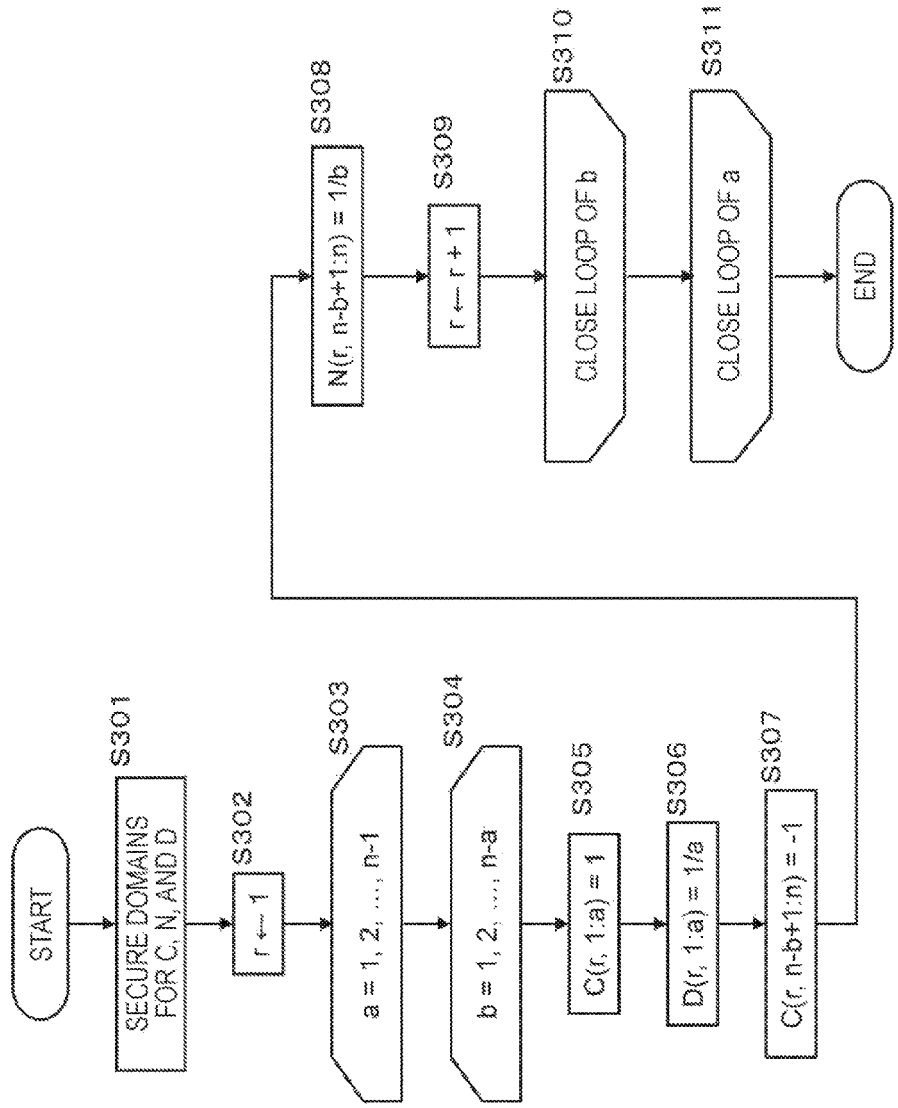
FIG. 16 is a flowchart for explaining in detail the process of generating a classification matrix and the like in step S204 in the detailed flowchart of the initialization process shown in FIG. 15.

Referring now to the flowchart shown in FIG. 16, the process of generating the classification matrix and the like in step S204 in the detailed flowchart of the initialization process shown in FIG. 15 is described in detail.

Note that, in the description with reference to the flowchart shown in FIG. 16, the elements on the xth row and the yth column in a matrix A is written as A(x, y).

For example, in the classification matrix C of the equation [2.3], the element at the lower right corner can be expressed as C(6, 4), and the value is −1. Also, the ranges of suffixes on a row and a column are represented by x:y. For example, in the classification matrix C of the equation [2.3], the leftmost column can be expressed as C(1:6, 1). Also, the element having −1 on the third row in the matrix can be expressed as C(3, 2:4).

(Step S301)

In step S301, domains are secured for the classification matrix C, the directionality pattern generator matrix D, and the null beam pattern generator matrix N, and all the elements are initialized to be 0.

These matrices are the same in size, the number of rows being n(n+1)/2, the number of columns being n.

(Step S302)

In step S302, 1 is assigned to a variable r. This variable r is the index indicating the rows in the matrix in the processes thereafter.

Steps S303 through S311 thereafter form a double loop with two variables a and b. The variable a indicates the number of patterns belonging to the directionality type in classification combinations, and the variable b indicates the number of patterns belonging to the null beam type.

Steps S304 through S310 form a loop with respect to the variable b.

Since "a+b≤n" needs to be satisfied, the maximum value of the variable b in this loop is "n−a".

(Step S305)

Step S305 is a process of setting values for some of the matrix elements of the classification matrix C.

The classification matrix C is the matrix expressed by the above described equation [2.3]. As described above with reference to the equation [2.4], when the classification matrix C is multiplied by a matrix P formed with patterns P_1 through P_n, a difference between the classifying directionality pattern and the classifying null beam pattern can be calculated for each of the classification combinations (equation [2.4]).

Note that, as described above with respect to step S16 shown in FIG. 6, the basic procedures in a directional characteristics pattern classification process are as follows.

(1) In each of the n(n+1)/2 classification combinations, a representative directionality pattern is calculated from the patterns classified as the directionality type. Likewise, a representative null beam pattern is calculated from the patterns classified as the null beam type. These representative patterns are called the "classifying directionality pattern" and the "classifying null beam pattern", respectively.

(2) The distance scale between the classifying directionality pattern and the classifying null beam pattern is calculated, and the result of the classification having the largest distance scale is employed.

The classification matrix C has the elements 1, 0, and −1, as shown in the above described equation [2.3]. Note that, in the initial setting in step S301, all the elements of the classification matrix C are set at 0.

In step S305, among the elements of the classification matrix C, which have been set at 0 in the initial setting, specific elements are changed to 1. Specifically, 1 is assigned to the elements on the first through ath columns on the rth row in the classification matrix C.

This process means that the directional characteristics patterns P_1 through P_a are made to belong to the directionality type in the process of classifying the patterns P by using the rth row in the classification matrix.

Note that, since the classifying directionality pattern is not the average but the sum of the patterns belonging to the directionality type, 1 is assigned to the elements of the first through ath columns on the rth row in the classification matrix C in step S305.

(Step S306)

Step S306 is a process of setting the elements of the directionality pattern generator matrix D.

The directionality pattern generator matrix D is the matrix expressed by the above described equation [2.8].

For example, where the kth element in the vector H expressed by the above described equation [2.7] is the largest, the directionality pattern can be generated by multiplying the vector of the kth row in the directionality pattern generator matrix by the directional characteristics pattern matrix P, as shown in the equation [2.10].

In step S306, 1/a is assigned to the same element positions in the directionality pattern generator matrix D as the positions of the elements in the classification matrix C, to which 1 has been assigned in step S305.

That is, 1/a is assigned to the elements on the first through ath columns on the rth row in the directionality pattern generator matrix D.

Since the directionality pattern is the average of the patterns belonging to the directionality type, the value to be assigned here is not 1 but 1/a, which is the reciprocal of the number of the patterns.

(Step S307)

In step S307, an element setting process is performed to set some of the elements in the classification matrix C at −1.

Specifically, −1 is assigned to the elements on the (n−b+1)th through nth columns on the rth row in the classification matrix C.

This means that the directional characteristics patterns P_{n−b+1} through P_n are made to belong to the null beam type in the classification with respect to the rth row.

Note that, since the classifying null beam pattern is not the average but the sum of the patterns belonging to the null beam type, the value to be assigned here is −1. Also, the reason why −1 is assigned, instead of 1, is that the difference from the classifying directionality pattern is to be calculated (see the right side of the equation [2.4]).

(Step S308)

Step S306 is a process of setting the elements of the null beam pattern generator matrix N.

The null beam pattern generator matrix N is the matrix expressed by the above described equation [2.9].

For example, where the kth element in the vector H expressed by the above described equation [2.7] is the largest, the null beam pattern can be generated by multiplying the vector of the kth row in the null beam pattern generator matrix by the directional characteristics pattern matrix P, as shown in the equation [2.11].

In step S308, 1/b is assigned to the same element positions in the null beam pattern generator matrix N as the positions of the elements in the classification matrix C, to which −1 has been assigned in step S307.

That is, 1/b is assigned to the elements on the (n−b+1)th through nth columns on the rth row in the null beam pattern generator matrix N.

Since the null beam pattern is the average of the patterns belonging to the null beam type, the value to be assigned here is not 1 but 1/b, which is the reciprocal of the number of the patterns.

(Step S309)

Step S309 is a process of updating the row index r. In the row index update process, the index r is changed to r+1.

In step S310, the loop of b is closed. In step S311, the loop of a is closed.

The description of the creation of a new segment is now completed.

Figure 17:
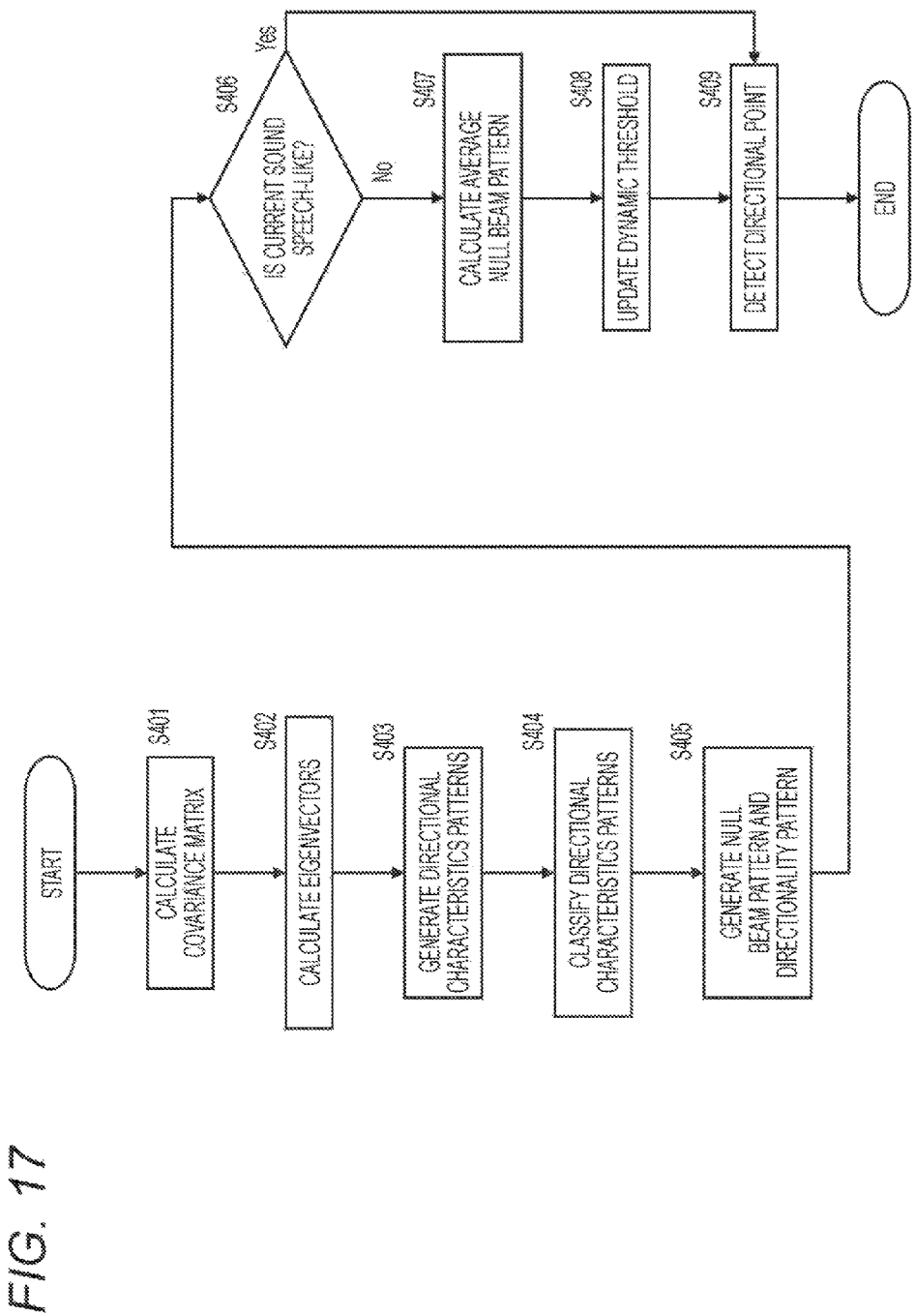
FIG. 17 is a flowchart for explaining in detail the sequence in the directional point detection process to be performed in step S108 in the flowchart of the entire process shown in FIG. 13.

Referring now to the flowchart shown in FIG. 17, the sequence in the directional point detection process to be performed in step S108 in the flowchart of the entire process shown in FIG. 13 is described in detail.

(Step S401)

The processing in steps S401 through S405 is equivalent to the processing in steps S11 through S19 in FIG. 6 described above with reference to FIG. 6.

First, in step S401, a covariance matrix of observation signals is calculated. A covariance matrix calculation process has been described above with reference to FIG. 6, but is again described herein with reference to the calculation formulas shown below. Note that, the equations [4.1] through [4.5] shown below are the same as the equations [1.1] through [1.5] described above.

[Mathematical Formula 4]

$$X(\omega, t) = \begin{bmatrix} X_1(\omega, t) \\ \vdots \\ X_n(\omega, t) \end{bmatrix} \quad [4.1]$$

$$R(\omega) = \langle X(\omega, \tau) X(\omega, \tau)^H \rangle_{t-L' < \tau \leq t} \quad [4.2]$$

$$R(\omega) = V(\omega) \Lambda(\omega) V(\omega)^H \quad [4.3]$$

$$V(\omega) = [V_1(\omega) \ \ldots \ V_n(\omega)] \quad [4.4]$$

$$\Lambda(\omega) = \begin{bmatrix} \lambda_1(\omega) & & 0 \\ & \ddots & \\ 0 & & \lambda_n(\omega) \end{bmatrix} \quad [4.5]$$

Referring to the above equations [4.1] through [4.5], the covariance matrix calculation process in step S401 is described.

The result of a short-time Fourier transform (STFT) performed on a signal observed by the kth microphone among the n microphones is represented by $X_k(\omega, t)$, and a vector formed with $X_1(\omega, t)$ through $X_n(\omega, t)$ is represented by $X(\omega, t)$ (equation [4.1]).

In this equation, ω represents the frequency bin number (ω=1, 2, . . . , M), and t represents the frame number.

Next, for each frequency bin ω, a covariance matrix $R(\omega)$ of $X(\omega, t)$ is calculated from frames (equation [4.2]).

In the equation [4.2], $\langle \cdot \rangle_{\{t-L' < \tau \leq t\}}$ indicates calculating the average of the values in the brackets among the frames that satisfy $t-L' < \tau \leq t$.

In the equation, t represents the frame number at the end of the block, L' represents the length of the block (the number of frames), and t−L'+1 represents the frame number at the start of the block.

Note that, the block may be the block shown in FIG. 1, for example, and the respective blocks correspond to the respective frames.

The covariance matrix calculated according to the above equation [4.2] is represented by $R(\omega)$.

In step S401, this covariance matrix is calculated.

Note that, this covariance matrix is equivalent to the covariance matrix calculated in step (S11) in FIG. 6.

Note that, although L' in the above equation [4.2] represents the length of the block (the number of frames), this value may differ from the frequency L (the frequency L in step S106 in the flowchart of the entire process shown in FIG. 13). For example, where L=8 and L'=16, a covariance matrix is calculated once in eight frames, but one covariance matrix is calculated from the observation signals of 16 frames.

(Step S402)

In step S402, eigenvalue decomposition is performed on the covariance matrix $R(\omega)$, to calculate eigenvectors. The eigenvectors to be calculated through the eigenvalue decomposition are expressed by the above equation [4.3].

In the equation [4.3], $\Lambda(\omega)$ represents a diagonal matrix formed with eigenvalues (equation [4.5]), and $V(\omega)$ represents a matrix formed with eigenvectors $V\_1(\omega)$ through $V\_n(\omega)$ (equation [4.4]).

Also, the superscript H represents Hermitian transpose (transposition performed after elements are converted into conjugated complex numbers).

Since the covariance matrix $R(\omega)$ satisfies $R(\omega)^H = R(\omega)$, all the eigenvalues $\Lambda\_1(\omega)$ through $\Lambda\_n(\omega)$ are real numbers, and these real numbers are arranged in descending order.

The eigenvectors $V\_1(\omega)$ through $V\_n(\omega)$ are 1 in size, and are orthogonal to one another.

The eigenvectors to be calculated in step S402 are equivalent to the eigenvectors in step S12 shown in FIG. 6.

Note that, the covariance matrix calculation process and the eigenvector calculation process according to the above equations [4.1] through [4.5] are basically performed for all the frequency bins ω that satisfy 1<ω<M. However, these calculation processes may be performed for only some of the frequency bins, like the steering vector calculation process described above with reference to FIG. 11.

At the end of step S402, n eigenvectors have been calculated for each frequency bin.

(Step S403)

Step S403 is a process of generating a directional characteristics pattern for each frequency bin, and is equivalent to the processing in steps S13 through S15 in FIG. 6 described above with reference to FIG. 6, for example. Specifically, the directional characteristics patterns Pa through Pd shown in FIG. 6 (S13) are generated, and directional characteristics patterns shared among all the frequency bins (FIG. 6 (S15)) are generated by calculating the averages and the like among the frequency bins (FIG. 6 (S14)).

This series of processes are now described with reference to the equations [5.1] through [5.3] shown below.

[Mathematical Formula 5]

$$P_k(\omega, \theta) = |V_k(\omega)^H S(\omega, \theta)|^2 \quad [5.1]$$

$$P_k(\theta) = \log\left\{\sum_\omega P_k(\omega, \theta)/\Omega\right\} \quad [5.2]$$

$$P_k(\theta) \leftarrow P_k(\theta) - \max_\theta P_k(\theta) \quad [5.3]$$

In the ωth frequency bin, the component of the direction θ of the directional characteristics pattern corresponding to the kth eigenvector is represented by P_k(ω, θ).

The value is the square of the gain in that direction, and is calculated according to the equation [5.1]. This calculation is performed for all the directions θ and the frequency bins ω, so that the directional characteristics patterns for the respective frequency bins (the directional characteristics patterns Pa through Pd shown in FIG. 6 (S13)) are calculated.

In this manner, the steering vectors corresponding to the respective directions are applied to the eigenvectors according to the equation [5.1]. As a result, n directional characteristics patterns indicating the relationships between direction and sensitivity are generated.

The averages and the like among the frequency bins are calculated (FIG. 6 (S14)) according to the above equation [5.2]. In this equation [5.2], the sigma symbol represents the sum with respect to the current frequency bins ω. Ω represents the number of the frequency bins. The base of the logarithm may be any value, and is 10 in this example.

Note that, as for the current frequency bins ω, all the frequency bins excluding ω=1 (direct current) and ω=M (Nyquist frequency) are basically used (that is, 1<ω<M), but only the frequency bins that satisfy a certain condition may be used, as in the steering vector generation process described above with reference to FIG. 11. For example, to reduce the amount of calculation, only the frequency bins corresponding to multiples of a certain number, such as even numbers and multiples of 3, may be used. Alternatively, only the frequency bins corresponding to the frequency band containing most speeches may be used, as the direction of arrival is estimated to perform speech detection.

The maximum value of P_k(θ) is adjusted to 0 by applying the equation [5.3] to the result of the equation [5.2]. The calculations according to the equation [5.2] and the equation [5.3] are performed with respect to all the directions θ, so that the directional characteristics patterns shared among all the frequency bins (the directional characteristics patterns P1 through P4 shown in FIG. 6 (S15)) are obtained. Because of the effect of the equation [5.3], the directional characteristics patterns have negative values, except for that of the direction with the maximum value 0.

Note that, although the equation [5.2] expresses the average among the frequency bins, the result of the equation [5.3] remains the same even if the average is replaced with a sum (or even if the division by Ω is skipped).

(Step S404)

In step S404, a classification process is performed on the n directional characteristics patterns generated through the above described processes.

As described above, the classification process can be performed through the following procedures.

(1) In each of the n(n+1)/2 classification combinations, a representative directionality pattern is calculated from the patterns classified as the directionality type. Likewise, a representative null beam pattern is calculated from the patterns classified as the null beam type. These representative patterns are called the "classifying directionality pattern" and the "classifying null beam pattern", respectively.

(2) The distance scale between the classifying directionality pattern and the classifying null beam pattern is calculated, and the result of the classification having the largest distance scale is employed.

An Euclidean distance is used as the distance scale. Also, the sum (not the average) of the patterns classified as the directionality type is used as the classifying directionality pattern. Likewise, the sum of the patterns classified as the null beam type is used as the classifying null beam pattern.

The classifying directionality pattern and the classifying null beam pattern are generated for each classification combination. The process of calculating the Euclidean distances between them is the same as that described above with reference to the equations [2.1] through [2.11].

The vector H formed with the Euclidean distances between the directionality patterns and the null beam patterns corresponding to the respective classification results is calculated according to the equation [2.7] and the like, and a check is made to determine which element is the largest element in the vector. Thus, an optimum classification result is determined.

(Step S405)

After the optimum classification result is determined, the directionality pattern and the null beam pattern corresponding to the optimum classification result are generated in step S405.

These patterns are equivalent to the directionality pattern P_D and the null beam pattern P_N shown in FIG. 6.

The process of generating the respective patterns can be performed by comparing the elements of the vector H expressed by the above described equation [2.7], for example.

That is, where the kth element in the vector H in which each element indicates the square of the Euclidean distance between the classifying directionality pattern and the classifying null beam pattern in accordance with each corresponding classification result is the largest, the directionality pattern P_D is generated according to the equation [2.10] using D_K in the equation [2.8]. The null beam pattern P_N is generated according to the equation [2.11] using N_K in the equation [2.9].

In this manner, one directionality pattern and one null beam pattern are determined.

Step S406 and the processing that follows in FIG. 17 are carried out as a process of detecting directional points by using these two patterns.

(Step S406)

Step S406 is a branching process in accordance with the result of the "speech likeliness" determination process in step S107 in the flowchart of the entire process shown in FIG. 13. The process moves on to step S407, only if the observation signal of the current block is determined to be "non-speech-like".

If the observation signal is determined to be "speech-like", on the other hand, the threshold updating in steps S408 and S409 is skipped, and the process moves on to step S409.

(Step S407)

Steps S407 and S408 are the processes to be performed if the sound of the current block is determined not to be speech-like in step S406.

In step S407, the average between the current null beam pattern and the past null beam patterns is calculated. The average calculating operation is performed between the null beam patterns corresponding to blocks determined to be "non-speech-like". Furthermore, the null beam patterns generated a certain period of time ago or earlier are not to be reflected by the average. In view of this, the average is updated according to an equation [6.1] using a forgetting factor, for example, as shown below.

[Mathematical Formula 6]

$$\overline{P_N} \leftarrow (1-\alpha)\overline{P_N} + \alpha P_N \qquad [6.1]$$

$$T_d(\theta) = \min(\beta \overline{P_N}(\theta) - \gamma, T_s) \qquad [6.2]$$

Note that, in this equation [6.1], the P_N with an overbar represents the average of null beam patterns. This average will be hereinafter referred to as the average null beam pattern, and be denoted by bar(P_N).

In the equation, $\alpha$ represents the forgetting factor, and a positive value close to 0 (such as 0.01) is used.

The equation [6.1] means that a weighted average between the average null beam pattern bar(P_N) at the point of time and the null beam pattern P_N in the block is calculated with weights $\alpha-1$ and $\alpha$, respectively, and the result of the calculation is set as the new average null beam pattern.

In the equation [6.1], $\alpha$ is a much smaller value than $1-\alpha$. Therefore, even if the result of the "speech likeliness" determination in step S406 is wrong, the average null beam pattern (and the later described dynamic threshold) is hardly affected.

Note that, a vector in which all the elements are 0 is used as the initial value of the average null beam pattern bar (P_N). Alternatively, the later described constants T_s, $\beta$ and $\gamma$ may be used, and all the elements may be set at a value $(T_s+\gamma)/\beta$. In that case, the dynamic threshold starts from T_s. In other words, T_s, which is the upper limit of the dynamic threshold, functions as the initial value of the dynamic threshold.

(Step S408)

In step S408, the dynamic threshold is calculated from the average null beam pattern. As described above with reference to FIG. 7, the dynamic threshold is preferably set at a position slightly lower than the average null beam pattern, and therefore, is calculated according to the equation [6.2], for example. In this equation, the left side $T_d(\theta)$ is the dynamic threshold corresponding to the direction $\theta$. The right side min( ) indicates that the smaller one of two arguments is to be selected. The element corresponding to the direction $\theta$ in the average null beam pattern P_N is represented by bar(P_N($\theta$)). Here, $\beta$ is a value equal to or greater than 1, and $\gamma$ is a value equal to or greater than 0. These two values are adjusted, so that the dynamic threshold is set at such a value that any directional point is not wrongly detected when no speeches exist even though interfering sound is being generated. Alternatively, only $\gamma$ may be adjusted while $\beta$ is fixed at 1, or only $\beta$ may be adjusted while $\gamma$ is fixed at 0.

T_s in the equation [6.2] is a constant equal to or smaller than 0, and represents the upper limit of the dynamic threshold. The reason why T_s is used as well as $\beta$ and $\gamma$ is to prevent wrong detection of directional points mainly in quiet environments. In a quiet environment where no apparent sound sources exist, the average null beam pattern converges to a negative value close to 0, and therefore, even a small valley in the null beam pattern easily exceeds the threshold, and is detected as a directional point. If $\beta$ and $\gamma$ are adjusted to prevent such directional point detection, it might become difficult for the null beam pattern to exceed the dynamic threshold (to detect a speech) in an environment where a sound source does exist. In view of this, the threshold in a quiet environment can be set as T_s (and min( )), independently of the threshold originating from the average null beam pattern.

Note that, in a case where the average null beam pattern is generated from directional characteristics patterns having their maximum value adjusted to 0, at least one operation between an operation of positive constant multiplication and an operation of positive constant subtraction is performed on the average null beam pattern, so that a threshold having a lower value than the average null beam pattern can be calculated.

(Step S409)

Lastly, directional point detection is performed in step S409. Specifically, a direction that satisfies all the conditions described below is determined to be a directional point.

Condition 1: the direction is a valley in the null beam pattern.

Condition 2: the depth of the valley is greater than that of the dynamic threshold.

Condition 3: A peak of the directionality pattern exists near the direction.

Condition 4: The valley of the direction is one of the first through (n-1)th deepest valleys.

These conditions are described below in detail.

The condition 1 can be expressed by the equation [7.1] shown below.

[Mathematical Formula 7]

$$P_N(\theta_{i-1}) > P_N(\theta_i) < P_N(\theta_{i+1}) \qquad [7.1]$$

$$P_N(\theta_i) < T_d(\theta_i) \qquad [7.2]$$

$$P_D(\theta_{i'-1}) < P_D(\theta_{i'}) > P_D(\theta_{i'+1}) \qquad [7.3]$$

$$|\theta_i - \theta_{i'}| \leq \theta_{margin} \qquad [7.4]$$

In the above equation, $\theta_i$ represents one of the directions $\theta_{min}$ through $\theta_{max}$ in the above described equation [2.1]. Also, in the above equation, $\theta_{\{i-1\}}$ represents the direction of the neighboring element on the left side in the vector in the equation [2.1], and $\theta_{\{i+1\}}$ represents the direction of the neighboring element on the right.

The condition 2 can be expressed by equation [7.2].

As for the condition 3, the direction of the valley in the null beam pattern does not necessarily match the direction of the peak in the directionality pattern, and therefore, determination is performed, with a predetermined margin being allowed. This process can be expressed by equation [7.3] and equation [7.4]. Specifically, the peak in the directionality pattern is detected according to the equation [7.3], and the direction of the peak is represented by $\theta_{\{i'\}}$. As shown in the equation [7.4], if the absolute value of the difference between $\theta_i$ and $\theta_{\{i'\}}$ is equal to or smaller than a margin $\theta_{margin}$ (or if at least one direction $\theta_{\{i'\}}$ satisfies the equation [7.4]), it is determined that "the peak of the directionality pattern exists near the direction of the valley of the null beam pattern".

The condition 4 is based on the fact that the maximum number of null beams to be formed with the n microphones is n-1 (excluding the null beam originating from the spatial alias or the symmetry of the directional characteristics patterns). The method of determining the first through (n-1)th deepest valleys is disclosed in Patent Document 1 (JP 2012-150237 A) and others.

The description of the directional point detection process is now completed.

Figure 18:
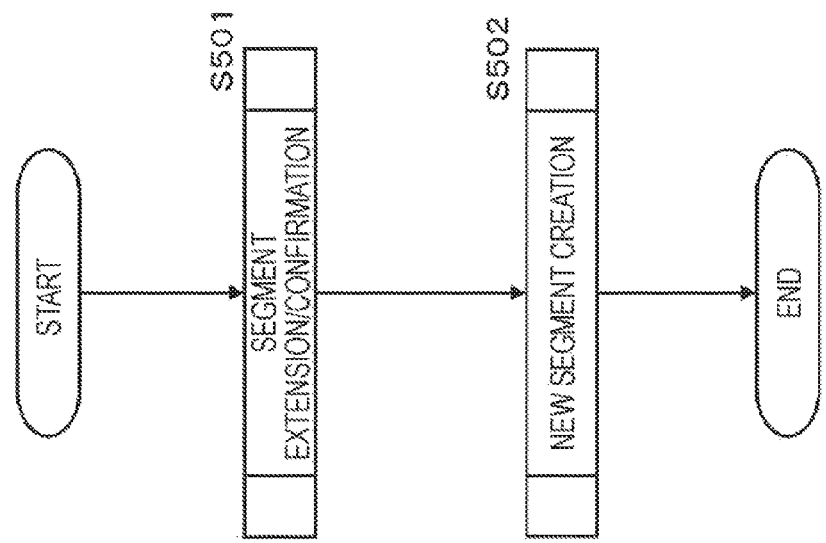
FIG. 18 is a flowchart for explaining in detail the directional point tracking process in step S109 in the flowchart of the entire process shown in FIG. 13.

Referring now to the flowcharts shown in FIG. 18 and figures that follow, the directional point tracking process in step S109 in the flowchart of the entire process shown in FIG. 13 is described in detail.

FIG. 18 is a flowchart of the entire directional point tracking process.

(Step S501)

Step S501 is a segment extension/confirmation process. This process is performed on an in-process segment stored in the in-process segment buffer 311 in the configuration of the directional point tracking unit 107 described above in detail with reference to FIG. 12.

An in-process segment is extended or confirmed with the directional point newly detected in the directional point detection process in step S108 in the flowchart of the entire process shown in FIG. 13. The confirmed segment is then transmitted to a process in a later stage (such as sound source extraction). This aspect will be described later in detail.

Note that, an "in-process segment" is a segment that is in a state between the generation in the new segment creation process in the next step S502 and the segment confirmation.

(Step S502)

Step S502 is a new segment creation process, and is the process for detecting the segment having the block being currently processed at is start. This aspect will also be described later in detail.

Figure 19:
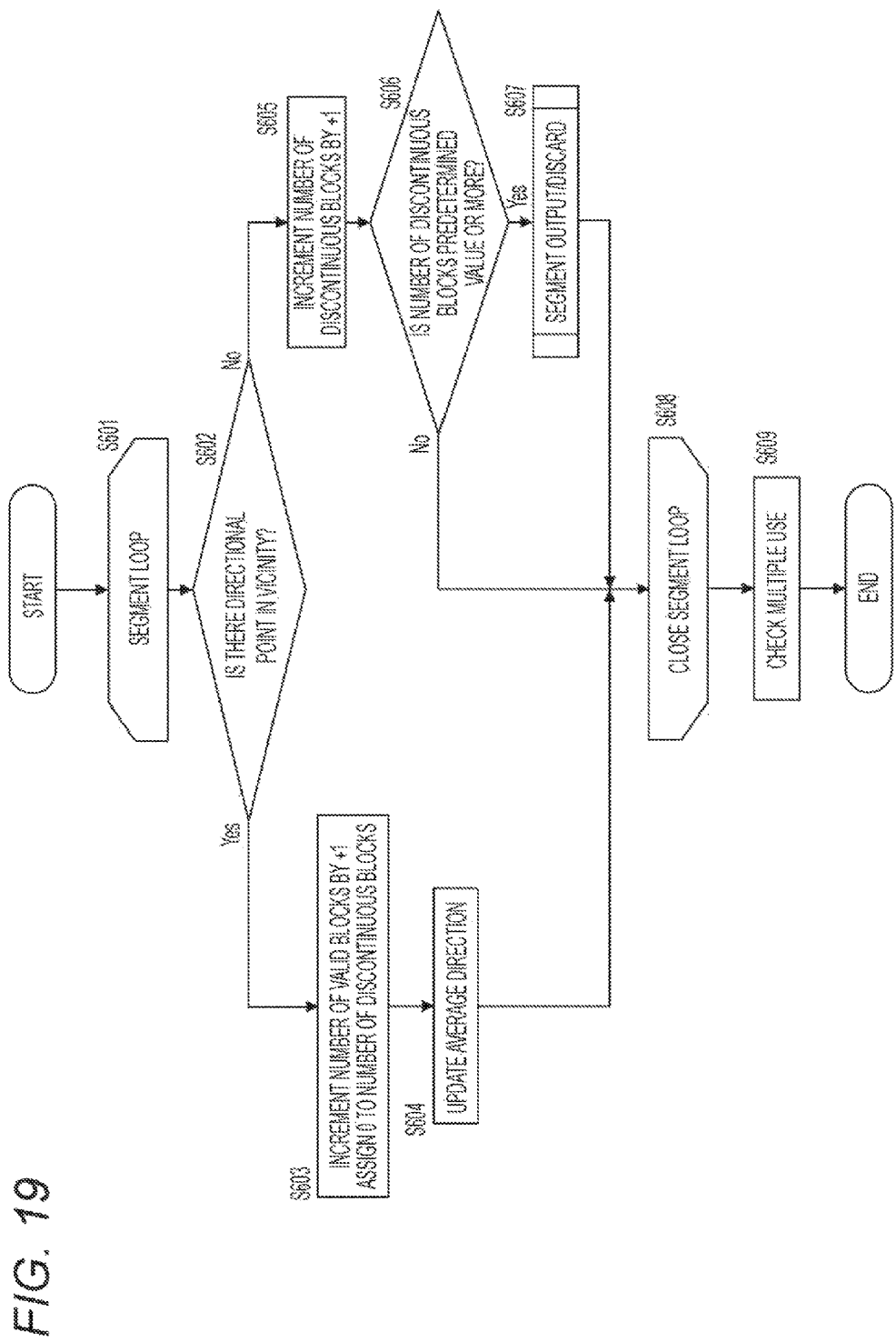
FIG. 19 is a flowchart for explaining in detail the sequence in the segment extension/confirmation process to be performed in step S501 in the flowchart of the directional point tracking process shown in FIG. 18.

Referring now to the flowchart shown in FIG. 19, the sequence in the segment extension/confirmation process to be performed in step S501 in the flowchart of the directional point tracking process shown in FIG. 18 is described in detail.

This "segment extension/confirmation process" is a process to be performed on the in-process segments stored in the in-process segment buffer 311 shown in FIG. 12. The loop for the in-process segments is formed by steps S601 through S608, and the processes in steps S602 through S607 are performed on each one of the in-process segments.

(Step S602)

In step S602, a check is made to determine whether a directional point exists near the in-process segment. The average direction 325 in the segment information set 311n as the in-process segment shown in FIG. 12 is compared with the value of a directional point. If the difference between the two values is within a predetermined range (within ±10 degrees, for example), it is determined that a directional points exists near the in-process segment.

In a case where a directional point exists, the process moves on to step S603.

In a case where any directional point does not exist, the process moves on to step S605.

(Step S603)

Steps S603 and S604 are a process related to segment extension.

In step S603, the number of valid blocks (the number of valid blocks 324 in the segment information set 311n shown in FIG. 12) is incremented by +1, and 0 is assigned to the number of discontinuous blocks (the number of discontinuous blocks 326 in the segment information set 311n shown in FIG. 12).

(Step S604)

In step S604, the average of the directions from the start of the segment to the blocks being currently analyzed is calculated. Specifically, the average direction prior to updating (the value stored in the average direction 325 in the segment information set 311n shown in FIG. 12) is represented by A, the number of valid blocks (the value incremented by +1 in step S603) is represented by B, and the value of the directional point is represented by C. In this case, A is updated according to the expression shown below.

$$A \leftarrow \{(B-1)A+C\}/B$$

(Steps S605 and S606)

In a case where any directional point does not exist in the vicinity in step S602, the process moves on to step S605. In this case, directional points that have been continuous so far have become discontinuous. If the discontinuity lasts for a certain period of time or longer, the discontinuing point is determined to be the end of the segment.

Because of this process, the number of discontinuous blocks (the number of discontinuous blocks 326 in the segment information set 311n shown in FIG. 12) is incremented by +1 in step S605, and a check is made to determine whether the value is equal to or more than a predetermined value (five blocks, for example) in step S606.

If the length of discontinuity is equal to or more than the predetermined value, the end of the segment is confirmed, and the process moves on to the "segment output/discard" process in step S607. This process will be described later in detail.

If the length of discontinuity is smaller than the predetermined value, on the other hand, step S607 is skipped, and the process moves on to step S608.

After steps S601 through S608 have been carried out on all the in-process segments, the process exits the loop, and moves on to the "multiple use check" process in step S609.

(Step S609)

In step S609, a check is made to determine whether one directional point is used in two or more in-process segments (multiple use). If one directional point is used in two or more segments, only the longest segment among those segments is maintained, and the other segments are deleted. Alternatively, those segments are merged, and a new segment is generated. The reason why multiple use is checked, and the method of checking multiple use are disclosed in Patent Document 1 (JP 2012-150237 A).

Figure 20:
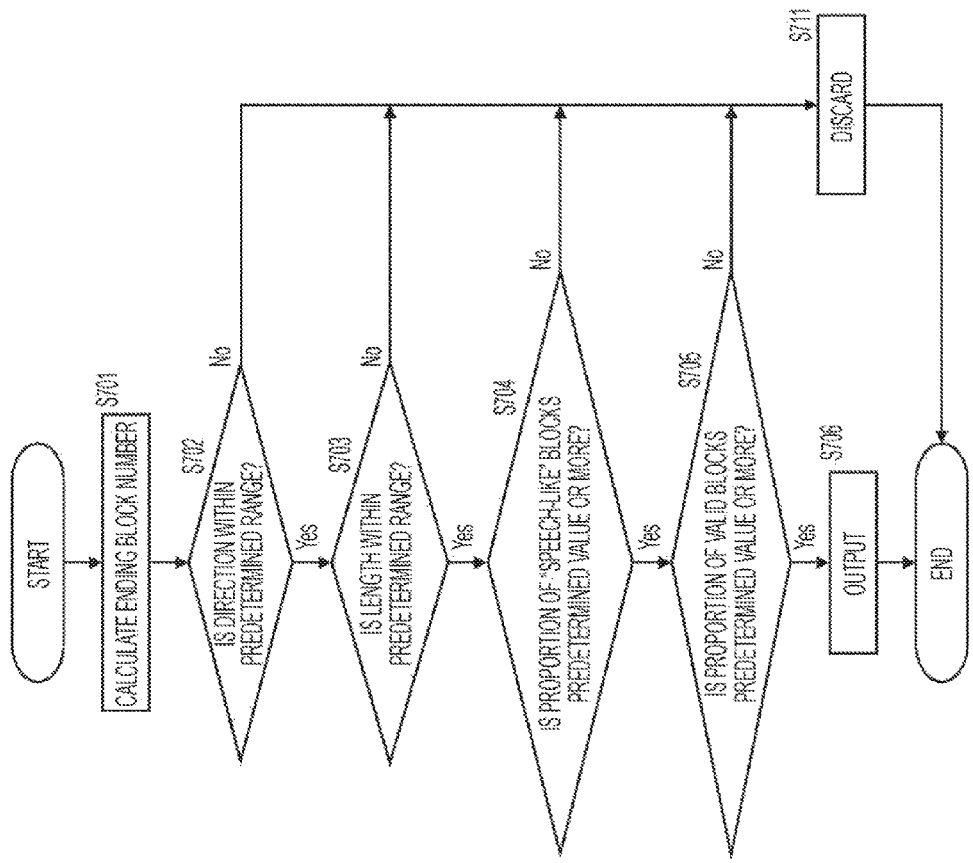
FIG. 20 is a flowchart for explaining in detail the sequence in the "segment output/discard" process to be performed in step S607 in the flowchart shown in FIG. 19.

Referring now to the flowchart shown in FIG. 20, the sequence in the "segment output/discard" process to be performed in step S607 in the flowchart shown in FIG. 19 is described in detail.

Note that, the "segment output" process is to send a confirmed segment to a process in a later stage (a sound source extracting unit, for example), and the "segment discard" process is to discard a segment that does not satisfy a predetermined condition, so that the segment will not be used in later processes.

(Step S701)

In step S701, the ending block number is calculated, and the value is assigned to the ending block number 323 in the segment information set 311n in the in-process segment buffer 311 of the directional point tracking unit 107 shown in FIG. 12.

Where the current block number (the value of the current block number 331 in FIG. 12) is represented by B, and the predetermined value in the determination process in step S606 in the flowchart shown in FIG. 19 is represented by B_{discontinue}, the ending block number is calculated according to the equation shown below.

$$\text{Ending block number} = B - B\_\{discontinue\}$$

Steps S702 through S705 described below are determination processes based on the respective conditions a segment should satisfy. If all the conditions are satisfied, the process moves on to step S706. The respective conditions will be described below. It should be noted that the determination processes based on the respective conditions may be performed in any appropriate order.

(Step S702)

Step S702 is determination as to whether the average direction of the segment (the average direction 325 in the segment information set 311n shown in FIG. 12) is within a predetermined range. For example, in a case where it is apparent that the user speaks only from almost the front (near 0 degrees) of a system using speech recognition, the direction of target sound to be received is limited to the range of −5 to +5 degrees, and, if the direction of a segment is outside the range, the segment is discarded. In a case where target sound sources may exist in every direction, on the other hand, this determination is not performed.

(Step S703)

Step S703 is determination as to the lengths of segments. As shorter segments than a predetermined value (shorter than 0.1 seconds, for example) are discarded, wrong segment detection can be reduced. Also, as longer segments than a predetermined value (30 seconds, for example) are discarded, wrong detection of segments that are too long to be processed in a later stage is prevented.

Note that, as described in the problems of conventional techniques, an upper limit is set on segment lengths so as to prevent wrong detection of a constantly-ringing interfering sound as a speech segment in Patent Document 1 (JP 2012-150237 A). In the present disclosure, however, detection of such a constantly-ringing interfering sound will stop soon enough by virtue of the dynamic threshold based on "speech likeliness". Therefore, the upper limit of segment lengths can be determined at the convenience of the later processes.

(Step S704)

Step S704 is determination as to the proportion of "speech-like" blocks. Among the blocks constituting a segment, the number of blocks determined to be "speech-like" is counted. If the proportion of the number of such blocks to the number of blocks in the segment (the difference between the ending block number and the beginning block number +1) is smaller than a predetermined value (0.5, for example), the segment is discarded. The number of "speech-like" blocks can be obtained by converting the beginning block number (the beginning block number 322 in the segment information set 311n shown in FIG. 12) and the ending block number (the ending block number 323 in the segment information set 311n shown in FIG. 12) into frame numbers, and inquiring of the observation signal buffer (the observation signal buffer 104 shown in FIG. 9) about the frame numbers.

(Step S705)

Step S705 is determination as to the proportion of the valid blocks (blocks having a directional point) in a segment.

Where the beginning block number (the beginning block number 322 in the segment information set 311n shown in FIG. 12) of the segment is represented by $B\_\{begin\}$, the ending block number (the ending block number 323 in the segment information set 311n shown in FIG. 12) is represented by $B\_\{end\}$, and the number of valid blocks (the number of valid blocks 324 in the segment information set 311n shown in FIG. 12) is represented by $B\_\{valid\}$, the proportion of the valid blocks can be calculated according to the equation shown below.

$$\text{Proportion of valid blocks} = B\_\{valid\}/(B\_\{end\} - B\_\{begin\} + 1)$$

A check is made to determine whether this value is equal to or more than a predetermined value (0.5, for example). If the proportion of the valid blocks is low, the segment is highly likely to have been generated by discontinuously connecting directional points that were wrongly detected. As such segments are discarded, wrong segment detection is reduced.

(Step S706)

If all the conditions are satisfied in steps S702 through S705, the process moves on to the "output" process in step S706. In this step, the segment is removed from the in-process segment buffer (the in-process segment buffer 311 shown in FIG. 12), and is sent to a processing unit in a later stage, such as a speech recognition unit.

(Step S711)

If even one of the conditions is not satisfied in the determination processes in steps S702 through S705, the process moves on to the "discard" process in step S711. In this step, the segment is simply removed from the in-process segment buffer (the in-process segment buffer 311 shown in FIG. 12), and is not output to a processing unit in a later stage.

Figure 21:
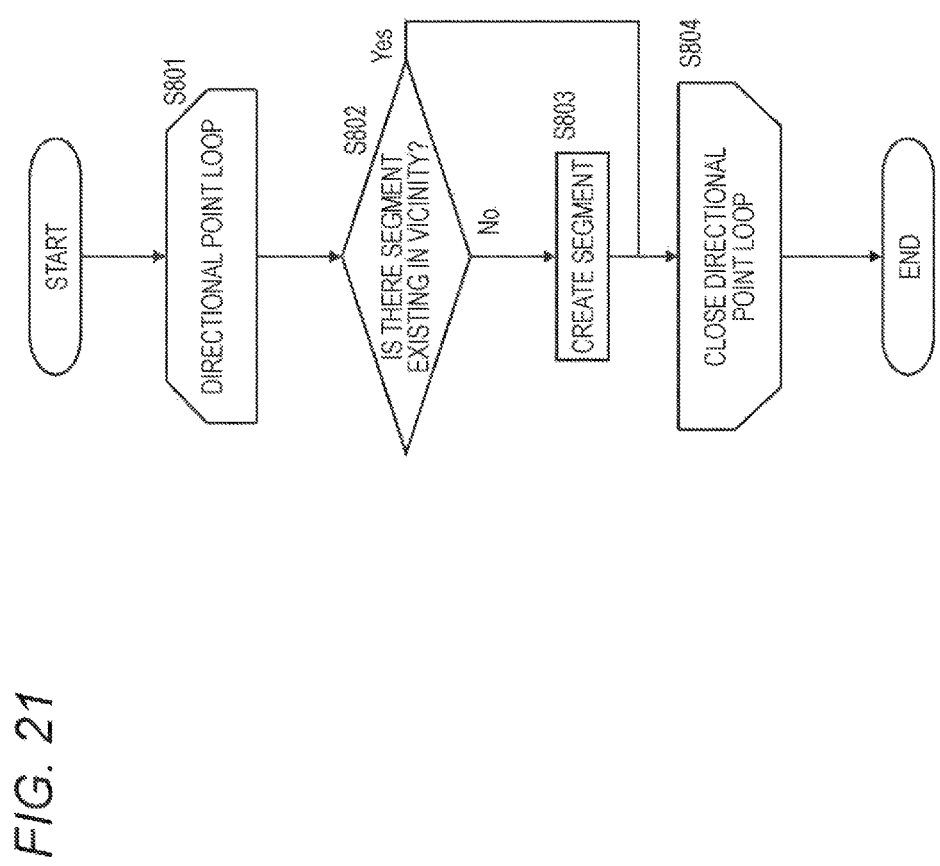
FIG. 21 is a flowchart for explaining in detail the sequence in the new segment creation process to be performed in step S502 in the flowchart of the directional point tracking process shown in FIG. 18.

Referring now to the flowchart shown in FIG. 21, the sequence in the new segment creation process to be performed in step S502 in the flowchart of the directional point tracking process shown in FIG. 18 is described in detail.

In the flowchart shown in FIG. 21, the processes in steps S801 through S804 constitute a loop with respect to directional points, and each of the directional points detected in step S108 in the flowchart of the entire process shown in FIG. 13 is subjected to the processes in steps S801 through S804.

(Step S802)

In step S802, a check is made to determine whether an in-process segment exists near the current directional point. This determination process is a similar process as the determination process in step S602 in the flowchart shown in FIG. 19. If any in-process segment does not exist in the vicinity, the directional point is regarded as the starting point of a segment, and the process moves on to the "segment creation" in step S803. If an in-process segment exists in the vicinity, the process in step S803 is skipped.

(Step S803)

In step S803, the segment information sets 311a through 311n described above with reference to FIG. 12 are generated. Specifically, predetermined values are assigned to the respective slots of the segment ID 321, the beginning block number 322, the ending block number 323, the number of valid blocks 324, the average direction 325, and the number of discontinuous blocks 326, so that a new segment information set is generated.

The values to be assigned to the respective slots are described below.

A value that is incremented by +1 every time a segment is generated is assigned to the segment ID 321. Specifically, 1 is assigned to the segment ID of the segment generated first, and the values assigned to the segments generated thereafter are 2, 3, . . . .

The current block number 331 is assigned to the beginning block number 322.

Since the end has not been detected yet at this point of time, a value indicating "undefined" is assigned to the ending block number 323. Alternatively, the current block number 331 may be assigned to the ending block number 323.

The direction indicated by the directional point is assigned to the average direction 325.

Meanwhile, 0 is assigned to the number of discontinuous blocks 326, and 1 is assigned to the number of valid blocks 324.

After steps S802 and S803 have been carried out on all the directional points in the block, the new segment creation process comes to an end.

The description of processes is now completed.

[6. Effects of the Processes to be Performed by the Sound Signal Processing Device According to the Present Disclosure]

In the processes according to the present disclosure, the speech detection based on estimation of a direction of arrival has the features described below.

(1) The average of directional characteristics patterns among the frequency bins is calculated, and these directional characteristics patterns are classified into a directionality type, a null beam type, and a neutral type. The average of the directional characteristics patterns classified as directionality-type patterns and the average of the directional characteristics patterns classified as null-beam-type patterns are calculated. In this manner, a directionality pattern and a null beam pattern are generated.

(2) The threshold for the null beam pattern is updated only when an input signal is determined to be "speech-like". Specifically, the average of the null beam patterns among the blocks determined to be "speech-like" is calculated, and the threshold is set at a slightly lower value than the average null beam pattern.

In the above aspect (1), an averaging operation is performed among more directional characteristics patterns than in conventional cases disclosed in Patent Document 1 (JP 2012-150237 A) and the like, and the generated directionality pattern and null beam pattern are smooth, having fewer irregularities than in the conventional cases. As a result, it is possible to reduce the occurrence of the problem of wrong segment detection caused by a false directional point detected when a valley of a null beam pattern and a peak of a directionality pattern become close to each other.

Also, in the above aspect (2), the threshold for the null beam pattern is dynamically and appropriately set. Thus, the problems that are difficult to solve with a static threshold can be solved.

Particularly, in a situation where an interfering sound is constantly emitted or in a case where noise of the same phase enters all the microphones, a false valley is formed in a null beam pattern in the conventional cases, and a directional point is detected from the false valley. As a result, a false speech segment that does not correspond to any speech is detected. If such a false segment is discarded, a speech from the same direction as the false valley is detected.

In the processes according to the present disclosure, on the other hand, the threshold is dynamically updated, so that the threshold is appropriately set at a slightly deeper position than the false valley. Accordingly, when there is no speeches, any segment in the direction of the false valley is not detected. When there is a speech from the direction of the false valley, however, a segment in that direction can be appropriately detected.

Also, another advantageous effect of the dynamic threshold is that wrong detection of a non-speech sound source as a speech segment can be easily prevented. In the conventional cases, speech detection based on estimation of a direction of arrival has the problem of wrong detection of a non-speech sound source as a speech segment in principle, as long as the sound source is constantly emitted from the same direction. Therefore, restrictions are put on directions and segment lengths so that non-speech segments are discarded. Also, after sound source extraction, speech recognition, and the like are performed on a non-speech segment through the processes in later stages, the non-speech segment is discarded in accordance with the score and the reliability of the speech recognition.

However, the restrictions put on directions and segment lengths have a side effect, and an actual speech might be discarded. Meanwhile, the use of the score and the reliability of speech recognition also has problems, such as an increase in the amount of calculation, wrong determinations, and a longer wait time before generation of a recognition result.

In the present disclosure, on the other hand, the threshold is dynamically updated, so that the threshold can be set at a deeper position than a valley formed by a constantly-ringing non-speech sound source. Thus, any segment in that direction is not detected, except for the time immediately after activation and the time immediately after the start of emission of an interfering sound. Consequently, the above described side effect, the increase in the amount of calculation, and the longer wait time can be avoided.

In the above described manner, the accuracy of speech detection is increased by the present disclosure. As a result, the usefulness of a system capable of speech detection, or particularly, a system capable of speech recognition, becomes higher.

[7. Summary of the Configuration of the Present Disclosure]

Embodiments of the present disclosure have been described so far by way of specific examples. However, it is obvious that those skilled in the art can make modifications to and substitutions of the embodiments without departing from the scope of the present disclosure. That is, the present invention is disclosed in the form of examples, and the above description should not be interpreted in a restrictive manner. The claims should be taken into account in understanding the subject matter of the present disclosure.

Note that, the technology disclosed in this specification may also be embodied in the configurations described below.

(1) A sound signal processing device including:

a directional point detecting unit that detects a directional point indicating a direction of arrival of a sound signal for each block formed through division by a predetermined time; and a directional point tracking unit that connects the directional points among the blocks, and detects a segment during which sound is emitted, wherein:

the directional point detecting unit includes:

a null beam pattern generating unit that generates a null beam pattern indicating directional characteristics with a relatively low sensitivity to the direction of arrival, the null beam pattern being a plot of a correspondence relationship between direction and sensitivity;

a directional point detection executing unit that detects a local minimum point of the null beam pattern as the direction of arrival;

a null beam pattern averaging unit that calculates an average null beam pattern that is the average of null beam patterns at a time when a non-speech-like signal is input; and a dynamic threshold calculating unit that calculates a dynamic threshold as the threshold to be used in detecting the local minimum point corresponding to the direction of arrival from the null beam pattern, the dynamic threshold being set at a slightly lower value than the average null beam pattern; and the directional point detection executing unit selects the local minimum point not greater than the dynamic threshold from the null beam pattern, and detects the direction corresponding to the selected local minimum point as the direction of arrival.

(2) The sound signal processing device of (1), wherein:
the directional point detecting unit includes
a directionality pattern generating unit that generates a directionality pattern indicating directional characteristics with a relatively high sensitivity to the direction of arrival; and
the directional point detection executing unit detects, as the direction of arrival, a direction having a combination of the local minimum point of the null beam pattern and a local maximum point of the directionality pattern.

(3) The sound signal processing device of (1) or (2), including
a short-time Fourier transform unit that performs a short-time Fourier transform (STFT) on an observation signal obtained by microphones disposed at different positions, and converts the observation signal into an observation signal of a time-frequency domain,
wherein the directional point detecting unit generates directional characteristics patterns by calculating a covariance matrix from the observation signal of the time-frequency domain, calculating eigenvectors by performing eigenvalue decomposition on the covariance matrix, and applying steering vectors of respective directions to the calculated eigenvectors, the directional characteristics patterns indicating relationships between direction and sensitivity.

(4) The sound signal processing device of (3), wherein the directional point detecting unit includes:
a directional characteristics pattern classifying unit that classifies the directional characteristics patterns into the three types:
(a) a directionality type indicating directional characteristics with a relatively high sensitivity to the direction of arrival;
(b) a null beam type indicating directional characteristics with a relatively low sensitivity to the direction of arrival; and
(c) a neutral type not belonging to either of (a) and (b);
a directionality pattern generating unit that generates the directionality pattern from patterns classified as the directionality type, the directionality pattern indicating the directional characteristics with a relatively high sensitivity to the direction of arrival; and
a null beam pattern generating unit that generates the null beam pattern from patterns classified as the null beam type, the null beam pattern indicating the directional characteristics with a relatively low sensitivity to the direction of arrival.

(5) The sound signal processing device of (4), wherein, in the process of classifying the directional characteristics patterns, the directional characteristics pattern classifying unit performs a classification process by calculating a representative directionality pattern from the directional characteristics patterns belonging to the directionality type and a representative null beam pattern from the directional characteristics patterns belonging to the null beam type, and maximizing the distance scale between the calculated representative directionality pattern and the calculated representative null beam pattern.

(6) The sound signal processing device of (5), wherein the directional characteristics pattern classifying unit calculates the representative directionality pattern as the sum of the patterns belonging to the directionality type, and calculates the representative null beam pattern as the sum of the patterns belonging to the null beam type.

(7) The sound signal processing device of (5) or (6), wherein the distance scale is the Euclidean distance between the representative directionality pattern and the representative null beam pattern.

(8) The sound signal processing device of any of (4) through (6), wherein:
the directionality pattern generating unit calculates the average of the patterns classified as the directionality type, as the directionality pattern; and
the null beam pattern generating unit calculates the average of the patterns classified as the null beam type, as the null beam pattern.

(9) The sound signal processing device of any of (3) through (8), wherein
the directional point detecting unit is a configuration that generates the directional characteristics patterns indicating relationships between direction and sensitivity by calculating the covariance matrix from the observation signal of the time-frequency domain, calculating the eigenvectors by performing the eigenvalue decomposition on the covariance matrix, and applying the steering vectors of the respective directions to the calculated eigenvectors, and,
in the process of generating the directional characteristics patterns, the directional point detecting unit generates the directional characteristics patterns by calculating the square of the gain of each direction in each frequency band, calculating an average squared gain or a total squared gain by calculating the average or the sum of the squares of the gains in the frequency bands, performing a logarithmic process on the average squared gain or the total squared gain, and performing a process of adjusting maximum values to 0.

(10) The sound signal processing device of (9), wherein the dynamic threshold calculating unit calculates the dynamic threshold set at a slightly lower value than the average null beam pattern, by performing at least one of a positive constant multiplication operation and a positive constant subtraction operation on the average null beam pattern.

(11) The sound signal processing device of any of (1) through (10), including
a speech likeliness determining unit that determines whether an input sound signal is speech-like in accordance with periodicity of the input sound signal,
wherein the null beam pattern averaging unit calculates the average null beam pattern in accordance with a result of the determination performed by the speech likeliness determining unit, the average null beam pattern being the average of null beam patterns at a time when a non-speech-like signal is input.

(12) The sound signal processing device of (11), wherein the null beam pattern averaging unit updates the average null beam pattern by calculating a weighted average using a forgetting factor between the null beam pattern at a time when the speech likeliness determining unit determines the input sound signal to be non-speech-like and the average null beam pattern already calculated at the point of time.

(13) A sound signal processing method implemented in a sound signal processing device,
the sound signal processing method including:
a directional point detecting step in which a directional point detecting unit detects a directional point indicating a direction of arrival of a sound signal for each block formed through division by a predetermined time; and a direction tracking step in which a direction tracking unit connects the directional points among the blocks, and detects a segment, wherein:

the directional point detecting step includes:

a null beam pattern generation process to generate a null beam pattern indicating directional characteristics with a relatively low sensitivity to the direction of arrival, the null beam pattern being a plot of a correspondence relationship between direction and sensitivity;

a directional point detection process to detect a local minimum point of the null beam pattern as the direction of arrival;

a null beam pattern averaging process to calculate an average null beam pattern that is the average of null beam patterns at a time when a non-speech-like signal is input; and a dynamic threshold calculation process to calculate a dynamic threshold as the threshold to be used in detecting the local minimum point corresponding to the direction of arrival from the null beam pattern, the dynamic threshold being set at a slightly lower value than the average null beam pattern; and the directional point detection process is to select the local minimum point not greater than the dynamic threshold from the null beam pattern, and detect the direction corresponding to the selected local minimum point as the direction of arrival.

(14) A program for causing a sound signal processing device to perform sound signal processing, the program causing the sound signal processing device to carry out:

a directional point detecting step in which a directional point detecting unit detects a directional point indicating a direction of arrival of a sound signal for each block formed through division by a predetermined time; and a direction tracking step in which a direction tracking unit connects the directional points among the blocks, and detects a segment, wherein:

the directional point detecting step includes:

a null beam pattern generation process to generate a null beam pattern indicating directional characteristics with a relatively low sensitivity to the direction of arrival, the null beam pattern being a plot of a correspondence relationship between direction and sensitivity;

a directional point detection process to detect a local minimum point of the null beam pattern as the direction of arrival;

a null beam pattern averaging process to calculate an average null beam pattern that is the average of null beam patterns at a time when a non-speech-like signal is input; and a dynamic threshold calculation process to calculate a dynamic threshold as the threshold to be used in detecting the local minimum point corresponding to the direction of arrival from the null beam pattern, the dynamic threshold being set at a slightly lower value than the average null beam pattern; and the directional point detection process is to select the local minimum point not greater than the dynamic threshold from the null beam pattern, and detect the direction corresponding to the selected local minimum point as the direction of arrival.

Also, the series of processes described in this specification can be performed by hardware, software, or a combination of hardware and software. In a case where processes are performed by software, a program in which the process sequences are recorded may be installed into a memory incorporated into special-purpose hardware in a computer, or may be installed into a general-purpose computer that can perform various kinds of processes. For example, the program can be recorded beforehand into a recording medium. The program can be installed from the recording medium into a computer, or can be received via a network such as a LAN (Local Area Network) or the Internet and be installed into a recording medium such as an internal hard disk.

Note that, the respective processes described in this specification may not be performed in chronological order according to the description, but may be performed in parallel or independently of one another depending on the configuration/capability of the apparatus performing the processes or as necessary. Also, in this specification, a system is a logical assembly of devices, and does not necessarily mean devices with different configurations incorporated into one housing.

INDUSTRIAL APPLICABILITY

As described so far, according an embodiment of the present disclosure, it is possible to achieve a device and a method for determining a speech segment with a high degree of accuracy from a sound signal in which different sounds coexist.

Specifically, directional points indicating the direction of arrival of the sound signal are connected in the temporal direction, and a speech segment is detected. In this configuration, pattern classification is performed in accordance with directional characteristics with respect to the direction of arrival, and a directionality pattern and a null beam pattern are generated from the classification results. Also, an average null beam pattern is also generated by calculating the average of the null beam patterns at a time when a non-speech-like signal is input. Further, a threshold that is set at a slightly lower value than the average null beam pattern is calculate as the threshold to be used in detecting the local minimum point corresponding to the direction of arrival from each null beam pattern, and a local minimum point equal to or lower than the threshold is determined to be the point corresponding to the direction of arrival.

With this configuration, a device and a method for determining a speech segment with a high degree of accuracy from a sound signal in which different sounds coexist can be achieved.

REFERENCE SIGNS LIST

11 Block
12 Directional point
15, 16 Speech segment
21 Centroid
22 Microphone
25, 26 Sound Source
31 Null beam pattern
32 Directionality pattern
41 Null beam pattern
51, 52 Directional point
53, 54, 55, 57 Segment
71 Null beam pattern
72 Threshold
73 Null beam pattern
81 Null beam pattern
84 Null beam pattern
101 Microphone array
102 AD converter
103 STFT unit 104 Observation signal buffer
105 Directional point detecting unit
106 Speech likeliness determining unit
107 Directional point tracking unit
108 Sound source extracting unit
109 Later-stage processing unit
151 Observation signal buffer
152 Covariance matrix calculating unit
153 Covariance matrix storage unit
154 Eigenvector calculating unit
155 Eigenvector storage unit
156 Steering vector storage unit
157 Directional characteristics pattern generating unit
158 Directional characteristics pattern storage unit
159 Directional characteristics pattern classifying unit
160 Directionality-type pattern storage unit
161 Neutral-type pattern storage unit
162 Null-beam-type pattern storage unit
163 Directionality pattern and null beam pattern storage unit
164 Classification matrix buffer
165 Directionality pattern storage unit
166 Null beam pattern storage unit
167 Speech likeliness determining unit
168 Null beam pattern averaging unit
169 Average null beam pattern storage unit
170 Dynamic threshold calculating unit
171 Dynamic threshold storage unit
172 Directional point detecting unit
173 Directional point buffer
251 Directional vector
252 Reference point
253, 254 Microphone
311 In-process segment buffer
321 Segment ID
322 Beginning block number
323 Ending block number
324 Number of valid blocks
325 Average direction
326 Number of discontinuous blocks
331 Current block number
332 Directional point buffer
401 to 403 Frame

The invention claimed is:

1. A sound signal processing device, comprising:
circuitry configured to:
detect directional points indicating a direction of arrival of a sound signal for each of a plurality of blocks, wherein the sound signal is divided into the plurality of blocks in a temporal direction;
connect the directional points among the plurality of blocks, and detect a segment during which sound is emitted;
generate a null beam pattern indicating directional characteristics with a relatively low sensitivity to the direction of arrival, the null beam pattern being a plot of a correspondence relationship between direction and sensitivity;
detect a local minimum point of the null beam pattern as the direction of arrival;
determine whether an input sound signal is speech-like based on periodicity of the input sound signal;
calculate an average null beam pattern based on a result of the determination, the average null beam pattern being an average of a plurality of null beam patterns at a time at which a non-speech-like signal is input;
calculate a dynamic threshold as a threshold for detection of the local minimum point corresponding to the direction of arrival from the null beam pattern, the dynamic threshold being set at a slightly lower value than the average null beam pattern; and
select the local minimum point smaller than the dynamic threshold from the null beam pattern, and detect a direction corresponding to the selected local minimum point as the direction of arrival.

2. The sound signal processing device according to claim 1, wherein the circuitry is further configured to:
generate a directionality pattern indicating the directional characteristics with a relatively high sensitivity to the direction of arrival; and
detect, as the direction of arrival, a direction having a combination of the local minimum point of the null beam pattern and a local maximum point of the directionality pattern.

3. The sound signal processing device according to claim 1, wherein the circuitry is further configured to:
execute a short-time Fourier transform (STFT) on an observation signal obtained by a plurality of microphones at different positions, and convert the observation signal into an observation signal of a time-frequency domain,
generate a plurality of directional characteristics patterns based on calculation of a covariance matrix from the observation signal of the time-frequency domain, calculation of a plurality of eigenvectors based on execution of eigenvalue decomposition on the covariance matrix, and application of a steering vector of each direction to the calculated plurality of eigenvectors, the plurality of directional characteristics patterns indicating a relationship between direction and sensitivity.

4. The sound signal processing device according to claim 3, wherein the
circuitry is further configured to classify the plurality of directional characteristics patterns into three types:
(a) a directionality type indicating directional characteristics with a high sensitivity to the direction of arrival;
(b) a null beam type indicating directional characteristics with a low sensitivity to the direction of arrival; and
(c) a neutral type not belonging to at least one of (a) or (b);
generate a directionality pattern from patterns classified as the directionality type, the directionality pattern indicating the directional characteristics with a relatively high sensitivity to the direction of arrival; and
generate the null beam pattern from patterns classified as the null beam type, the null beam pattern indicating the directional characteristics with a relatively low sensitivity to the direction of arrival.

5. The sound signal processing device according to claim 4, wherein, in a process of the classification of the plurality of directional characteristics patterns, the circuitry is further configured to execute a classification process based on calculation of a representative directionality pattern from the plurality of directional characteristics patterns belonging to the directionality type and calculation of a representative null beam pattern from the plurality of directional characteristics patterns belonging to the null beam type, and maximization of a distance scale between the calculated representative directionality pattern and the calculated representative null beam pattern.

6. The sound signal processing device according to claim 5, wherein the circuitry is further configured to calculate the representative directionality pattern as a sum of the patterns belonging to the directionality type, and calculate the representative null beam pattern as a sum of the patterns belonging to the null beam type.

7. The sound signal processing device according to claim 5, wherein the distance scale is an Euclidean distance between the representative directionality pattern and the representative null beam pattern.

8. The sound signal processing device according to claim 4, wherein the circuitry is further configured to:
calculate a first average of the patterns classified as the directionality type, as the directionality pattern; and
calculate a second average of the patterns classified as the null beam type, as the null beam pattern.

9. The sound signal processing device according to claim 3, wherein
the circuitry is further configured to:
generate the plurality of directional characteristics patterns indicating a relationship between direction and sensitivity based on calculation of the covariance matrix from the observation signal of the time-frequency domain, calculation of the plurality of eigenvectors based on execution of the eigenvalue decomposition on the covariance matrix, and application of the steering vector of each direction to the calculated eigenvectors, and, in a process of the generation of the plurality of directional characteristics patterns, the circuitry is further configured to generate the plurality of directional characteristics patterns based on calculation of a square of a gain of each direction in each frequency band, calculation of one of an average squared gain and a total squared gain based on calculation of one of an average and a sum of squares of gains in the frequency bands, execution of a logarithmic process on the one of the average squared gain and the total squared gain, and execution of a process of adjusting a maximum value to 0.

10. The sound signal processing device according to claim 9, wherein the circuitry is further configured to calculate the dynamic threshold set at a lower value than the average null beam pattern, based on execution of at least one of a positive constant multiplication operation and a positive constant subtraction operation on the average null beam pattern.

11. The sound signal processing device according to claim 1, wherein the circuitry is further configured to update the average null beam pattern based on calculation of a weighted average using a forgetting factor between the null beam pattern at a time at which the circuitry is further configured to determine the input sound signal to be non-speech-like and the average null beam pattern already calculated at a point of time.

12. A sound signal processing method, comprising:
detecting directional points indicating a direction of arrival of a sound signal for each of a plurality of blocks, wherein the sound signal is divided into the plurality of blocks in a temporal direction;
connecting the directional points among a plurality of blocks, and detecting a segment;
generating a null beam pattern indicating directional characteristics with a relatively low sensitivity to the direction of arrival, the null beam pattern being a plot of a correspondence relationship between direction and sensitivity;
detecting a local minimum point of the null beam pattern as the direction of arrival;
determining whether an input sound signal is speech-like based on periodicity of the input sound signal;
calculating an average null beam pattern based on a result of the determination, the average null beam pattern being an average of a plurality of null beam patterns at a time when a non-speech-like signal is input;
calculating a dynamic threshold as a threshold to be used in detecting the local minimum point corresponding to the direction of arrival from the null beam pattern, the dynamic threshold being set at a slightly lower value than the average null beam pattern; and
selecting the local minimum point smaller than the dynamic threshold from the null beam pattern, and detecting a direction corresponding to the selected local minimum point as the direction of arrival.

13. A non-transitory computer-readable medium having stored thereon, computer-executable instructions, which when executed by a computer, cause the computer to execute operations, the operations comprising:
detecting directional points indicating a direction of arrival of a sound signal for each of a plurality of blocks, wherein the sound signal is divided into the plurality of blocks in a temporal direction;
connecting the directional points among a plurality of blocks, and detecting a segment,
generating a null beam pattern indicating directional characteristics with a relatively low sensitivity to the direction of arrival, the null beam pattern being a plot of a correspondence relationship between direction and sensitivity;
detecting a local minimum point of the null beam pattern as the direction of arrival;
determining whether an input sound signal is speech-like based on periodicity of the input sound signal;
calculating an average null beam pattern based on a result of the determination, the average null beam pattern being an average of a plurality of null beam patterns at a time when a non-speech-like signal is input;
calculating a dynamic threshold as a threshold to be used in detecting the local minimum point corresponding to the direction of arrival from the null beam pattern, the dynamic threshold being set at a slightly lower value than the average null beam pattern; and
selecting the local minimum point smaller than the dynamic threshold from the null beam pattern, and detecting a direction corresponding to the selected local minimum point as the direction of arrival.

* * * * *